United States Patent [19]

Champlin et al.

[11] Patent Number: 4,665,518
[45] Date of Patent: May 12, 1987

[54] SYNCHRONOUS/ASYNCHRONOUS COMMUNICATION SYSTEM

[75] Inventors: Keith S. Champlin, Minneapolis; Ernest C. Preimesberger, Stillwater; James D. Schoppenhorst, Blaine, all of Minn.

[73] Assignee: FMC Corporation, Chicago, Ill.

[21] Appl. No.: 579,612

[22] Filed: Feb. 13, 1984

[51] Int. Cl.⁴ .............................. H04J 3/26
[52] U.S. Cl. .................................... 370/89
[58] Field of Search ............ 370/89, 94, 85, 95, 370/86, 90; 340/825.05, 825.5

[56] References Cited

U.S. PATENT DOCUMENTS

| | | | |
|---|---|---|---|
| 3,891,804 | 6/1975 | Hachenburg | 370/89 |
| 4,019,176 | 4/1977 | Cour et al. | 370/89 |
| 4,154,983 | 5/1979 | Pedersen | 370/89 |
| 4,190,821 | 2/1980 | Woodward | 370/16 |
| 4,251,880 | 2/1981 | Baugh et al. | 370/89 |
| 4,293,948 | 10/1981 | Soderblom | 370/89 |
| 4,383,315 | 5/1983 | Torng | 370/89 |
| 4,445,116 | 4/1984 | Grow | 370/89 |
| 4,482,999 | 11/1984 | Janson et al. | 370/89 |
| 4,549,291 | 10/1985 | Renoulin et al. | 370/89 |
| 4,553,234 | 11/1985 | Brandsma et al. | 370/89 |

FOREIGN PATENT DOCUMENTS 551118  5/1974  Switzerland .

OTHER PUBLICATIONS

Compcon 80, Digest of Papers, Proceedings, "Distributed Computing", Sep. 23-25, 1980, pp. 507–515, Twenty—First IEEE Computer Society International Conference, Washington, D.C., Thomas C. Wilson et al, entitled Distributed Control of Ring Networks Using A Play Through Protocol.

Primary Examiner—Douglas W. Olms
Attorney, Agent, or Firm—H. M. Stanley; R. B. Megley

[57] ABSTRACT

A data bus system includes a plurality of serially connected active terminals configured to receive data and either retransmit the received data or transmit new data to the next adjacent terminal. The terminals are configured in a diagnostic mode to configure the system optimally at turn-on or in the event system faults occur, and are configured in a user access mode once optimum configuration is attained. The system is under control by one terminal at any one time during the diagnostic mode and any terminal is capable of being the control terminal. For operation in the user access mode a cyclic period is defined during which a portion of the period is set aside for synchronous transmissions and another portion of the period is set aside for asynchronous transmissions. Both synchronous and asynchronous users are thereby accommodated by the bus.

26 Claims, 48 Drawing Figures

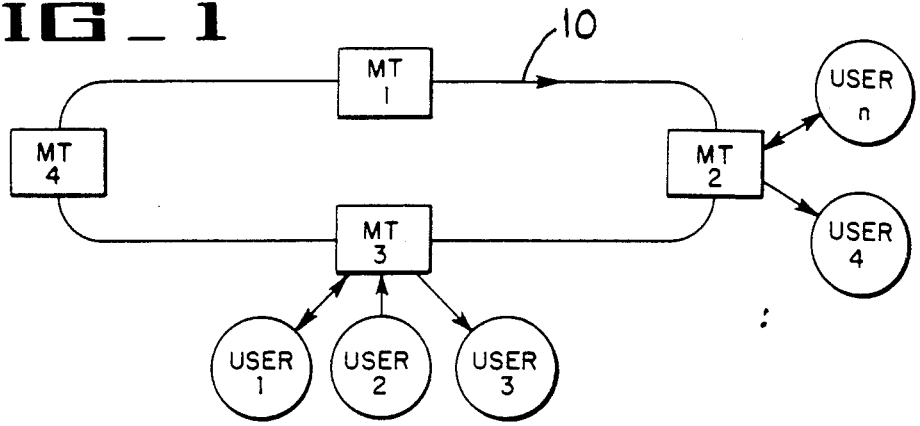
FIG_1
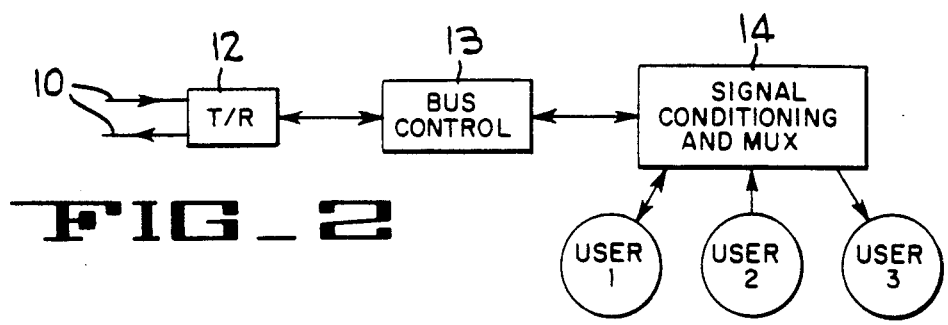
FIG_2
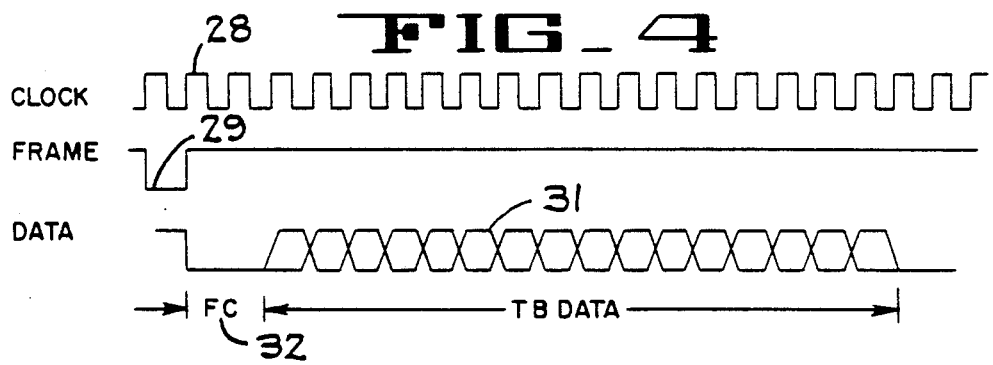
FIG_4
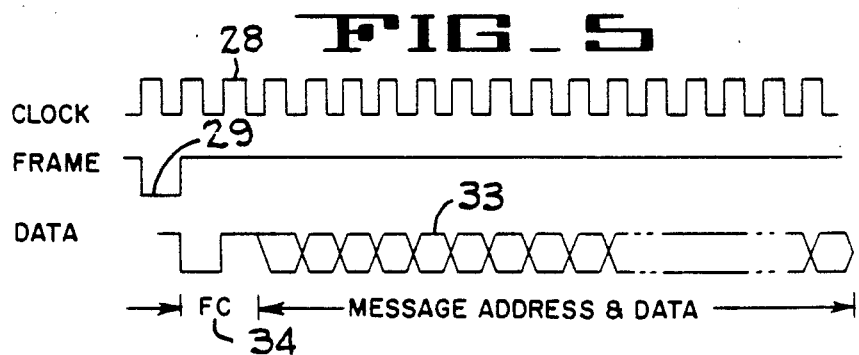
FIG_5

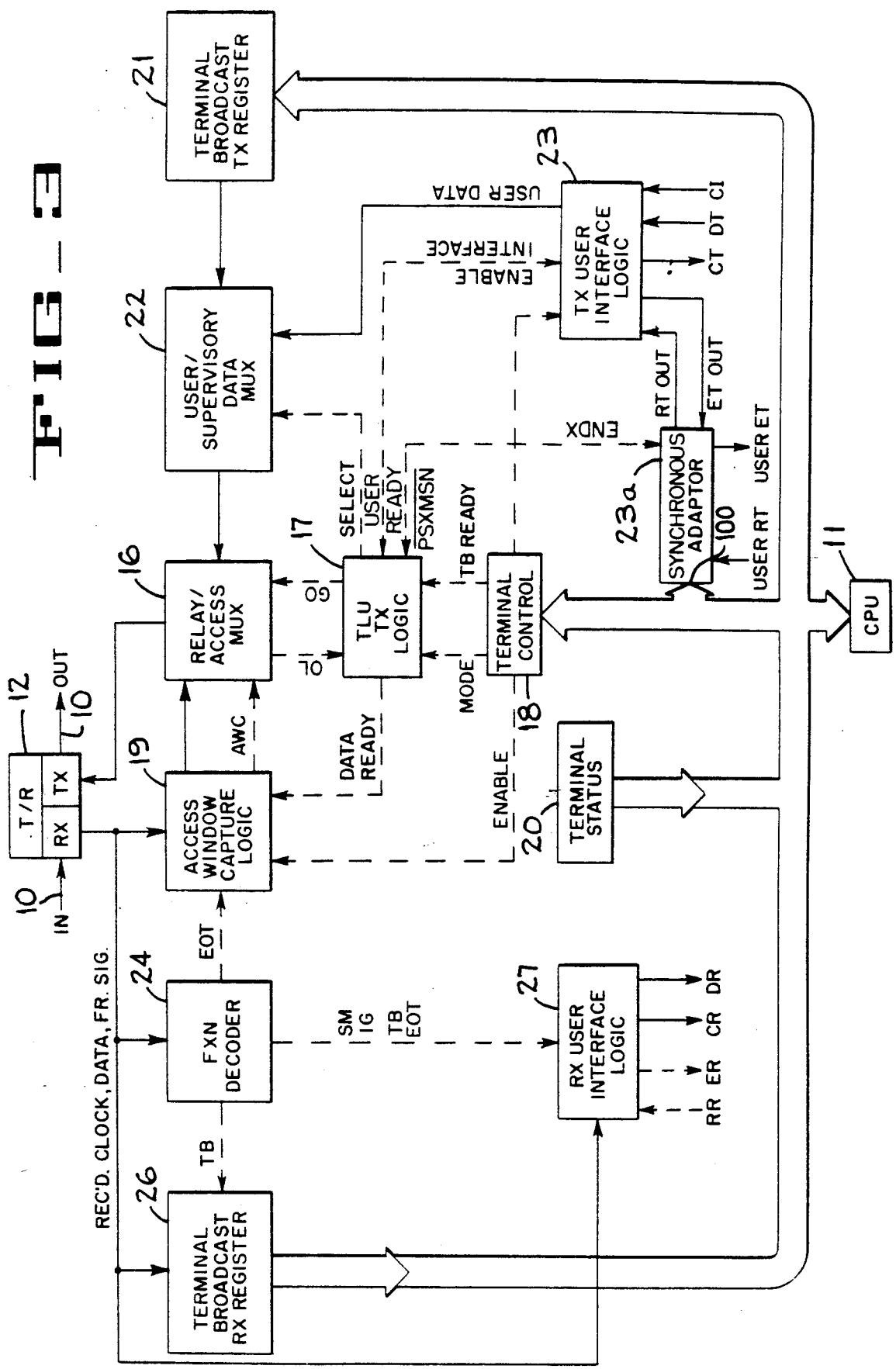

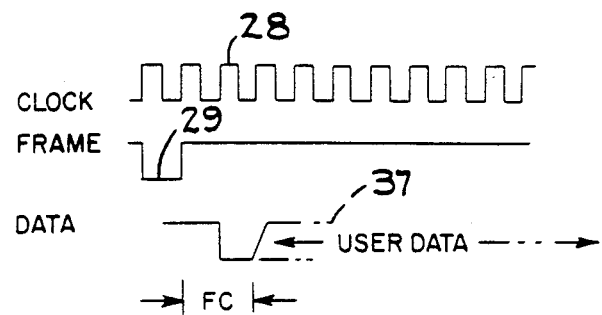
FIG_6
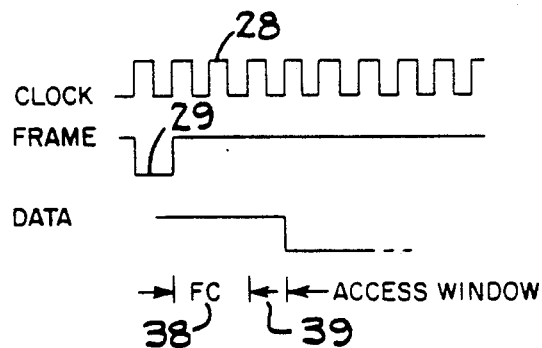
FIG_7
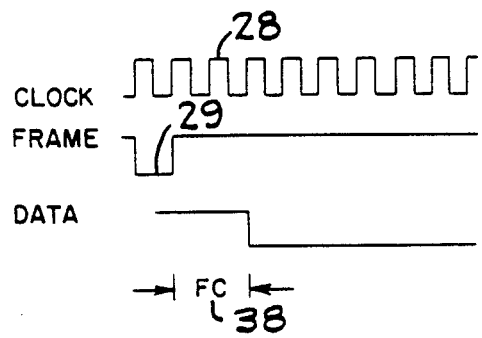
FIG_8

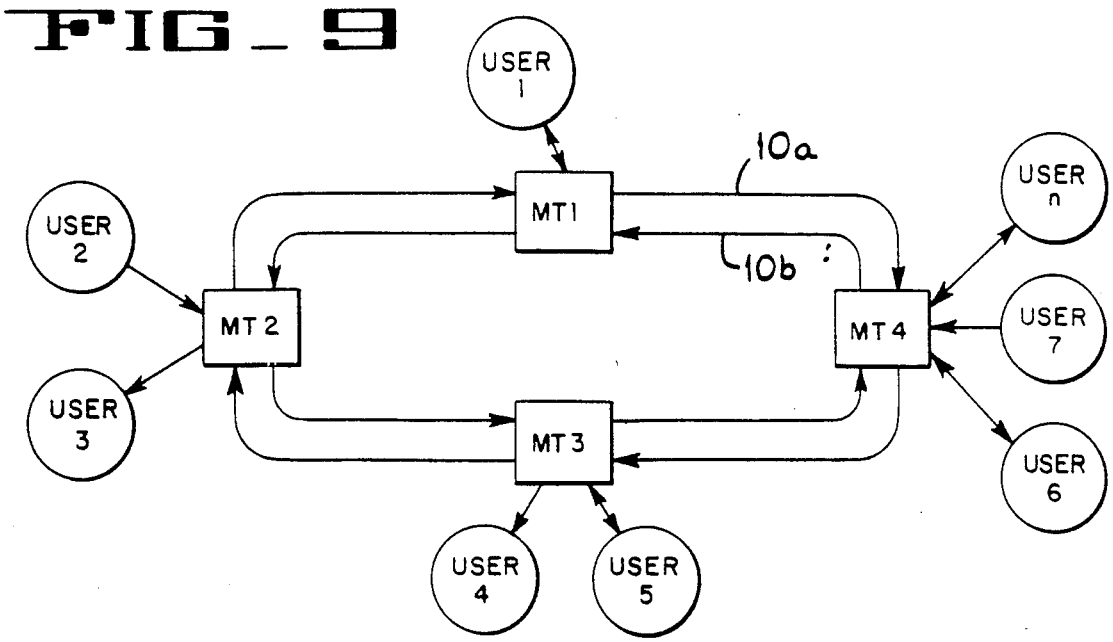
FIG_9
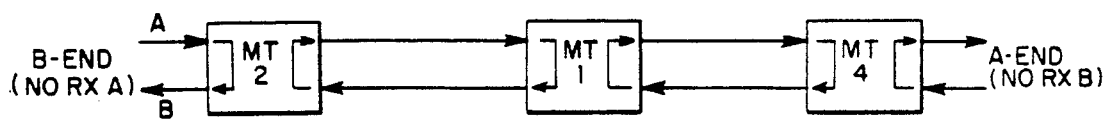
FIG_17
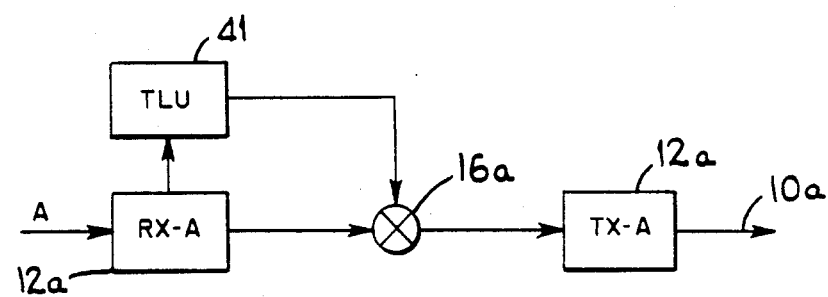
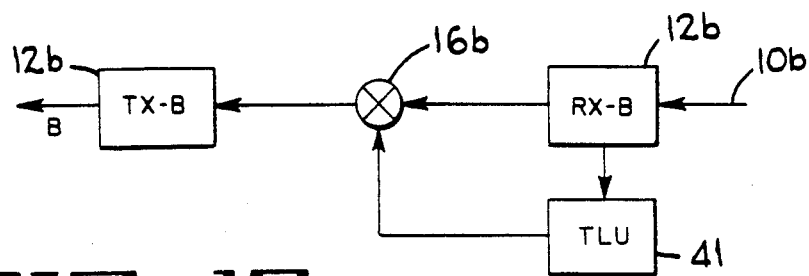
FIG_10

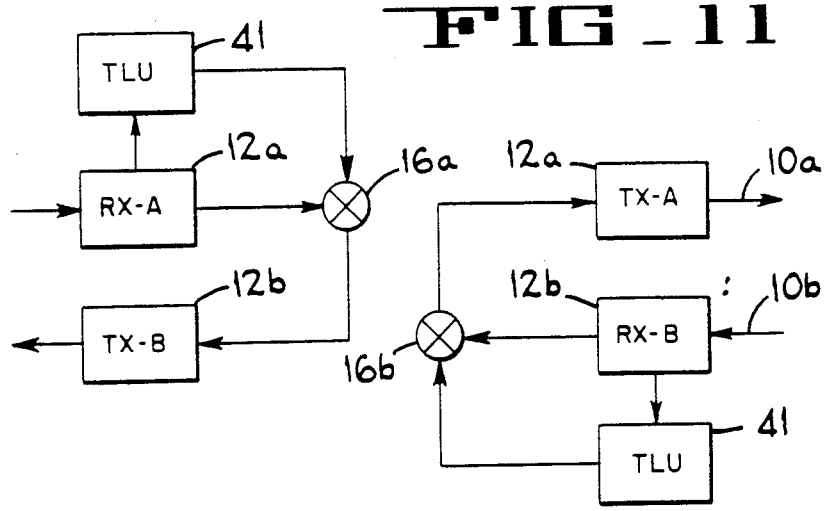
FIG_11
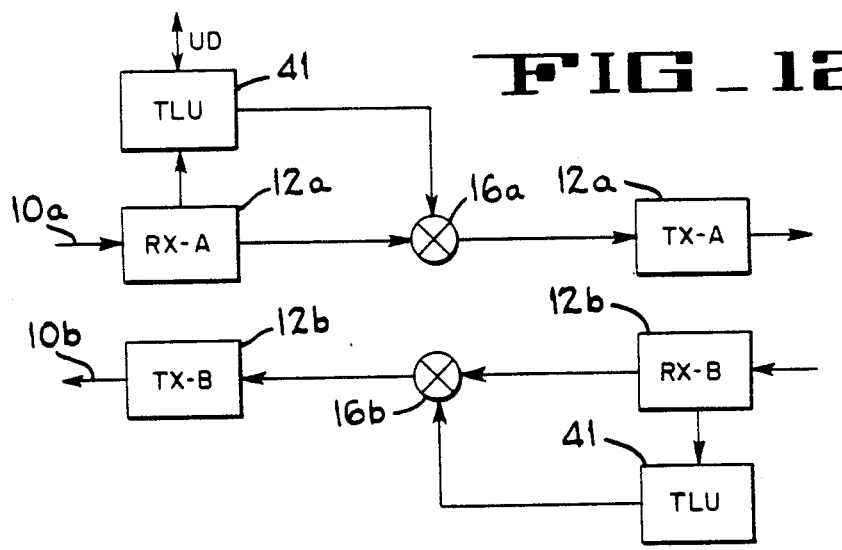
FIG_12
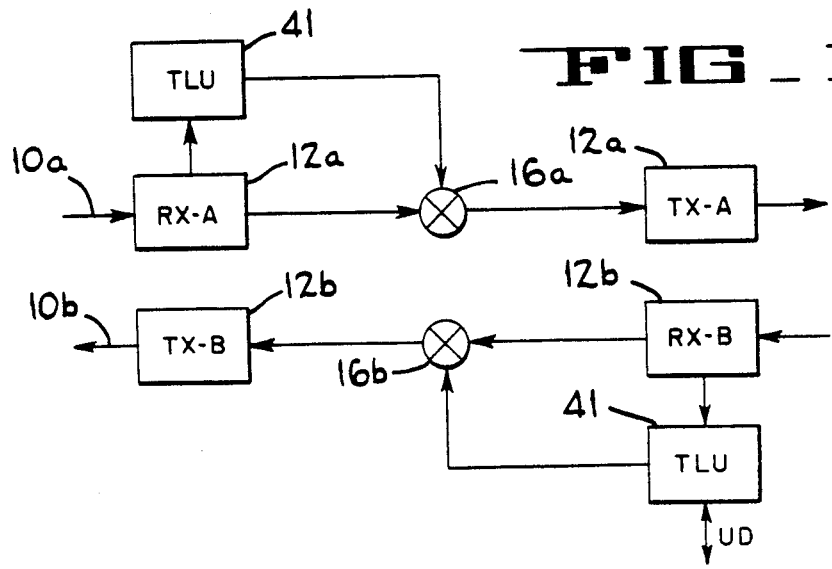
FIG_13

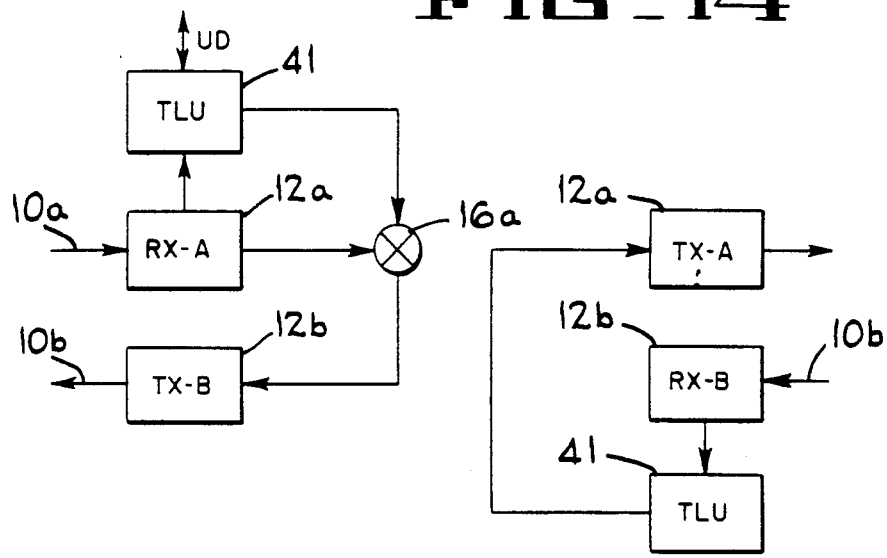
FIG_14
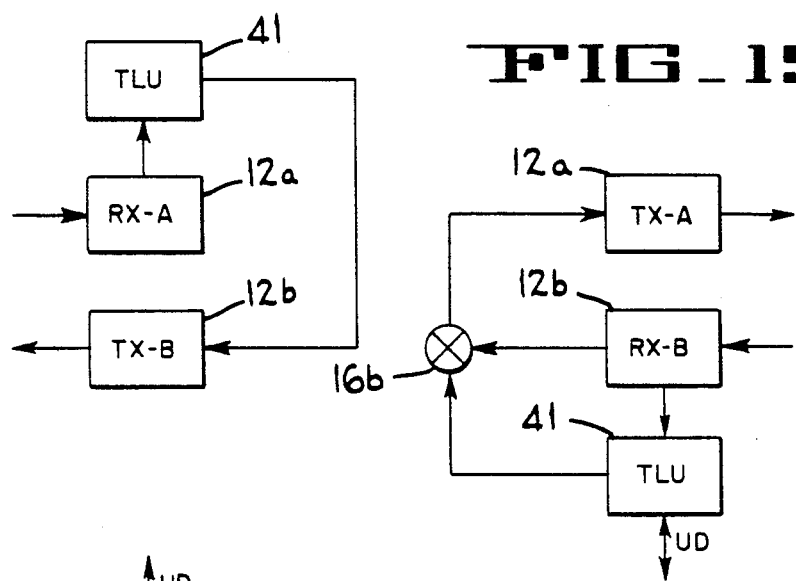
FIG_15
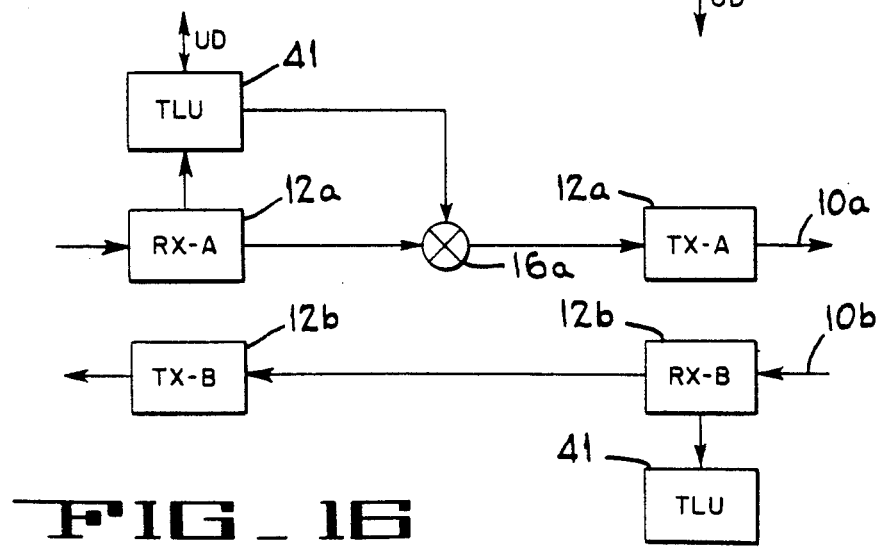
FIG_16

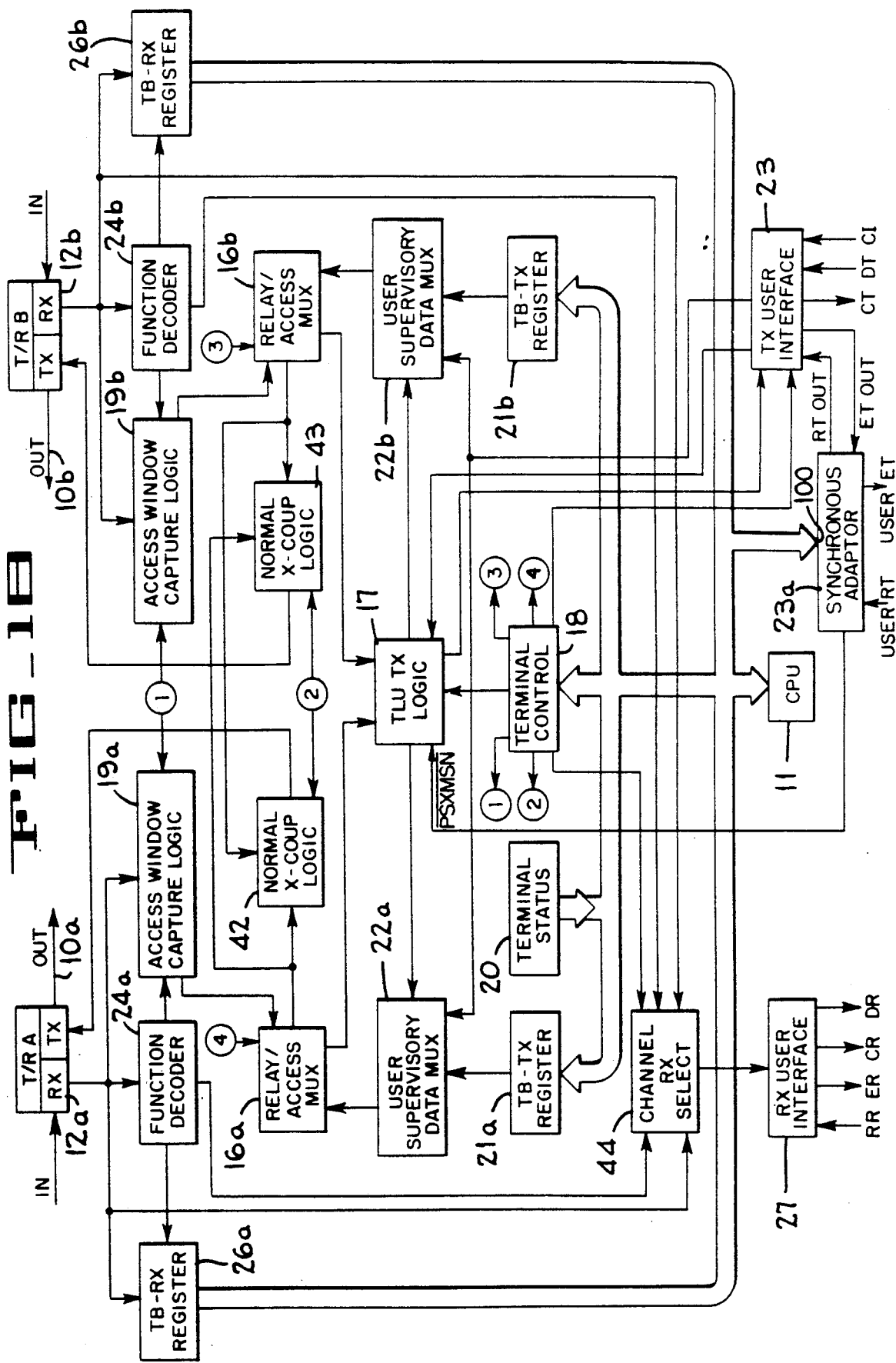
FIG_18

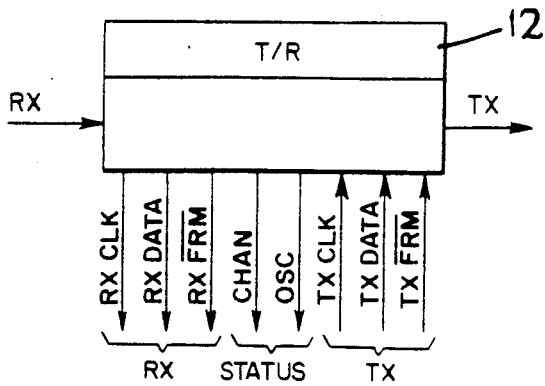
FIG_19
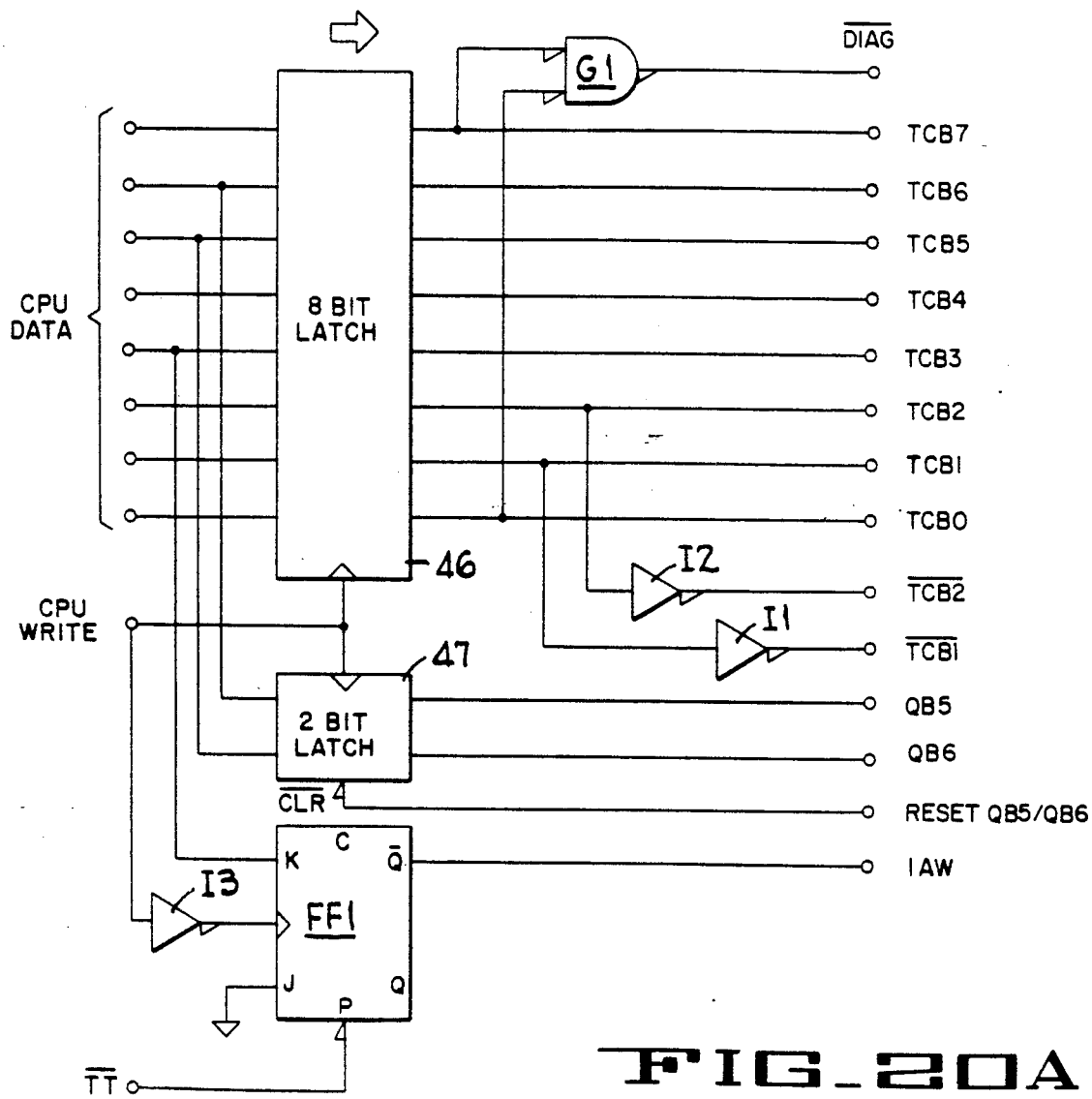
FIG_20A

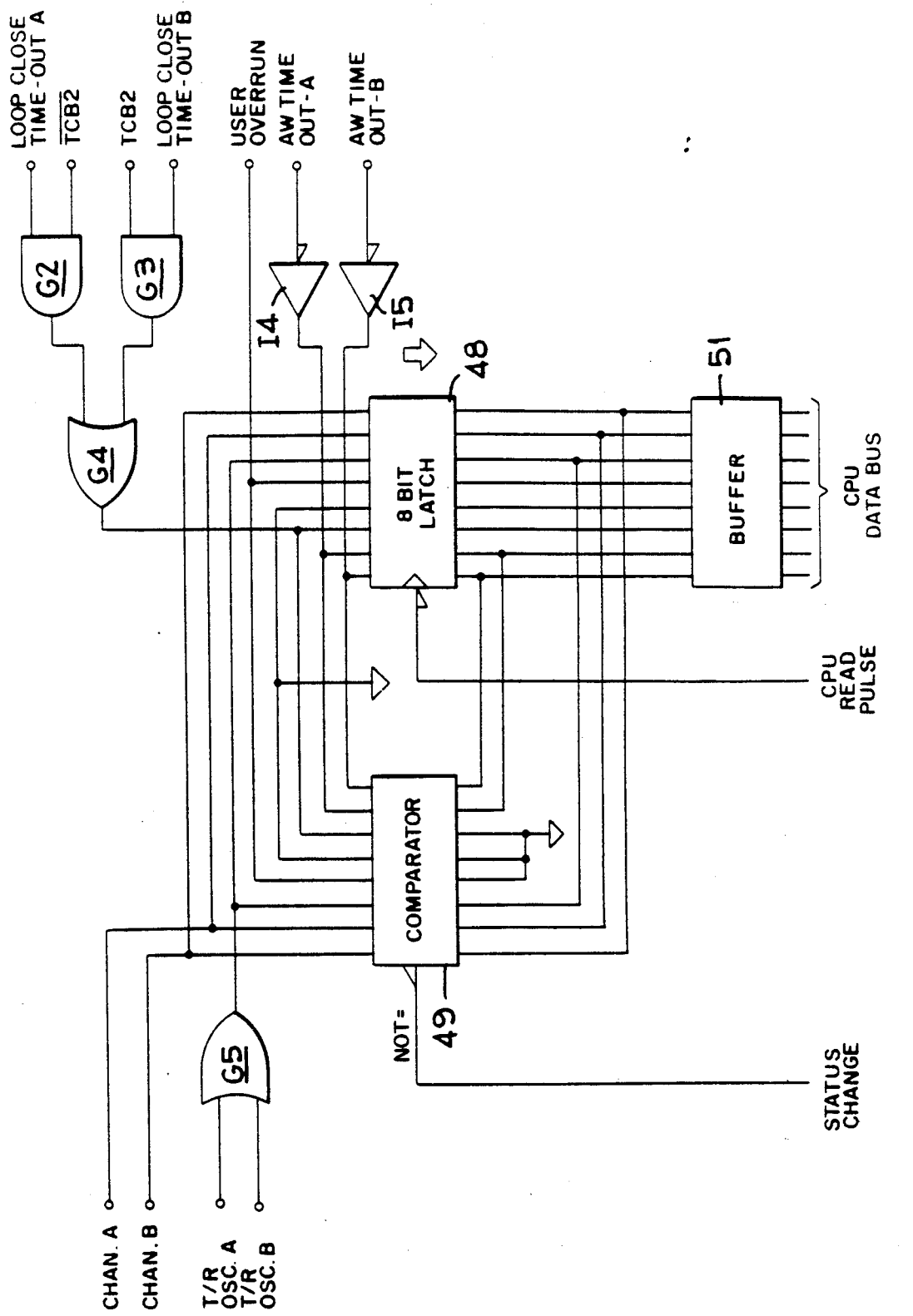
FIG_20B

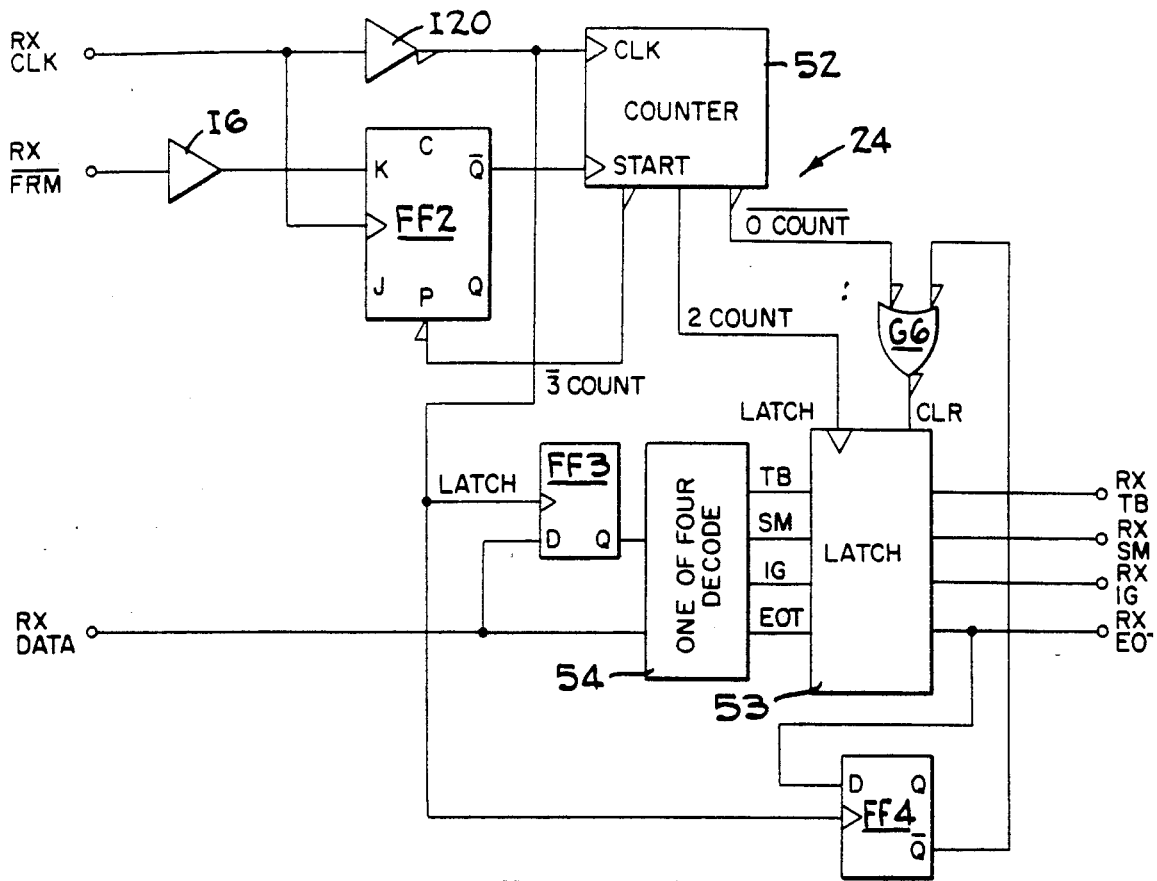
FIG_21
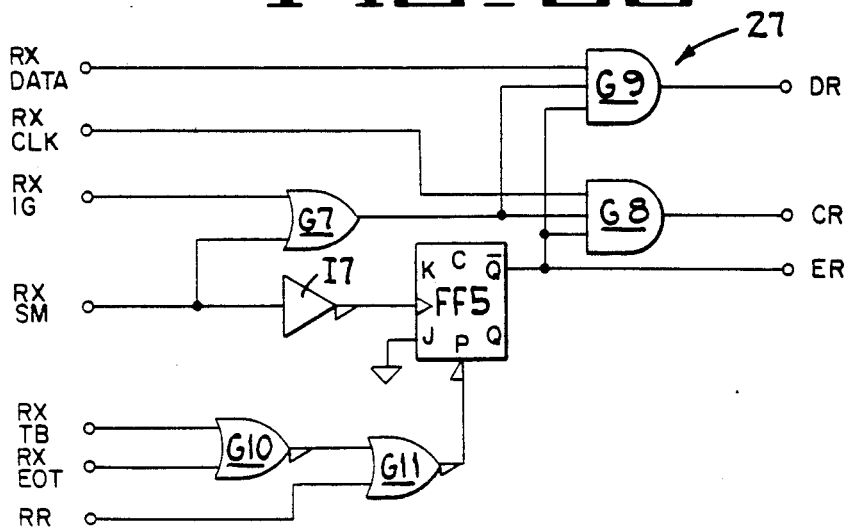
FIG_22

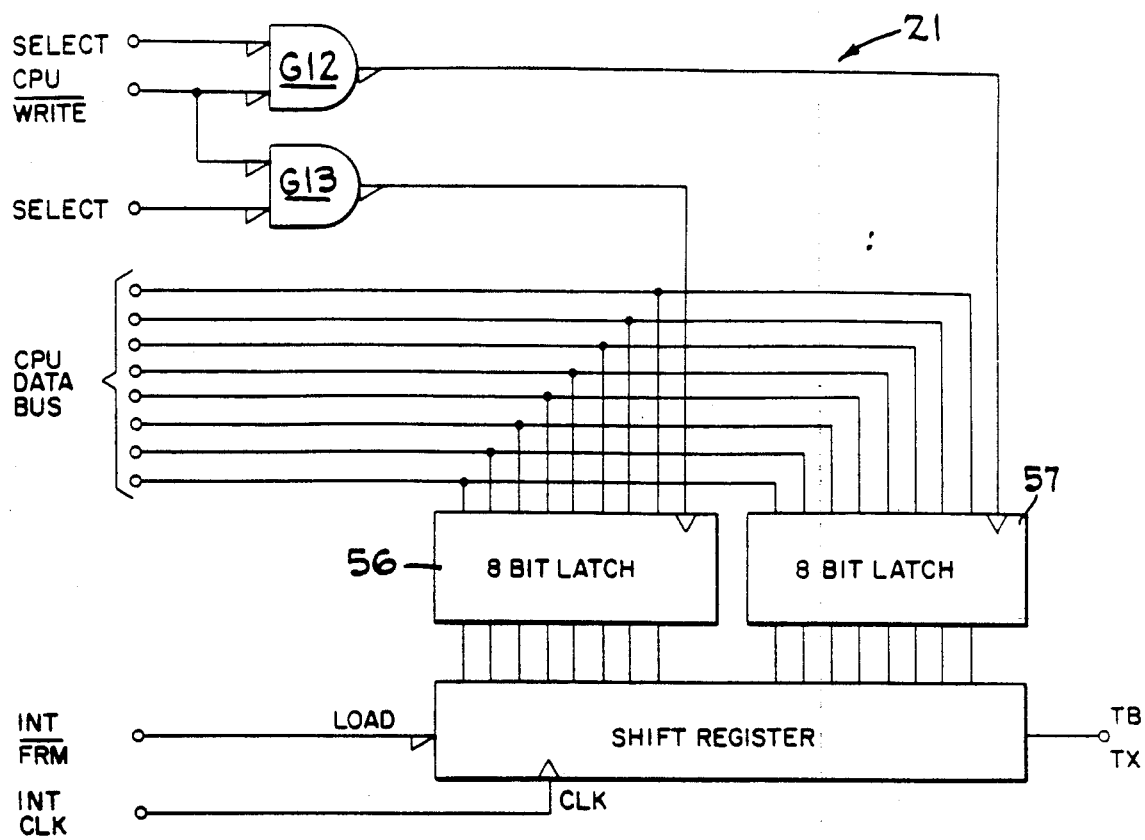
FIG_23
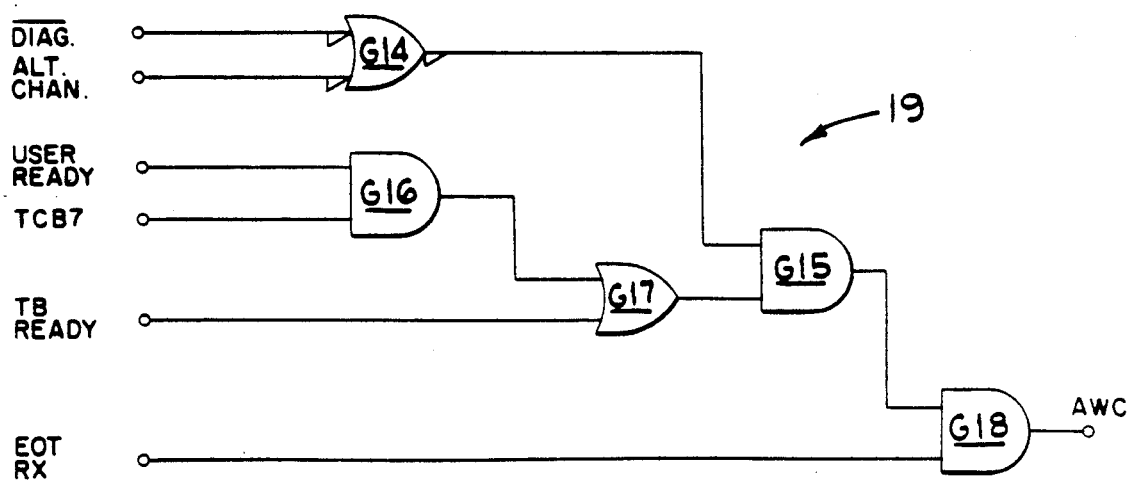
FIG_24

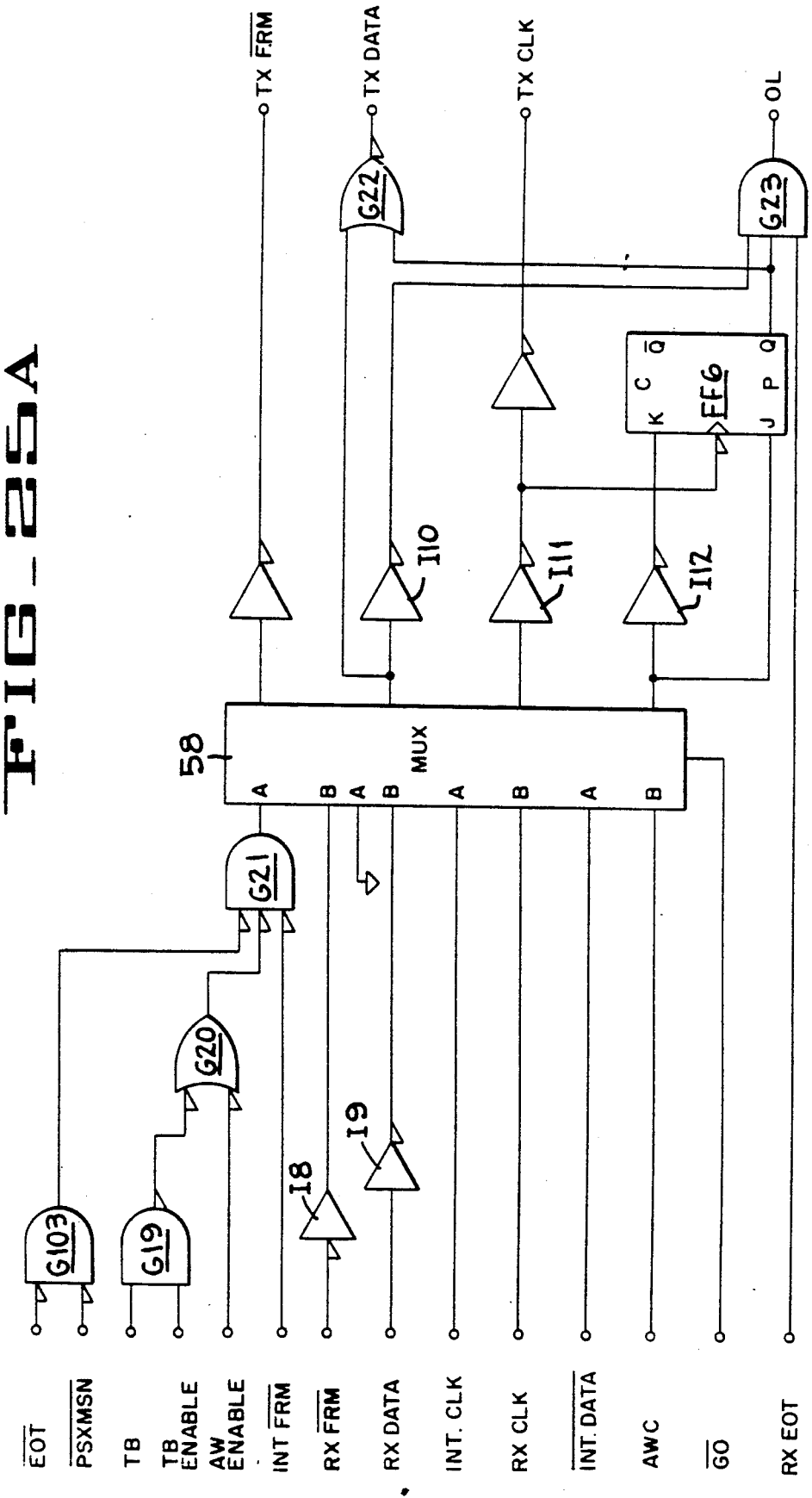
FIG_25A

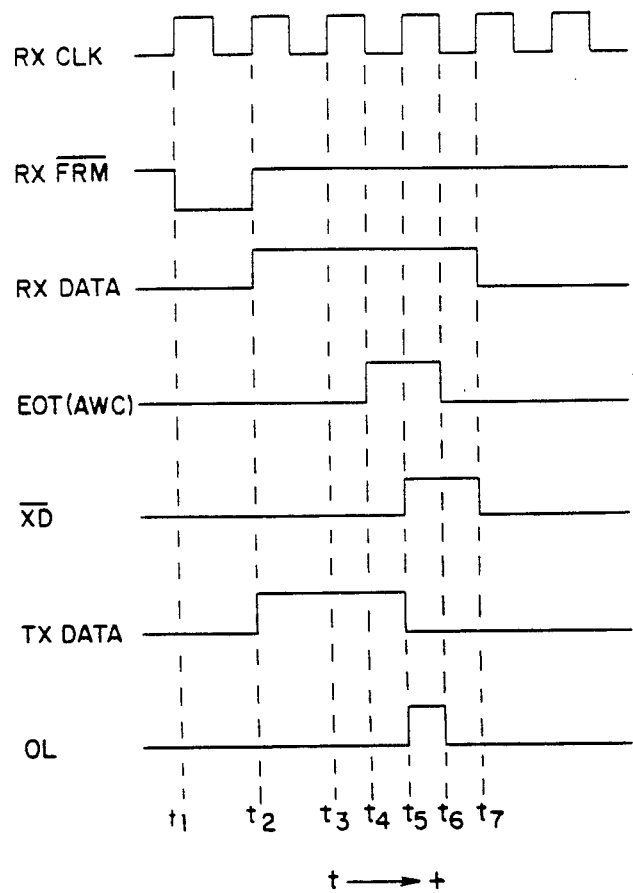
FIG_25B
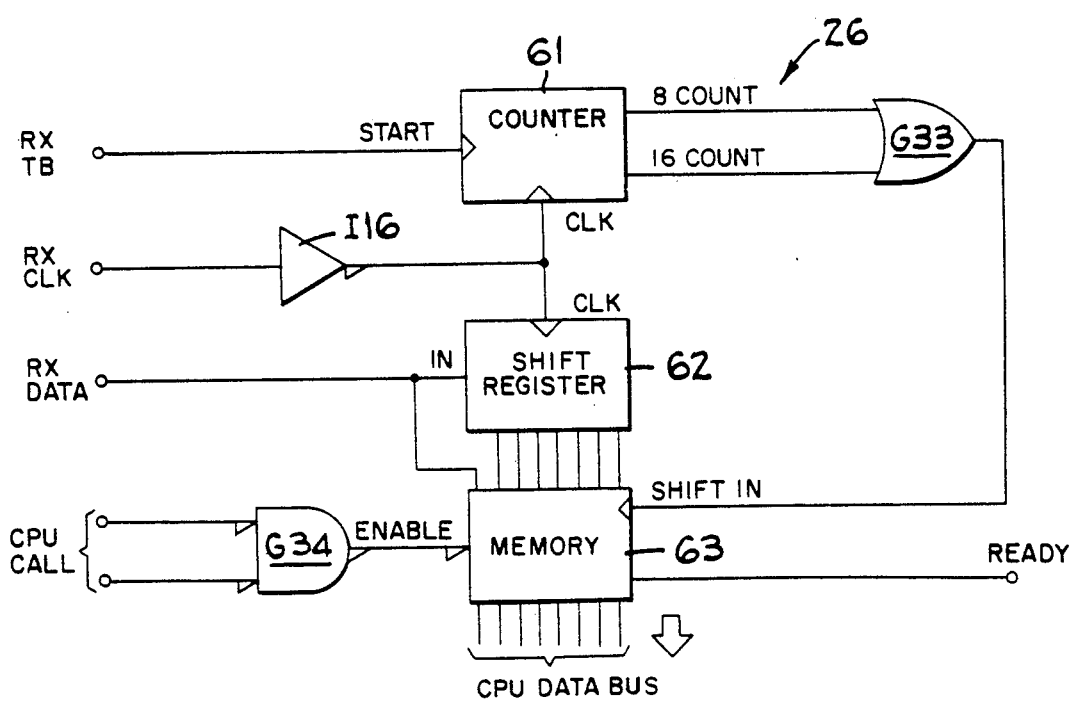
FIG_27

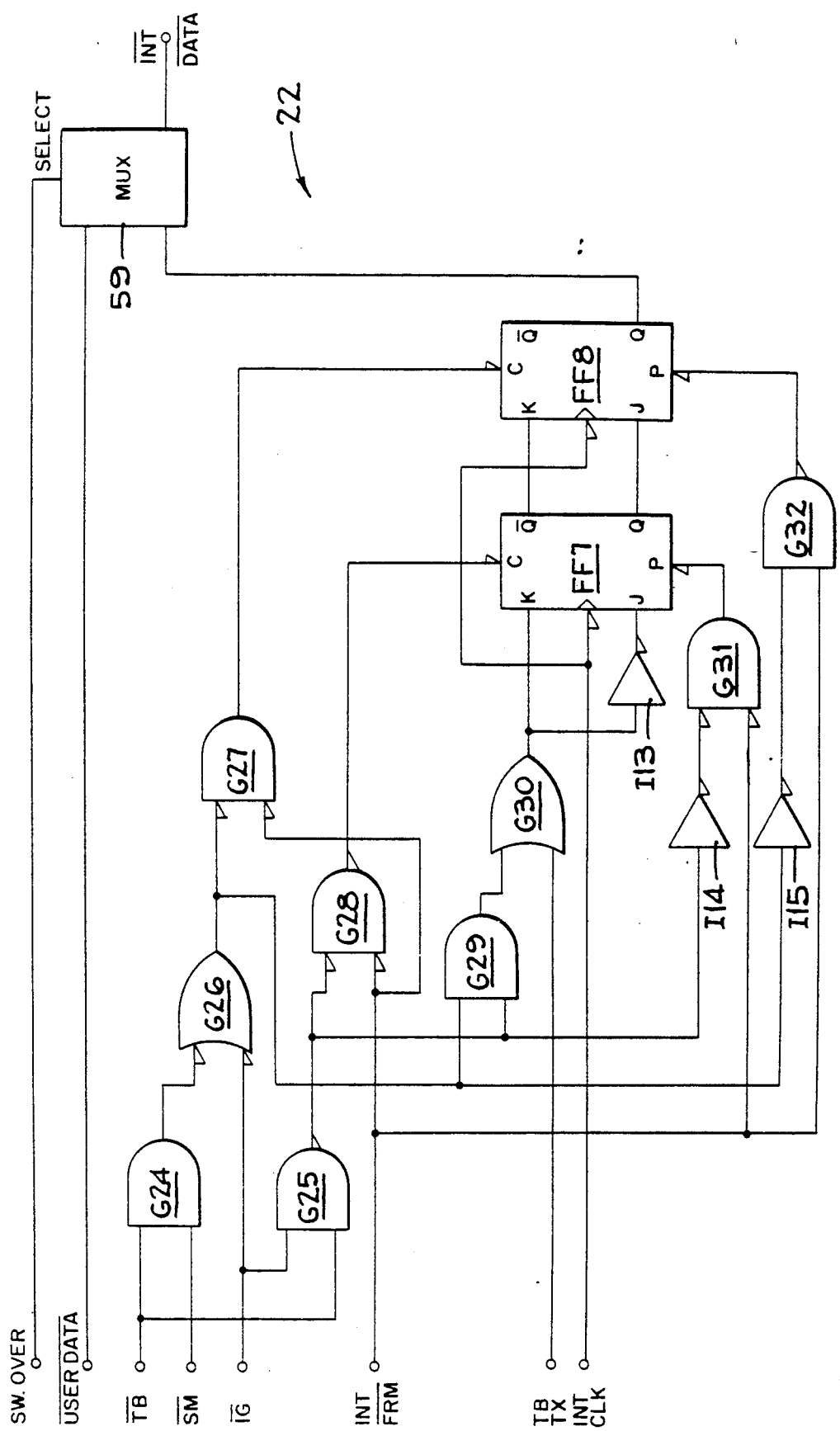

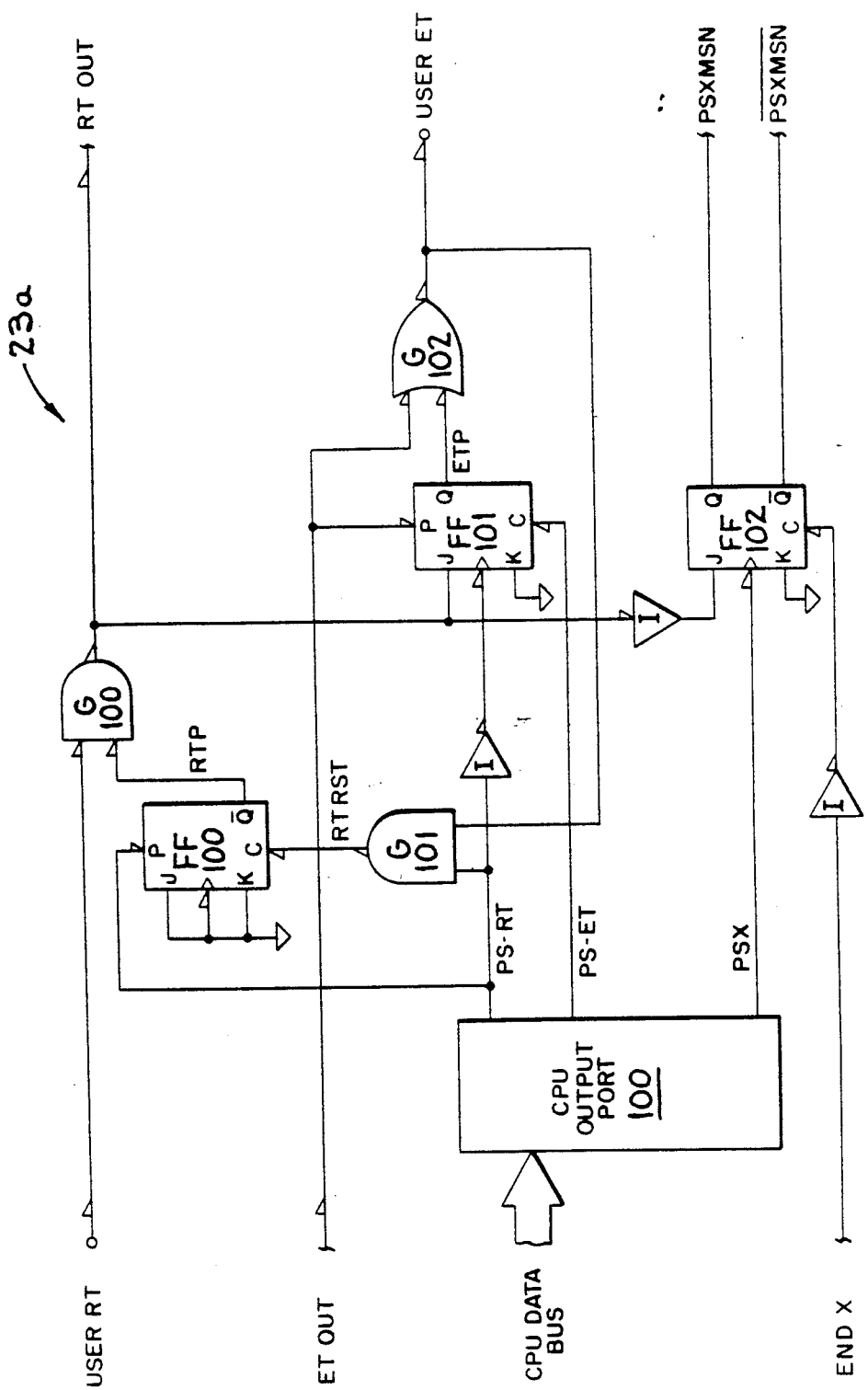

FIG_28D
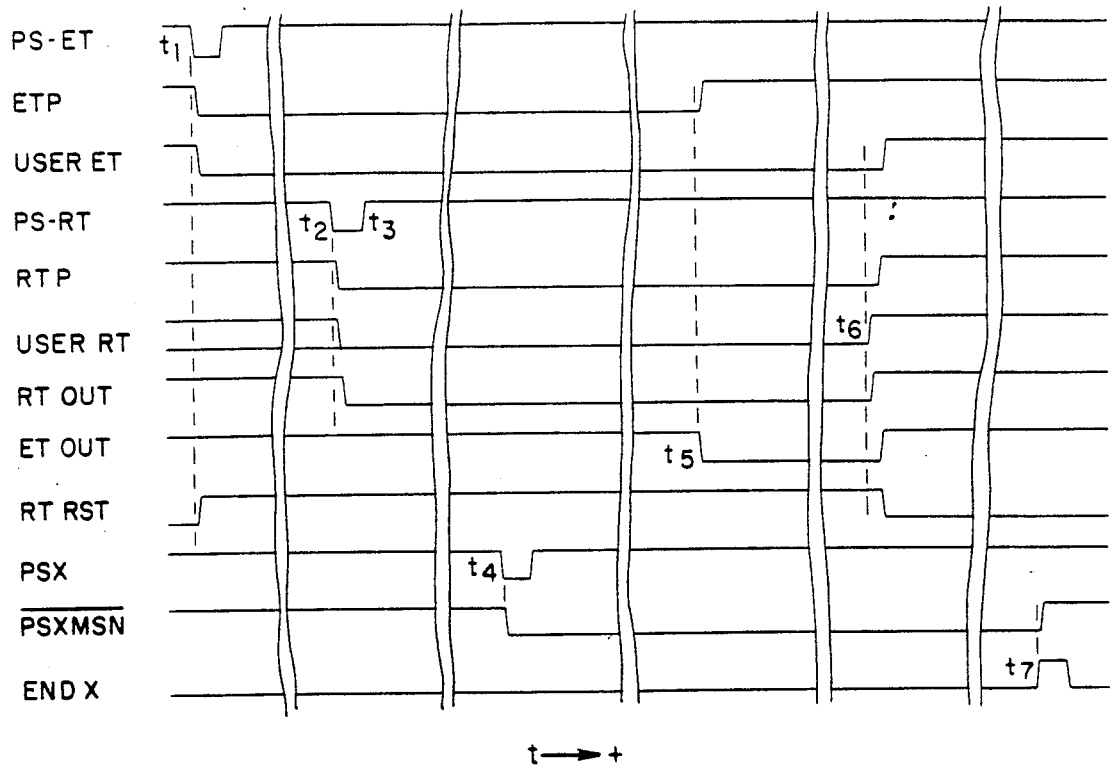
FIG_28E
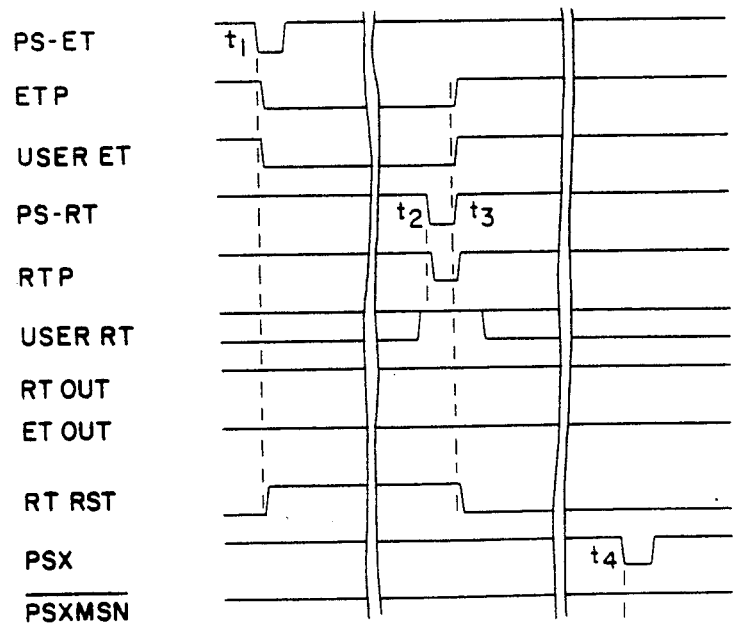

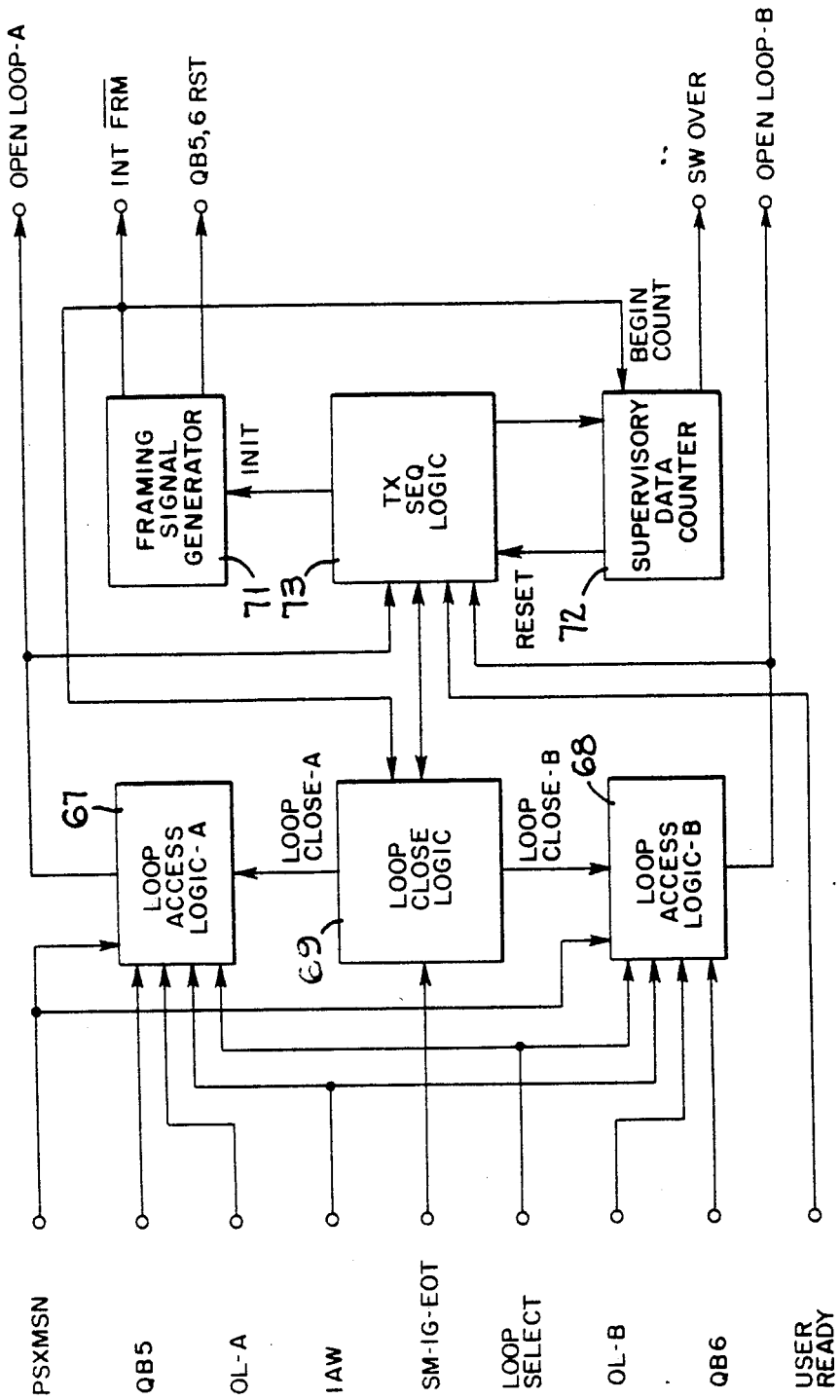
FIG_29

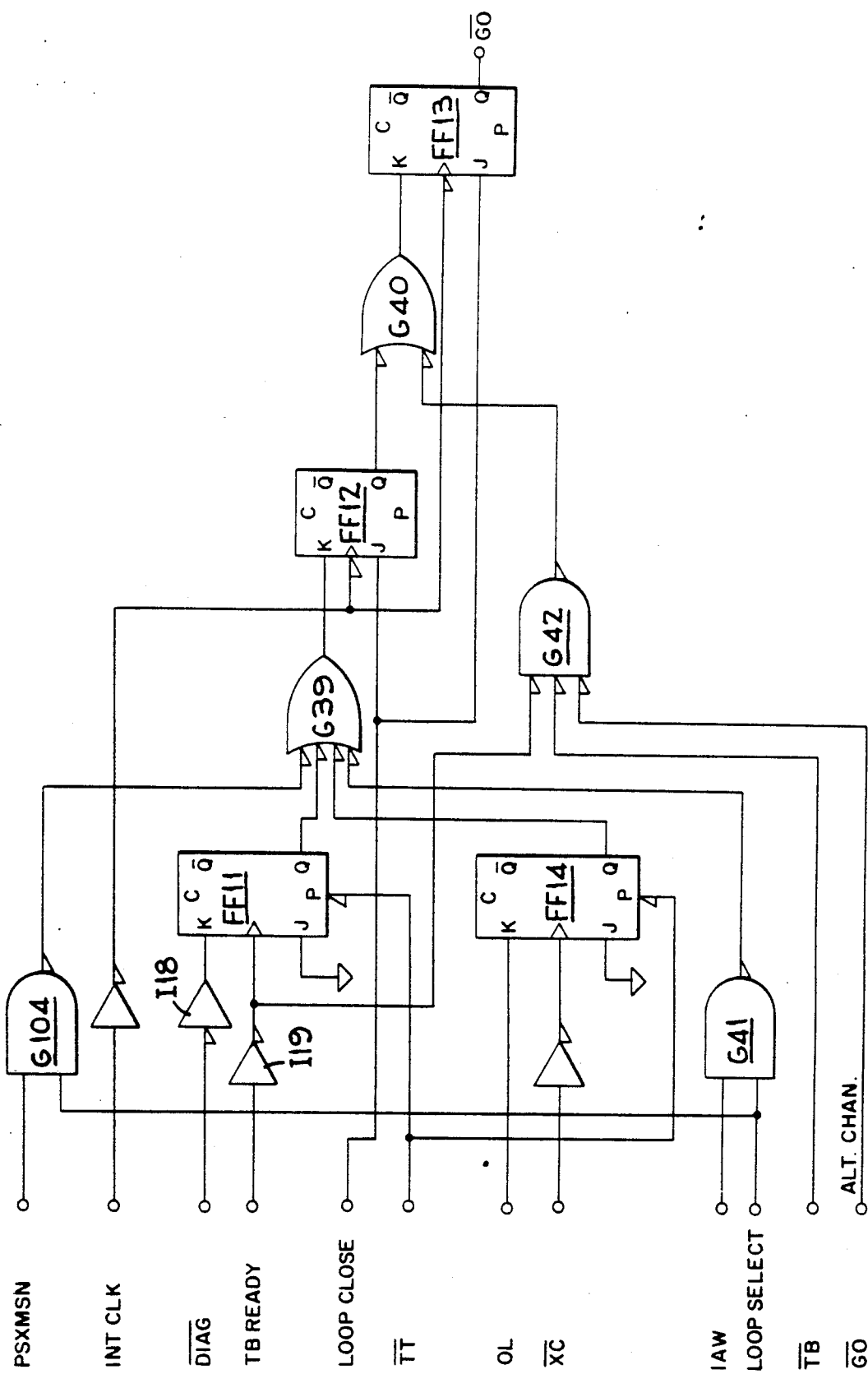

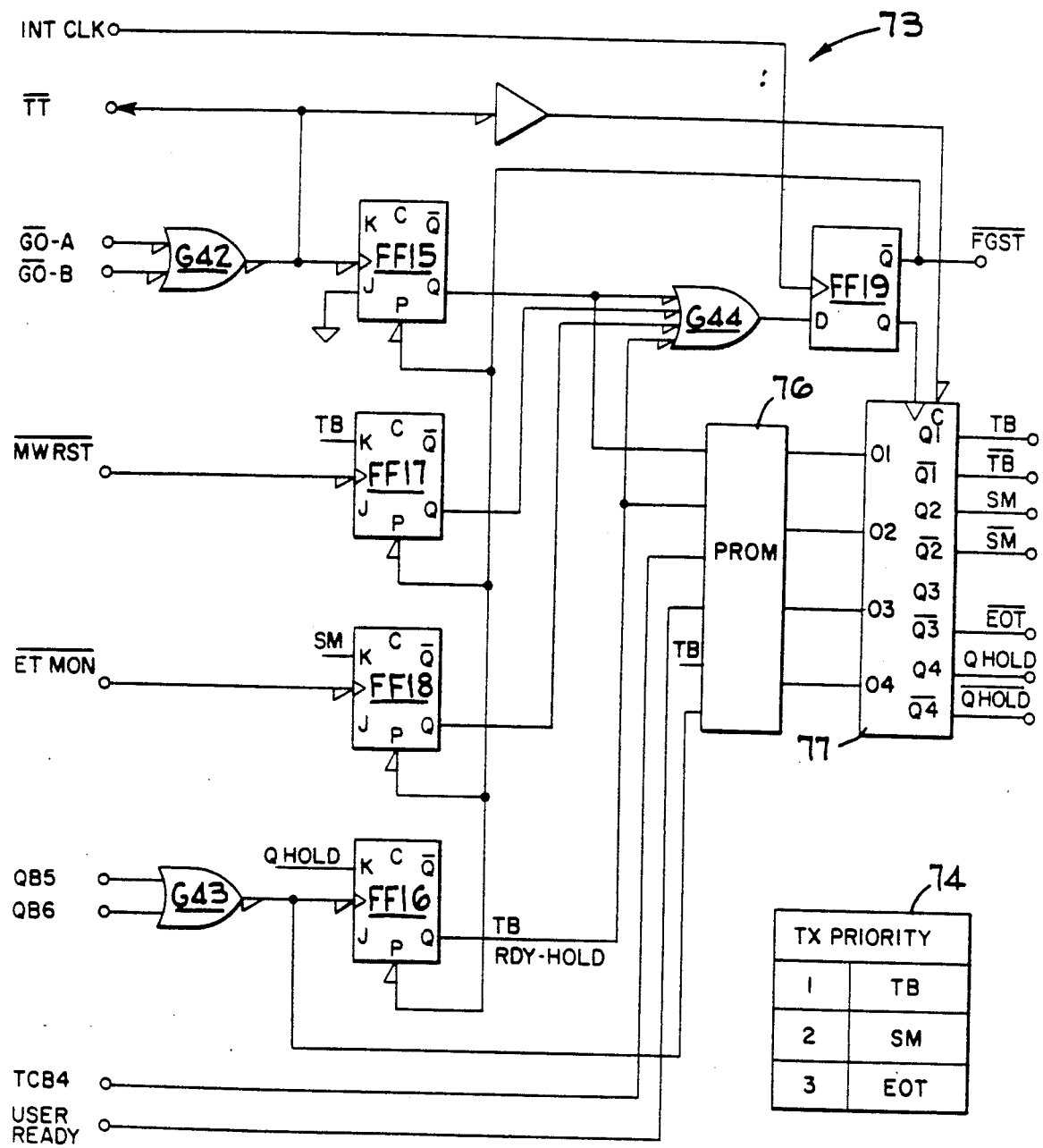
FIG_31

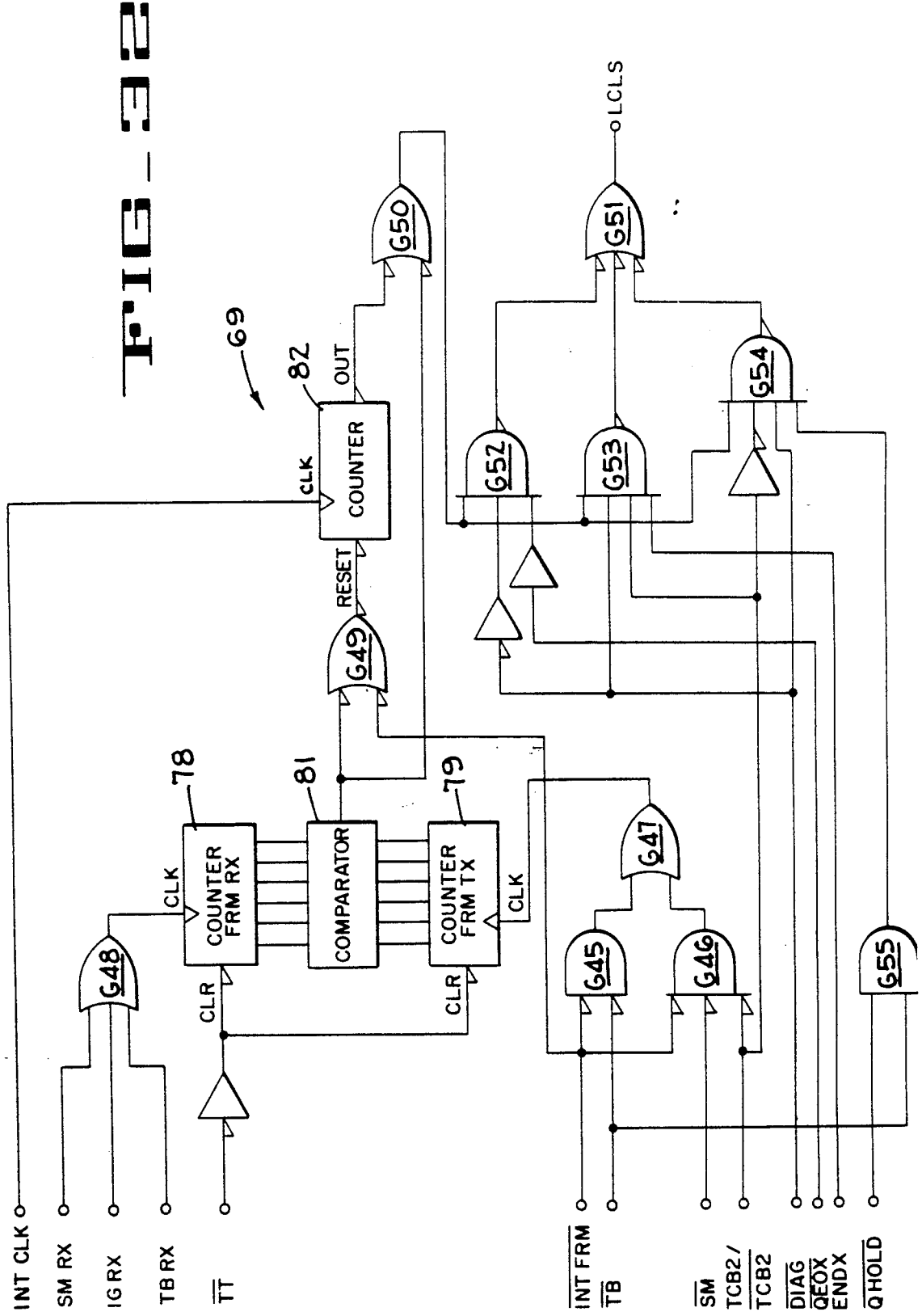
FIG_32

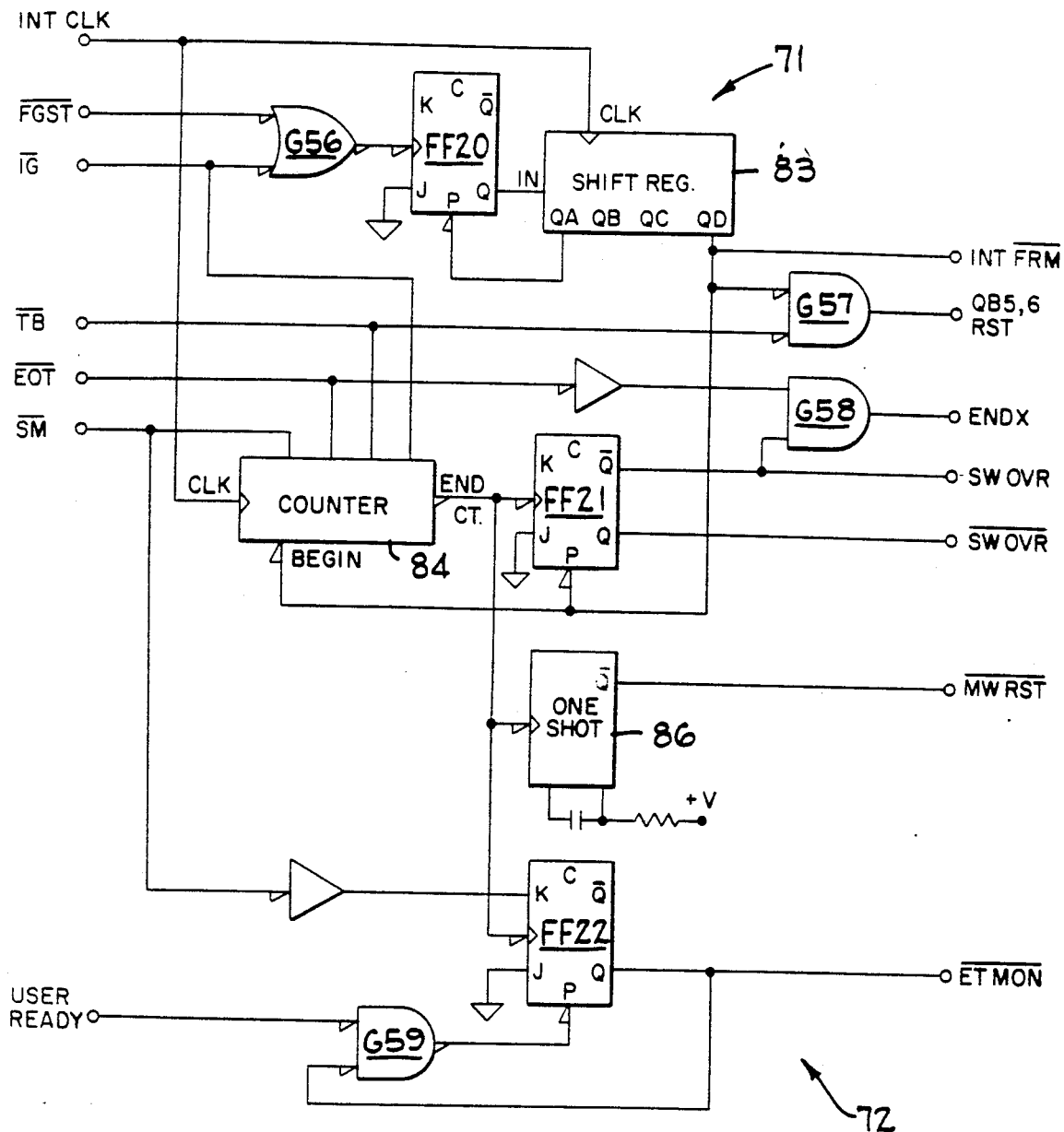
FIG_33

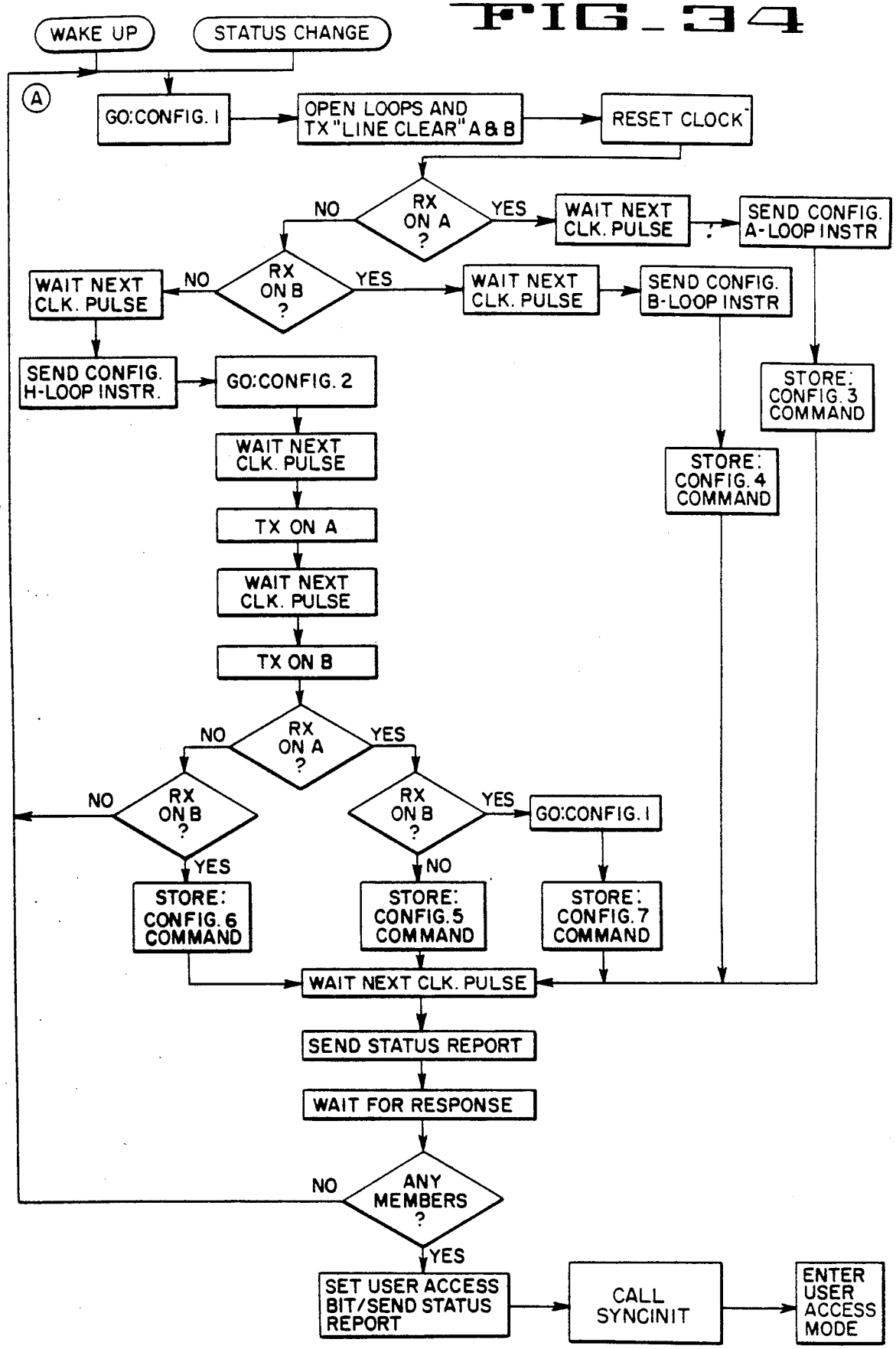
FIG_34

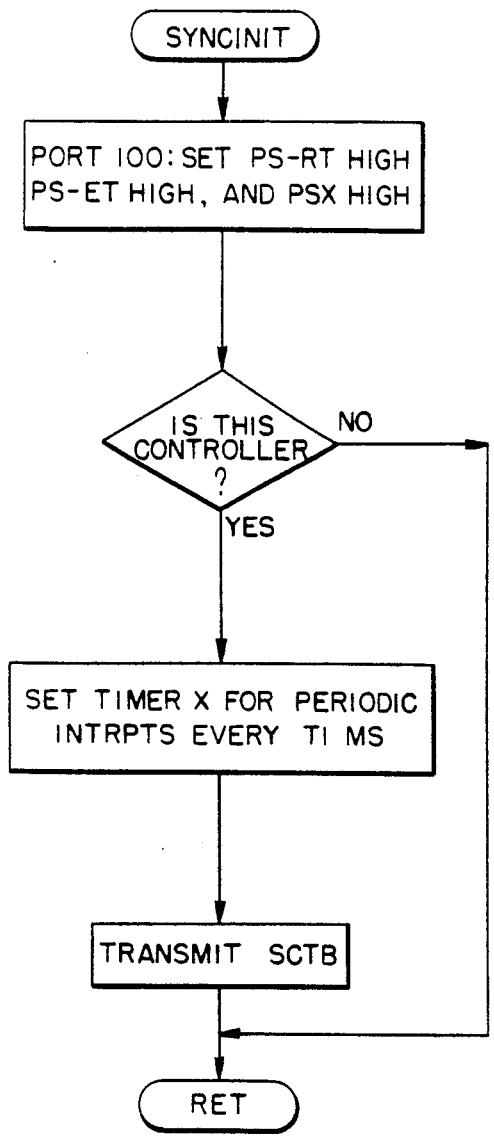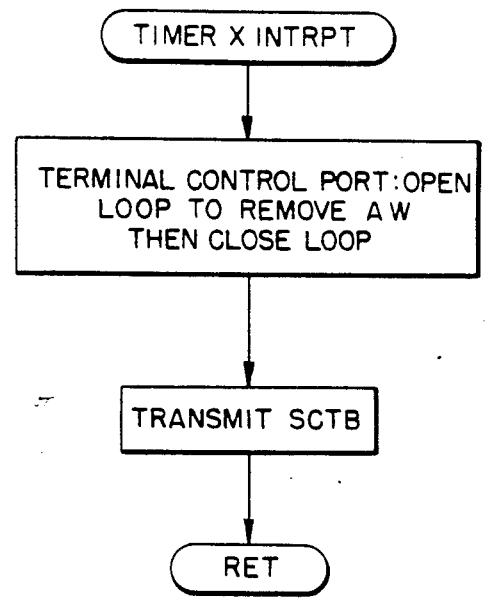

FIG_38
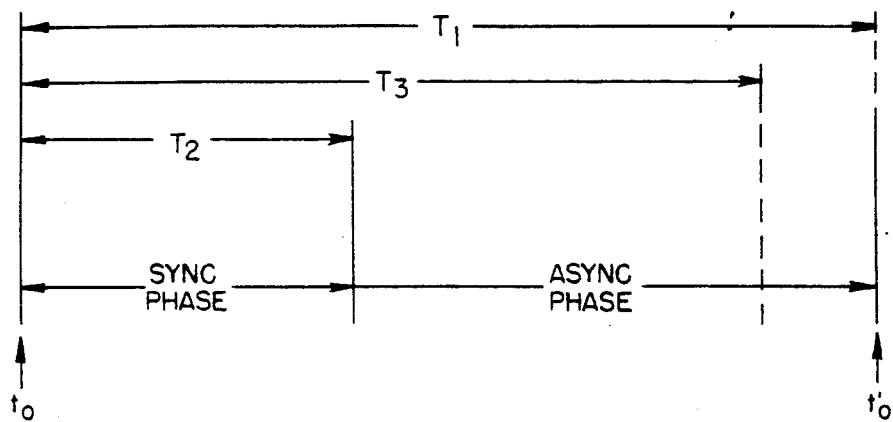
FIG_39
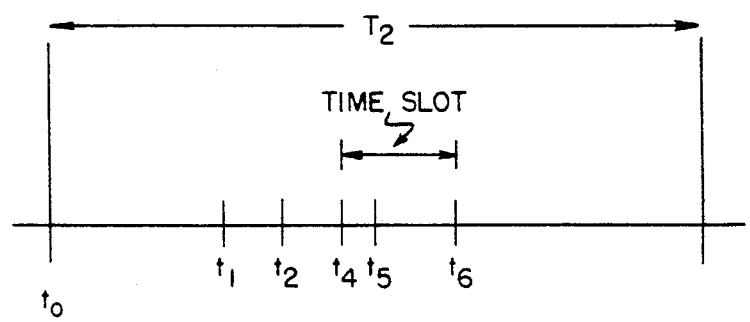

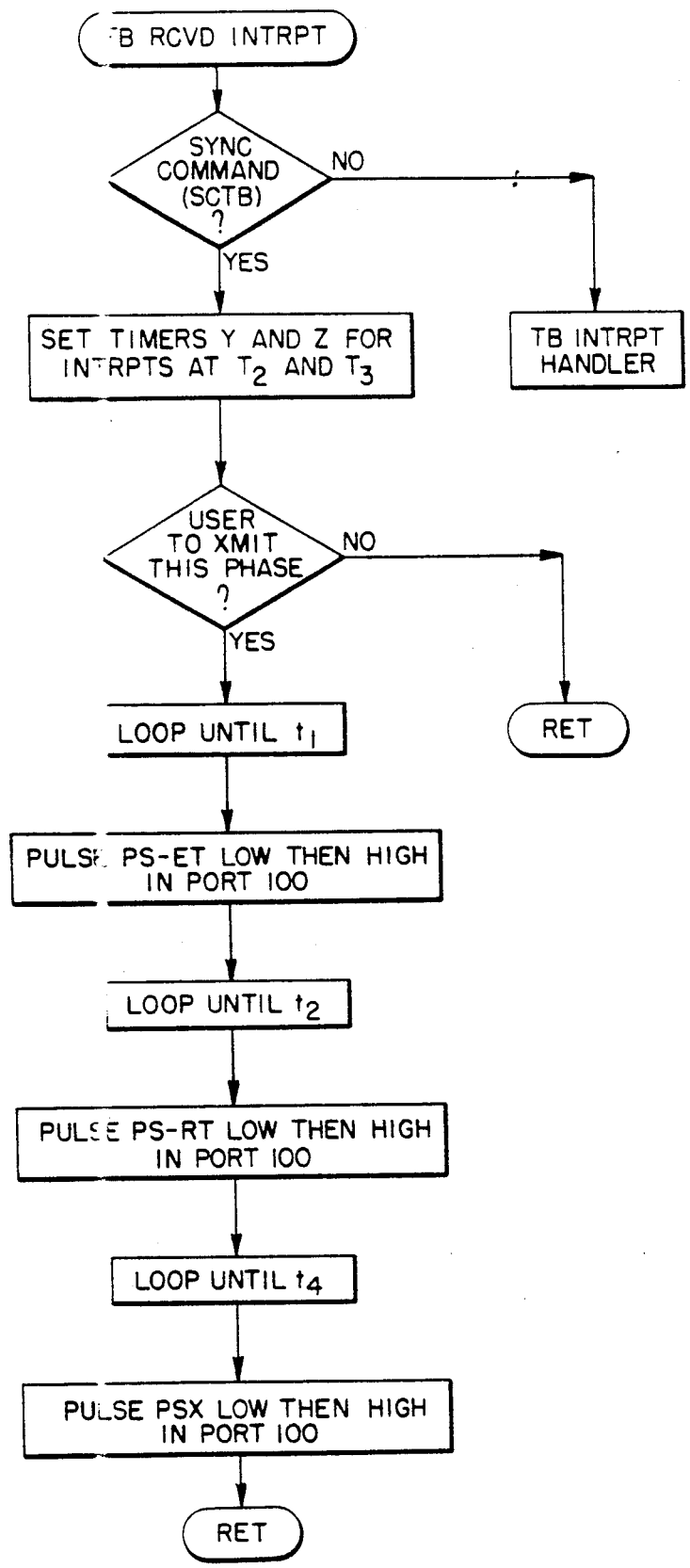
FIG_40

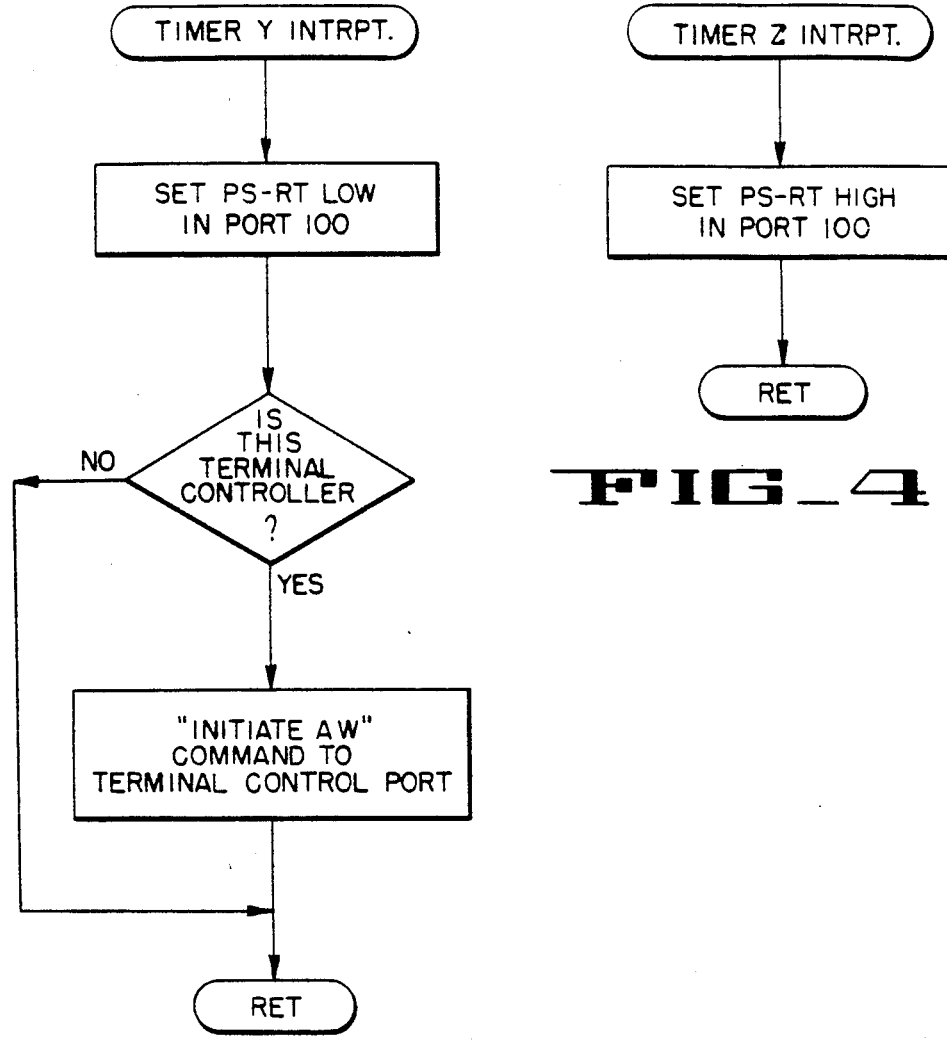
FIG_41
FIG_42

SYNCHRONOUS/ASYNCHRONOUS COMMUNICATION SYSTEM

BACKGROUND OF THE INVENTION

1. Field of the Invention

The present invention pertains to data bus systems for transmitting digital information between a plurality of interconnected and serially arranged terminals, and more particularly it pertains to data buses of the active type wherein each terminal receives data from a data source or from another terminal and transmits or retransmits the data to a different terminal in the system.

2. Description of the Prior Art

Conventional data distribution systems are characterized by system construction wherein all data sources and all data sinks are directly wired to a central processing unit, or wherein switchboards function to distribute messages from and to the appropriate data sources and data sinks. The conventional data distribution systems require enormous amounts of cabling stretched over long distances and are therefore costly to install, difficult to repair, and inflexible to change.

There are two basic types of data buses in use in large scale distribution systems at the present time, namely passive buses and active buses. The more typical passive bus systems employ transmitters, or drivers, and receivers that couple passively to a transmission line. An active bus, on the other hand, employs active terminals. Each terminal receives data from another terminal in the system and then retransmits the data or transmits new data to a third terminal in the system. Each unidirectional link between terminals in an active bus system therefore comprises a complete transmission element, whereas in the passive data bus systems, the entire length of transmission line comprises a single bidirectional transmission element. As a consequence of this fundamental difference, a passive data bus system is more vulnerable to reflections than is an active data bus system. Indeed, a passive bus can become totally disabled by a single break in the transmission line causing reflections to propagate throughout the entire system.

Active data bus systems are most commonly arranged in a closed loop or ring structure. With such a structure, a terminal that is not introducing fresh data into the loop will serve to relay its received data to the next adjacent terminal downstream. If all fresh data is to be allowed to traverse the entire loop, only one terminal at a time can be permitted to introduce fresh data—while all other terminals cooperatively serve as relay terminals. Therefore, in a system wherein more than one terminal may be capable of introducing fresh data, traffic control means must be employed to coordinate the actions of the various terminals in order to ensure that no two terminals attempt to introduce fresh data simultaneously.

Prior art solutions to this problem of traffic control have followed two different approaches. These two traffic control techniques may be termed synchronous traffic control and asynchronous traffic control. Synchronous traffic control employs a traffic "controller" which periodically originates a transmission to serve as a timing reference. Upon reception of this transmission, an individual terminal will initialize timing means which permit the terminal to identify particular "time slots" during which it may introduce fresh data into the loop. At all times other than its assigned time slots, a terminal will relay data received from its nearest upstream neighbor to its nearest downstream neighbor. By programming the timing means differently at the different terminals, one can ensure that no more than one terminal will introduce fresh data into the loop at any given time. With synchronous traffic control, a terminal's ability to introduce fresh data will thus arise periodically in synchronism with the transmissions issued by the system traffic controller. An example of such synchronous traffic control may be found in copending U.S. patent application Ser. No. 045,799 filed June 5, 1979.

Asynchronous traffic control permits a terminal to transmit at random times provided that its transmission does not interfere with data introduced by another terminal. It is an inherent characteristic of asynchronous control that a terminal desiring to introduce data when the system is "busy" will wait until the system is "free". There are at least three prior art techniques presently being employed to accomplish this end.

One asynchronous control technique utilizes a traffic controller to poll the various terminals for potential bus traffic and to grant bus access sequentially on the basis of need and/or priority. A second technique, known as CSMA control ("carrier sense, multiple access") relies on each terminal's ability to listen to the system and to not attempt to introduce data when the system is in use. In the occasional instance when two terminals "collide", i.e., attempt to access the bus simultaneously, the CSMA technique provides that the colliding terminals both cease transmission for random time periods and then try again.

A third asynchronous control technique utilizes a system availability signal known as a "token" or "access window" to convey transmission permission from terminal to terminal around the loop. An example of such an asynchronous traffic control technique may be found in copending U.S. patent application Ser. No. 302,939 filed Sept. 16, 1981.

Digital data may be classified as being either periodic or aperiodic. Periodic data is data which arises at regularly spaced time intervals while aperiodic data is data arising at random times. A common example of the former is a sequence of digital representations of an analog or synchro signal that is being sampled at regular intervals. A common example of aperiodic data is the data arising at the output of a digital computer or of a computer peripheral device such as a CRT terminal or magnetic tape unit.

Either type of data, periodic or aperiodic, may be communicated on a data bus employing either method of traffic control, synchronous or asynchronous. However, if sources of periodic data can be synchronized to the bus so that their data periods coincide with the time-slot periods of the terminals which introduce their data to the bus, synchronous control will be highly advantageous. In particular, it will provide precise timing accuracy of the received data as well as permit very efficient utilization of available bus time. When synchronous control is used for communicating aperiodic data, however, time-slots must be assigned to terminals on the basis of statistical worst-case data load. This requirement invariably results in inefficient use of bus time since many time slots will be transmitted "empty" under average loading conditions.

Asynchronous traffic control, on the other hand, permits much better utilization of bus time for communication of aperiodic data. With periodic data, however, the unpredictable time spend waiting for the bus to be "free" introduces a random error known as "jitter" into the arrival times of the data. The severity of this timing error increases as the bus loading increases and can seriously degrade a reconstructed analog or synchro signal synthesized from digital samples that have been communicated over an asynchronously controlled data bus.

Although prior art data buses have employed one or the other of the two traffic control techniques described above, it is clear that neither technique is ideally suited to controlling a bus in which the communicated data may include both periodic and aperiodic types.

SUMMARY OF THE INVENTION

A synchronous/asynchronous data communication system has been devised wherein a plurality of user data sources may originate and a plurality of user data sinks may receive synchronous data occurring at predetermined times and asynchronous data occurring at random times. A plurality of multiplex terminals are provided in communication with ones of the system user data sources and sinks. A transmitter and a receiver are provided in each of the multiplex terminals. A message conveying path communicates the transmitter in one terminal with the receiver in an adjacent terminal, whereby the terminals are serially coupled. Means is provided in each terminal for accepting synchronous and asynchronous data from the receiver for transfer to user data sinks in communication therewith. In each terminal means is found for transferring synchronous and asynchronous data from the user data sources in communication with the terminal to the terminal transmitter. Further, means is interposed between the user data sources and the transmitter for passing synchronous data only during a first predetermined period and for passing asynchronous data only during a second predetermined period. Means is present for operating the means for passing data to provide periodic cycles during which reception and transmission of user data is accomplished at predetermined times and at random times.

BRIEF DESCRIPTION OF THE DRAWINGS

FIG. 1 is a block diagram of a single-loop data bus system utilizing the principles of the present invention.

FIG. 2 is a simplified block diagram of one of the multiplex terminals of FIG. 1.

FIG. 3 is a detailed block diagram of one of the multiplex terminals of FIG. 1.

FIG. 4 is a timing diagram showing the terminal broadcast format utilized by the present invention.

FIG. 5 is a timing diagram showing the start of message format utilized by the present invention.

FIG. 6 is a timing diagram showing the intramessage gap format utilized by the present invention.

FIG. 7 is a timing diagram showing the end of transmission message format utilized by the present invention. FIG. 8 is a timing diagram showing the modified end of transmission message format utilized by the present invention.

FIG. 9 is a block diagram of the present invention employing redundant path architecture.

FIG. 10 is a block diagram of a multiplex terminal employed in the system of FIG. 9 configured in a diagnostic mode.

FIG. 11 is a block diagram of a multiplex terminal employed in the system of FIG. 9 configured in another diagnostic mode.

FIG. 12 is a block diagram of a multiplex terminal employed in the system of FIG. 9 configured in a user access mode.

FIG. 13 is a block diagram of a multiplex terminal employed in the system of FIG. 9 configured in another user access mode.

FIG. 14 is a block diagram of a multiplex terminal employed in the system of FIG. 9 configured in still another user access mode.

FIG. 15 is a block diagram of a multiplex terminal employed in the system of FIG. 9 configured in yet another user access mode.

FIG. 16 is a block diagram of a multiplex terminal employed in the system of FIG. 9 configured in still another user access mode.

FIG. 17 is a block diagram showing several of the multiplex terminals employed in the system of FIG. 9 configured in the mode of FIG. 11.

FIG. 18 is a detailed block diagram of a multiplex terminal employed in the system of FIG. 9.

FIG. 19 is a block diagram of the transmit/receive (T/R) module included in the multiplex terminal of FIG. 18.

FIG. 20A is a schematic diagram of the terminal control port in the multiplex terminal of FIG. 18.

FIG. 20B is a schematic diagram of the terminal status port shown in the multiplex terminal of FIG. 18.

FIG. 21 is a schematic diagram of the function decoder in the multiplex terminal 18.

FIG. 22 is a schematic diagram of the receiver user interface logic in the multiplex terminal of FIG. 18.

FIG. 23 is a schematic diagram of the terminal broadcast transmit register utilized in the multiplex terminal of FIG. 18.

FIG. 24 is a schematic diagram of the access window capture logic circuit utilized in the multiplex terminal of FIG. 18.

FIG. 25A is a schematic diagram of the relay/access multiplexer logic circuit utilized in the multiplex terminal of FIG. 18.

FIG. 25B is a timing diagram showing the signal sequence in the circuit of FIG. 25A.

FIG. 26 is a schematic diagram of the user/supervisory data multiplexers utilized in the multiplex terminal of FIG. 18.

FIG. 27 is a schematic diagram of the transmit broadcast receive registers utilized in the multiplex terminal of FIG. 18.

FIG. 28C is a schematic diagram of the synchronous adapter circuit coupled to the circuit of FIG. 28A.

FIG. 28D is a timing diagram showing the signal sequence in the circuit of FIG. 28C in one mode of operation.

FIG. 28E is a timing diagram showing the signal sequence in the circuit of FIG. 28C in another mode of operation.

FIG. 29 is a block diagram of the transmit logic circuitry utilized in the multiplex terminal of FIG. 18.

FIG. 30 is a schematic diagram of the loop access logic circuits of FIG. 29.

FIG. 31 is a schematic diagram of the transmit sequence logic circuit of FIG. 29.

FIG. 32 is a schematic diagram of the loop close logic circuit of FIG. 29.

FIG. 33 is a schematic diagram of the framing signal generator and the supervisory data counter logic circuits of FIG. 29.

FIG. 34 is a flow chart of the program operating the multiplex terminal of FIG. 18 as a diagnostic controller.

FIG. 36 is a flow chart of the subroutine SYNCINIT used in the program operating the multiplex terminal of FIG. 18.

FIG. 37 is a flow chart of the timer X interrupt handler routine used in the present invention.

FIG. 38 is a timing diagram depicting a complete synchronous/asynchronous cycle in the present invention.

FIG. 39 is a timing diagram depicting a single synchronous phase from the diagram of FIG. 38.

FIG. 40 is a flow chart of the TB received interrupt routine used in the present invention.

FIG. 41 is a flow chart of the timer Y interrupt handler routine used in the present invention.

FIG. 42 is a flow chart of the timer Z interrupt handler routine used in the present invention.

DESCRIPTION OF THE PREFERRED EMBODIMENTS

Figure 28A:
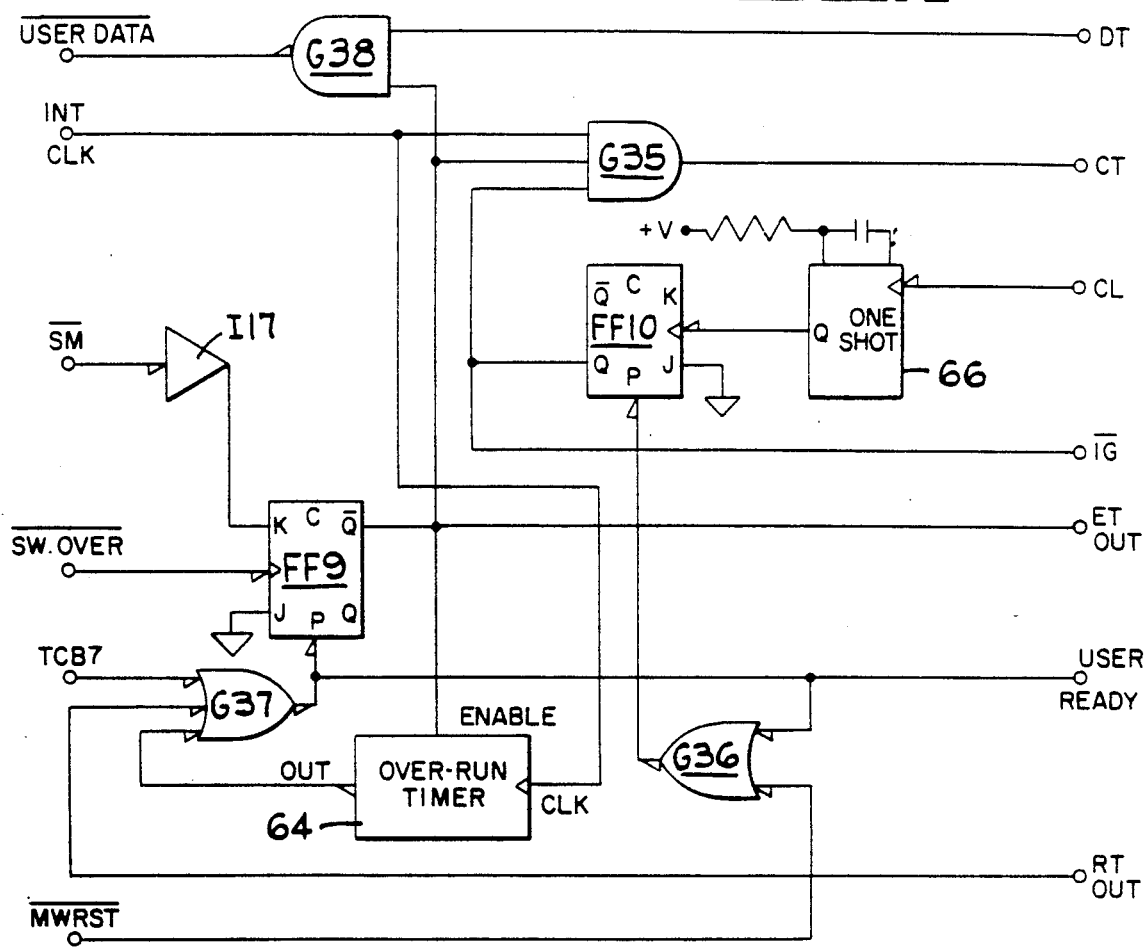
FIG. 28A is a schematic diagram of the terminal user interface logic circuit utilized in the multiplex terminal of FIG. 18.

The basic configuration of the data communication system of the present invention is illustrated in FIG. 1 of the drawings. In this Figure, four multiplex terminals MT 1 through MT 4 are shown to be serially interconnected by transmission medium segments 10 to form a closed loop. Segments 10 may be conventional rf cables or may be optical fiber cables. Their exact composition will be dictated by the format of the modulated data signals conducted from one multiplex terminal to another.

FIG. 1 also shows various users, labeled USER 1 through USER n, interfaced to terminals MT2 and MT3. As seen in FIG. 1, USER 1 and USER n serve as both sources of data and sinks of data while USER 2 serves only as a data source and USERs 3 and 4 serve only as data sinks. Thus, USERs can be either data sources, data sinks or both. FIG. 1 also shows that a terminal may service no USERs at all as evidenced by terminals MT1 and MT4, but may merely serve to relay data from one terminal in the loop to another terminal in the loop until such time as USERs are interfaced thereto.

FIG. 2 shows a simplified block diagram of multiplex terminal MT3. This terminal is exemplary of all the multiplex terminals in the system. The circuitry within the terminal can be divided broadly into three parts. The T/R (transmit/receive) circuitry 12 communicates with other T/R circuitry in adjacent terminals by means of modulated data signals received and transmitted over transmission medium segments 10. The T/R circuitry transfers data signals to and from bus control circuitry 13. Circuitry 13 communicates with signal conditioning and multiplexer circuitry 14 which, in turn, communicates with individual data sources (USERs 1 and 2) and with individual data sinks (USERs 1 and 3).

FIG. 3 shows a more detailed block diagram of a multiplex terminal embodying a single, non-redundant, data channel according to the present invention. For clarity, data signal paths are shown as solid lines in FIG. 3 while control signals are indicated by broken lines.

The correspondence between elements of the simplified block diagram of FIG. 2 and the more detailed block diagram of FIG. 3 is shown from the following.

The T/R circuitry 12 of FIG. 2 comprises a separate data receiver (RX) and data transmitter (TX in FIG. 3. These units communicate with like data transmitters and data receivers in adjacent multiplex terminals (MT) by means of appropriately modulated data signals unidirectionally conducted over transmission medium segments 10. Control circuitry 13 of FIG. 2 comprises CPU 11, TLU TX (terminal logic unit transmit) logic 17, terminal control port 18, access window capture logic 19, and terminal status port 20 seen in FIG. 3. Signal conditioning and multiplexing circuitry 14 of FIG. 2 comprises a relay/access multiplexer 16, a terminal broadcast transmit register 21, a user/supervisory data multiplexer 22, transmit user interface logic 23, a function decoder 24, a terminal broadcast receive register 26 and receive user interface logic 27, also seen in FIG. 3. Associated with the transmit user interface logic 23 is a synchronous adapter 23a which is positioned between the RT and ET interface lines connected to transmit user interface logic 23 and the USER RT and USER ET interface lines connected to a user data source.

A user data source interfaces to the terminal by means of five lines: USER RT and USER ET, connected to synchronous adaptor 23a; and CT, DT and DI, connected directly to transmit user interface logic 23. For simplicity of explanation, only one user data source is assumed interfaced to the terminal. However, it is obvious that more than one source can be accommodated by means of standard multiplexing of these five interface lines. Such multiplexing techniques are well known and will not be discussed further herein.

The T/R module 12 of FIG. 3 may be of the type disclosed in U.S. Pat. No. 4,038,494 issued to Miller et al on July 26, 1977. The data receiver described therein is capable of receiving a Manchester coded bi-phase signal from a transmission medium segment 10 and demodulating it into a separate clock signal, a binary data signal in phase with the clock signal, and a synchronizing frame signal identifying the beginning of any contiguous data signal sequence. The data transmitter described therein accepts three such signals, combining them into a single coded bi-phase signal and transmitting the coded signal over another transmission medium segment 10 to a distant point. Additional output signals are provided by the T/R module to indicate contained oscillator status and channel status as may be seen by referring to FIG. 19 of the drawings. Further details of the construction and operation of the T/R module may be obtained from the aforementioned U.S. patent which details are included herein by reference.

The relay/access multiplexer 16 in FIG. 3 receives clock, data, and frame signals from either the data receiver (RX) output of T/R module 12 or from the output of user/supervisory data multiplexer 22. Relay/access multiplexer 16, in turn, transfers the three signals to the data transmitter (TX) input of T/R module 12. Accordingly, the relay/access multiplexer can exist in either of two configurations. In a relay submode or configuration, clock, data, and frame signals are routed from the RX output to the TX input of the T/R module 12 so that the terminal serves as a repeater. The data is also taken into the terminal for dissemination within the terminal as well as to data sinks interfaced to the terminal. This is the most common configuration. Under influence of a control signal (GO) outputed by TLU TX logic 17, the relay/access multiplexer 16 assumes a transmit access submode or configuration wherein locally generated signals are routed from the user/supervisory data multiplexer 22 through relay/access multiplexer 16 to the TX input of T/R unit 12. After the locally generated signals have been transferred, TLU TX logic 17 returns the relay/access multiplexer 16 to the relay configuration so that the terminal can again serve as a repeater. The precise means whereby relay/access multiplexer 16 is efficiently controlled by TLU TX logic 17 to assume the transmit access configuration and to subsequently return to the relay configuration without interferring with transmission of other terminals and without introducing extraneous "dead time" is disclosed fully hereinafter.

The element shown generally as CPU 11 in FIG. 3 includes a terminal control microprocessor along with its associated program read only memory and scratch pad random access memory. Such microprocessor circuitry is well known and will not be detailed further herein. CPU 11 controls certain terminal operations by outputting a control word to terminal control port 18. It further monitors certain terminal conditions by inputting a status word from terminal status port 20. In addition, CPU 11 is capable of communicating with other like CPU's at other terminals by transmitting and receiving 16 bit supervisory messages called terminal broadcasts (TB's). Such messages outputted by CPU 11 are stored in terminal broadcasts TX register 21 prior to being transmitted throughout the system. TB messages received from the system cause a program interrupt to CPU 11, the TB messages being temporarily stored in terminal broadcast receive register 26 prior to being inputted by CPU 11. From FIG. 3 it may be seen that CPU 11 serves as both a data source and a data sink for TB messages. It may further be seen that CPU 11 is capable of receiving its own TB messages and therefore capable of testing the continuity of the loop. CPU 11 also controls operation of the synchronous adaptor 23a by acting upon a control port indicated at 100 in FIG. 3.

FIG. 3 discloses that the RX output of T/R module 12 is distributed to access window capture logic 19, function decoder 24, terminal broadcast register 26, and receiver user interface logic 27 in addition to relay/access multiplexer 16. Consequently, the first four elements named continuously receive clock, data and frame signals regardless of the configurational state of the last named element. Access window capture logic 19 is instrumental in controlling relay/access multiplexer 16 and its exact function is disclosed hereinafter. As stated above, terminal broadcast receive register 26 serves as a receptacle for terminal broadcast messages prior to their being inputted by CPU 11. Receiver interface logic 27 serves to transfer user generated messages to appropriate user data sinks interfaced to the multiplex terminal. Function decoder 24 is responsive to a function code (FC) comprising the two data signal bits immediately following every frame signal as hereinafter described. The function decoder 24 provides four control signal outputs denoted TB (terminal broadcast), SM (start of message), IG (intramessage gap) and EOT (end of transmission).

The detailed operation of the function decoder 24 of FIG. 3 will now be described. The signals at the input of function decoder 24 are disclosed in the phasing diagrams of FIGS. 4 through 8. The clock signal 28 is a repetitive square wave providing a timing reference. The period of this waveform may, for example, be 100 nanoseconds. A frame signal 29 is seen to comprise a single negative pulse coincident with one cycle of the clock signal in all cases. The two following bits comprise the function code FC.

FIG. 4 discloses the format for a terminal broadcast (TB) message. Reception of FC bits that are zero-zero as at 32, signifies that a TB message is about to follow. Accordingly a TB control signal responsive to function zero-zero is sent by function decoder 24 to terminal broadcast receive register 26 activating the latter to receive and store the next 16 bits of TB data 31, whereby the data may subsequently be called up by the CPU 11. Note that the TB control signal is also sent to the receiver user interface logic 27. This is a disabling signal that prevents the TB data from being transferred to a user data sink.

FIG. 5 discloses the SM format identifying the beginning of a user generated message. The appropriate FC bits are zero-one as seen at 34. Perception of this code indicates that a message destined for a user data sink is about to follow. Accordingly, an enabling signal responsive to function code 34 is sent by function decoder 24 to the receiver user interface logic 27. The actual message 33 can be of any length, as mentioned before, and is presumed to contain address codes, where appropriate, for interpretation by user data sinks. The principles of addressing messages and decoding the address codes for purposes of routing the messages through appropriate sinks are well known and are not considered a part of the invention disclosed herein.

If a user data sink has indicated that it is ready to receive data by asserting the RR line at the receiver user interface logic 27 of FIG. 3, the arrival of the SM control signal at the receiver user interface logic causes the ER line to become active and further causes received clock and data signals to be transferred to the user data sink on output lines CR and DR respectively.

FIG. 6 discloses the IG format identifying an intramessage gap in a user generated message. The purpose of this function code is to provide a time interval, if needed, to permit a user data sink to switch buffers or to transfer data from a holding register before continuing with the remainder of the message. Upon reception of function code one-zero, as shown at 36, a disabling IG signal is sent from function decoder 24 to receiver user interface logic 27. This signal temporarily disables transfer to user data sinks and then re-enables such transfer to permit transfer of subsequent user data 17 (FIG. 6).

FIG. 7 discloses the EOT format identifying the end of a terminal transmission. As seen at 38, the appropriate function code bits are one-one. Reception of the EOT digital one-one function code causes an EOT control signal to be sent from function decoder 24 to receiver user interface logic 27 disabling the latter for transfer of data signals to user data sinks until such time as an SM function code is again received. Accordingly, receiver user interface logic 27 responds to the EOT signal by disabling its CR and DR lines and bringing its ER signal to the inactive state.

In FIG. 3 it may be seen that the EOT control signal is also sent to access window capture logic 19. This signal is used in the highly efficient asynchronous user access mode of terminal operation wherein bus access for asynchronous user data sources is controlled by hardware without intervention by CPU 11. During the synchronous phase of the user access mode, bus access for synchronous user data sources is totally under control of CPU 11. In addition to asynchronous and synchronous user access mode operation, the terminal is capable of operating in the diagnostic mode wherein user data sources are disabled and the various CPUs intercommunicate under CPU control. Details of the asynchronous user access mode of terminal operation will now be described.

Upon entering the user access mode, CPU 11 outputs an appropriate control word to terminal control port 18 which so informs TLU TX logic 17 and enables access window capture logic 19 and transmit user interface logic 23. In addition, for asynchronous operation, CPU 11 acts upon SA control port 100 to properly condition synchronous adaptor 23a. With this conditioning, synchronous adaptor 23a becomes transparent so that a USER RT input is passed through to the RT output and an ET input is passed through to the USER ET output. During the asynchronous phase, CPU 11 takes no further action and bus access for asynchronous user data sources is controlled totally by TLU TX logic 17, access window capture logic 19 and relay/access multiplexer 16.

With the terminal disposed in the user access mode, access window capture logic 19 is enabled. Further, if locally generated data is available for transmission, a data ready signal is provided by TLU TX logic 17 to access window capture logic 19. Under these combined conditions, access window capture logic and relay/access multiplexer are ready to "capture" the next "access window". FIG. 7 discloses that an access window 39 comprises the bit immediately after an EOT function code 38. This bit set to "one" signifies that the system is available for transmission.

The arrival of an EOT control signal from function decoder 24 causes access window capture logic 19 to send an access window capture signal to relay/access multiplexer 16. In response to this signal, relay/access multiplexer resets the access window bit to zero as data signals are routed from RX output to TX input. Thus, regardless of the binary state of the received access window bit, it is retransmitted as a zero as is shown in FIG. 8. Note that because the EOT signal arrives before the access window bit, no data delay need be introduced to accomplish the above described action.

The access window bit is retransmitted as a zero whether or not the system is actually available. This action prevents any down-stream terminal that may possess locally generated data from gaining access to the bus. The logical justification for this procedure may be explained as follows. If the received access window bit is zero, it indicates that a preceding terminal has already gained access. If it is one, the subject terminal will now gain access. In either case, the retransmitted access window bit should be zero to prevent any down-stream terminals from gaining access and thus interferring with data flow.

Simultaneously with transmission of the zero bit, relay/access multiplexer 16 examines the actual received bit. If a one, an OL (FIGS. 25A and 30) signal is sent to the TLU TX logic 17 signifying that an access window has been "captured". TLU TX logic 17 responds with a $\overline{GO}$ signal (FIG. 30) which controls relay/access multiplexer 16, causing it to change from a relay configuration to a transmit access configuration on the next clock pulse.

During the period of time that relay/access multiplexer 16 is disposed in a transmit access configuration, sequencing of locally generated data signals to the TX input is controlled by TLU TX logic 17. If CPU 11, by means of terminal control 18, indicates to TLU TX logic 17 that a TB is ready for transmission, TLU TX logic 17 first commands user/supervisory data multiplexer 22 to select a TB message. Accordingly, user/supervisory data multiplexer 22 generates a frame signal and a TB function code (zero-zero) and then transfers same to TX input. Following this, the user/supervisory data multiplexer routes the 16 bit TB message from the terminal broadcast transmit register 21 to TX input.

An asynchronous user data source with data to transmit will assert its USER RT line which will pass through the synchronous adaptor 23a to the RT input of transmit user interface logic 23. If transmit user interface logic 23 indicates to TLU TX logic 17 that its RT line is being asserted, an appropriate "user select" command is next sent to the user/supervisory data multiplexer 22 by TLU TX logic 17. In response, user/supervisory data multiplexer 22 generates a frame signal followed by either an SM or IG function code and transfers such signals to the TX input. Following the function code, an "enable interface" command is sent to transmit user/interface logic 23. The interface logic responds by sending an ET signal to synchronous adaptor 23a along with a ten Mhz transmit clock signal CT to the user. The ET signal is passed on to the user as a USER ET signal. The USER ET signal together with the CT signal indicates to the user data source that the system is available for transmission. The user data source, in turn, returns an input clock signal CI along with a transmit data signal DT in phase with it. These signals are passed through both the transmit user interface logic 23 and the user/supervisory data multiplexer 22 to the TX input for transmission.

When the user data source returns the USER RT line to the inactive condition, transmit user interface logic 23 terminates the transfer of user data and clock and returns the ET line to the inactive state. TLU TX logic 17 then commands user/supervisory data multiplexer to terminate the transmission. With no user data available, this occurs immediately after the 16 bit TB messages transfer to TX input. Upon this command, user/supervisory multiplexer 22 generates a frame signal followed by three "one" data bits in succession. This action appends the transmission with an EOT function code followed by an access window bit set to convey permission to another terminal to asynchronously access the bus.

After the access window bit has been transferred to TX input, relay/access multiplexer 16 must return to a relay configuration. Ideally, this should occur before the access window traverses the loop so that the returning access window is relayed by the terminal that introduced it and is thus permitted to continue circulating until it is captured. Closing the loop too soon however could permit ambiguous data to circulate as well. An efficient means for returning the relay/access multiplexer to a relay configuration which permits the access window to circulate without permitting ambiguous data to circulate will now be described.

TLU TX logic 17 includes counting means, to be hereinafter described in greater detail, which compare the number of transmitted frame signals and the number of received frame signals excluding the one frame signal preceding the EOT function code and access window bit in both cases. After the access window bit has been transferred to TX input, TLU TX logic 17 commands relay/access multiplexer 16 to return to a relay configuration when the two numbers are equal. This insures that the last frame signal introduced, along with the EOT and access window bits which follow it, will be permitted to circulate until such time as the terminal accesses the bus. Only one frame signal will be circulating, specifically the one preceding the EOT function code and access window bit. Any additional data bits that happen to be trapped on the loop will also circulate but will be completely ignored by all terminals because the bits will not be preceded by a frame signal. In addition to the aforementioned counting means, TLU TX logic 17 includes a backup loop closing timing means that commands relay/access multiplexer 16 to return to a relay configuration if it is still in a transmit access configuration at a given time after all locally generated data has been transferred to TX input. This protective device insures that a terminal will return to the transmit access configuration even if frame signals are prevented from returning to their terminal of origin because of a broken loop.

Whenever the loop is closed by means of the backup timer during user access mode operation, a bit is set at terminal status port 20 and a program interrupt signal is communicated to CPU 11 so that the CPU can take corrective action if necessary. In addition to this loop close timer, terminal status port 11 monitors a user overrun timer that interrupts CPU 11 if a single user data source affirms the RT input line for too long a time period. The terminal status port also monitors an access window timer that interrupts CPU 11 if too much time elapses before receiving an access window and it further monitors channel status and oscillator status signals outputted by T/R module 12 as shown in FIG. 19 of the drawings. As disclosed hereinafter in reference to FIG. 20B, several of the signals monitored by terminal status port 20 cause program interrupts of CPU 11 whenever they change from one binary state to the other.

During the asynchronous phase of the user access mode, as disclosed hereinabove, any given terminal may gain access to the system by capturing an access window without any direct action being taken by its CPU 11. In contrast, the CPU 11 has total control of system access during the synchronous phase of the user access mode, and access windows are not used. Terminal operation during the synchronous phase of the user access mode will now be described.

The terminal enters the synchronous phase by virtue of CPU 11 outputting a particular signal to synchronous adaptor control port 100 which conditions the synchronous adaptor (SA) 23a for synchronous operation. The synchronous adaptor 23a is then no longer transparent.

At a predetermined time before the arrival of the time slot assigned to a synchronous data source interfaced to the terminal, CPU 11 again acts upon SA control port 100. This causes the USER ET interface line to assume a low logic state which serves as a "get ready" synchronizing signal to the user. The user responds by bringing his USER RT line to a low logic state to signify that his data is ready for transmission.

At a later predetermined time, CPU 11 again acts upon SA control port 100. This causes $\overline{PSXMSN}$ to assume a low logic state signaling to TLU TX logic that the synchronous transmission should begin. TLU TX logic 17, in turn, commands relay/access multiplexer 16 to assume a transmit access configuration and commands user/supervisory data multiplexer 22 to begin clocking the message header onto the bus.

At the appropriate time after the message header is transmitted, TLU TX logic 17 enables TX user interface logic 23. As a result, a 10 Mhz clock signal is sent to the user data source on line CT. The user responds by returning the clock signal on line CI in phase with serial data on line DT. When the user has finished transmission, he returns the USER RT line to a high state, and synchronous adaptor 23a acknowledges by returning USER ET to a logic high level. TLU TX logic 17 then terminates the transmission by returning relay/access multiplexer 16 to a data relay configuration without commanding user/supervisory data multiplexer to append an EOT message or access window. In addition, an ENDX signal is sent to synchronous adaptor 23a to signal the end of the transmission. Synchronous adaptor 23a responds by returning $\overline{PSXMSN}$ to a high logic level.

From the above descriptions of asynchronous and synchronous user access mode terminal operation, one can see a fundamental difference between an asynchronous data source and a synchronous data source. An asynchronous data source asserts its USER RT line first and then waits for the terminal to respond with a USER ET signal to signify that the system is available. A synchronous data source waits to first receive a synchronizing USER ET signal from the terminal and then responds by asserting its USER RT line when data is ready.

In addition to the synchronous and asynchronous phases of user access mode operation described hereinabove, the terminal is capable of operating in a diagnostic mode wherein all user data sources are disabled and the terminal CPUs communicate with one another by means of terminal broadcasts (TBs). The diagnostic mode of operation will now be described.

A multiplex terminal is disposed in the diagnostic mode by virtue of its CPU 11 outputting an appropriate control word to terminal control port 18 to so inform its TLU TX logic 17 and to disable both its access window capture logic 19 and its transmit user interface logic 23. With the terminal so disposed, no messages generated by local user data sources will be accepted for transmission. However, its CPU 11 can still transmit terminal broadcast messages by outputting them to the terminal broadcast transmit register 21 and then asserting the TB ready bit of terminal control port 18. Upon assertion of the last mentioned bit, TLU TX logic 17 responds immediately rather than waiting for an uncaptured access window as in the case of asynchronous user access mode operation. Relay/access multiplexer 16 is immediately commanded to assume a transmit access configuration and user/supervisory data multiplexer 22 is commanded to select the TB stored in the terminal broadcast register 21. User/supervisory data multiplexer 22 responds by generating a frame signal and a TB function code (zero-zero) and transferring the function code to TX input. Immediately after the TB function code, 16 data bits are transferred from terminal broadcast register 21 to TX input.

After the 16th bit of TB message is transferred to TX input, transmission is terminated without appending an EOT or access window bit. TLU TX logic 17 then commands relay/access multiplexer 16 to return to a relay configuration when means comparing the numbers of transmitted and received frame signals (described hereinafter in conjunction with FIGS. 29, 32 and 33) indicates that the two numbers are equal. Thus, no frame signals at all will be trapped on the closed loop. Any data bits that happen to be trapped will be ignored by receiving terminals. As with user access mode operation, backup timing means closes the loop if the counting means does not succeed in doing so within a specified time.

The synchronous/asynchronous data bus system disclosed herein is preferably installed with redundant path architecture. Such a system is shown schematically in FIG. 9 wherein a plurality of multiplex terminals, MT1 through MT4 are shown interfaced with USERs 1 through n. The transmission path 10 may be seen to consist of two paths conducting data in opposite directions. A path 10a designated channel A, conducts data in a clockwise direction, and a path 10b, designated channel B conducts data in a counterclockwise direction. Each channel therefore includes two data transmitters and two data receivers or a pair of transmitters and receivers serving each channel.

According to the present invention, a terminal control microprocessor can selectively pair different combinations of data transmitters and data receivers for disposing the terminal in a relay configuration. It can furthermore transmit and receive separate TB's on the two channels and can select either receiver and either transmitter for communicating user data. With this additional flexibility, the diagnostic mode subdivides into two submodes and the user access mode subdivides into five submodes when redundant path architecture is considered. The two diagnostic submodes are illustrated in FIGS. 10 and 11 and the five user access submodes are illustrated in FIGS. 12 through 16. These Figures all disclose a multiplex terminal comprising two T/R units 12a and 12b connected to transmission medium segments 10a and 10b, respectively. T/R unit 12a contains data receiver RX-A and data transmitter TX-A. T/R unit 12b contains data receiver RX-B and data transmitter TX-B. Two relay/access multiplexers 16 and 16b are also shown. The elements shown generally as TLU (terminal logic unit) 41 in FIGS. 10 through 16 comprise all of the logic elements of the multiplex terminal including its terminal control microprocessor.

FIG. 10 shows a block diagram of a multiplex terminal with redundant path architecture disposed in the linear coupled submode of the diagnostic mode. As has been disclosed, no user data is communicated with the terminal so disposed. However, TB messages can be received and can be generated locally. FIG. 10 discloses that separate TB's generated by TLU 41 are transferred to inputs of both TX-A and TX-B in a transmit access configuration. Also, TB's received on both RX-A and RX-B are transferred to TLU 41. In addition, TB's received on RX-A are transferred to TX-A and those received on RX-B are transferred to TX-B in a relay configuration.

FIG. 11 discloses a block diagram of a multiplex terminal disposed in the cross coupled submode of the diagnostic mode. Again, separate TBs generated by TLU 41 are transferred to TX-A and TX-B in a transmit access configuration, and RX-A and RX-B separately transfer received TB's to TLU 41. In a relay configuration, however, TB's received by RX-A are retransmitted by TX-B and those received by RX-B are retransmitted by TX-A with this cross couple submode.

FIGS. 12 through 16 disclose block diagrams of five user access submodes. Each of these block diagrams includes a bidirectional user data path UD showing data flow to user data sinks and from user data sources. When operating in one of these user access submodes, the transmit user interface and access window capture logic circuits are enabled. Thus, a terminal is capable of communicating user data as well as communicating inter-terminal TB's. As will hereinafter be further disclosed, these five submodes are employed by the plurality of terminals to collectively configure an optimum loop for communicating user data. The form of this loop will depend upon the resources that are available and may comprise an all channel A loop, an all channel B loop, or a hybrid loop combining elements of both channel A and channel B.

FIG. 12 discloses a block diagram of a multiplex terminal disposed in the A loop submode of the user access mode. Just as with FIG. 10 disclosed hereinbefore TB's are communicated separately on channel A and channel B with this configuration. Additionally, however, user data are communicated on channel A. If all terminals in the system are identically disposed in this submode, an all channel A loop will be formed for communicating user data.

FIG. 13 discloses a block diagram of a multiplex terminal disposed in the B loop submode of the user access mode. Again, TB's are communicated on both channels, but user data are received and transmitted on channel B only. If all terminals in the system are identically disposed in this submode, an all channel B loop will be formed for communicating user data.

FIGS. 14, 15 and 16 are block diagrams of the three hybrid loop submodes of the user access mode. FIG. 14 discloses the A-end submode wherein user data received on channel A is retransmitted on channel B in a relay configuration, and locally generated user data is transmitted on channel B in a transmit access configuration. FIG. 15 discloses the B-end submode wherein user data received on channel B is retransmitted on channel A in a relay configuration and locally generated user data is transmitted on channel A in a transmit access configuration. FIG. 16 discloses the hybrid interior submode of the user access mode wherein channel B remains permanently in a relay configuration and channel A utilizes both relay and transmit access configurations and conducts data to and from local users.

A plurality of terminals can employ the submodes of FIGS. 14, 15 and 16 to cooperatively form a hybrid loop for communicating user data. A hybrid loop comprises one terminal disposed in the A-end submode, one terminal disposed in the B-end submode and any number of terminals disposed in the hybrid interior submode.

According to the present invention an optimum data loop is configured by cooperative action of the programs of the plurality of terminal control microprocessors. These programs include a diagnostic controller algorithm and a cooperative diagnostic follower algorithm. During formation of the loop, one terminal performs the diagnostic controller algorithm while all other terminals in the system perform diagnostic follower algorithms. After a loop has been defined and each of its member terminals properly configured, all terminals switch to user access mode operation for communication of user data. The controller terminal remains in control, however, and periodically issues a "synchronous control terminal broadcast" (SCTB) to serve as a timing reference which identifies the start of each synchronous time phase to the other terminals.

Figure 35:
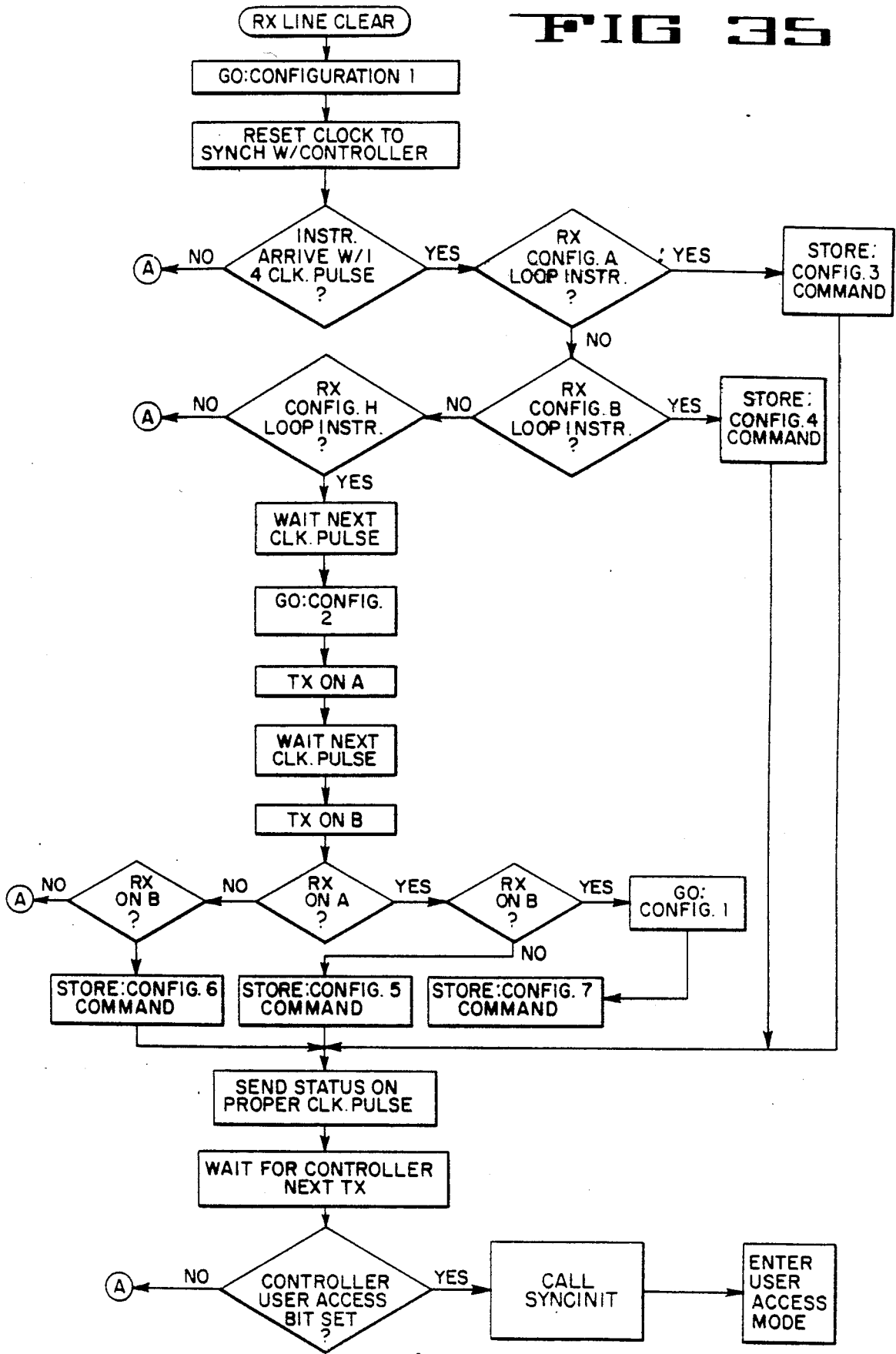
FIG. 35 is a flow chart of the program operating the multiplex terminal of FIG. 18 as a diagnostic follower.

FIG. 34 discloses a logical flow chart of the diagnostic controller algorithm and FIG. 35 discloses a logical flow chart of the diagnostic follower algorithm. In these flow charts, configurations 1 and 2 refer to the two diagnostic submodes disclosed with reference to FIGS. 10 and 11, and configurations 3 through 7 refer to the five user access submodes disclosed with reference to FIGS. 12 through 16 respectively.

FIG. 34 discloses a wake up entry and a "status change" entry to the diagnostic controller algorithm. The "wake up" entry is employed by a terminal upon being initially turned on. The "status change" entry is vectored from the interrupt routine which services the terminal status port. This latter routine examiner any change in status signals along with other program data and vectors control to the diagnostic controller algorithm if it concludes that the active data loop has been compromised.

Upon entry, the diagnostic controller algorithm commands the terminal to assume configuration 1, the linear coupled submode of the diagnostic mode. The algorithm then opens both transmission paths, 10a and 10b, and transmits a special "line clear" broadcast on both channels which causes all other terminals to enter diagnostic follower algorithms which will be described in conjunction with FIG. 35 hereinafter. It then resets its clock so that it will receive program interrupts (ticks) every two milliseconds thereafter. Next, the diagnostic controller algorithm examines the channel A TB receive register 12a to see if it received its own terminal broadcast ("echo") on channel A. If yes, the A loop is known to be continuous. Accordingly, the algorithm pauses until the next "tick" and then transmits a TB instructing all diagnostic followers to configure an A loop. Following this transmission the control terminal stores the appropriate control word for entering configuration 3, the A-loop submode of the user access mode, and awaits the next "tick".

If no TB echo was received on channel A, the diagnostic controller algorithm checks for one on channel B. If an echo was received, it awaits the next "tick" and then sends a special TB instructing all followers to configure a B loop. It then stores the appropriate control word to assume configuration 4, the B-loop submode of the user access mode, and waits for the next two millisecond "tick".

If TB echos were not received on either channel A or channel B, it indicates that neither the A loop nor the B loop are continuous. Accordingly, the controller algorithm pauses until the next "tick" and then transmits a special TB instructing all followers to configure a hybrid loop. Upon reception of this TB, all followers will assume configuration 2, the cross coupled submode of the diagnostic mode. The diagnostic controller likewise assumes configuration 2 and then awaits the next "tick". When this "tick" occurs the diagnostic controller algorithm transmits a TB on channel A, pauses for two milliseconds, and then transmits a TB on channel B. Following the second transmission, the diagnostic controller algorithm examines its two TB receive registers to ascertain whether echos were received on either channel.

FIG. 17 illustrates three adjacent terminals disposed in configuration 2. It is seen that a terminal retransmits the TB of its nearest neighbor back to him on the opposite channel. Thus, if an echo is received with this configuration, it indicates that both transmission paths interconnected with the neighbor are operational. If this is found with both receivers, a terminal has fully operational two-way communication with both neighbors. MT1 of FIG. 17 illustrates this condition. Such a terminal possesses the resources necessary to become an interior terminal of a hybrid loop. If echos are received on only one receiver such as at MT2 or MT4 of FIG. 17, a two-way communication path exists with only one neighbor. Under these conditions, the terminal possesses the resources necessary to become the A end terminal (MT4) or the B end terminal (MT2) of the hybrid loop. If neither echo is received, the terminal is isolated and cannot enter into a loop.

If TB echos were received on both channels, a diagnostic controller temporarily reassumes configuration 1 and stores the control word appropriate for entering configuration 7 of the user access mode. If an echo was received on only one channel, it remains in configuration 2 and stores the control word appropriate for entering either configuration 5 or configuration 6 depending on whether the echo was received on channel A or channel B, respectively. If neither echo was received, the algorithm aborts the procedure and reenters the algorithm at A in FIG. 34 to try again.

After storing the appropriate control word for entering the user access mode and awaiting the next "tick", the diagnostic controller algorithm transmits a status report TB which identifies the particular configurational submode determined above. It then pauses an appropriate number of "ticks" to permit all terminals to respond synchronously. If no responses have occurred after this delay period, the diagnostic controller algorithm aborts the procedure and reenters the algorithm at A in FIG. 34. If one or more responses are received, however, the controller retransmits its status report TB, but with a special bit set to indicate that it is about to assume the user access mode.

Just before sending its stored control word out to terminal control port 18 and thereby entering the user access mode, the diagnostic controller calls subroutine SYNCINIT. This subroutine initializes synchronous adaptor 23a and prepares the diagnostic controller terminal for operation as system controller during user access mode operation.

A flow chart of subroutine SYNCINIT is shown in FIG. 36. It begins by setting up the initial conditions of synchronous adaptor 23a by means of SA control port 100. These initial conditions are PS-RT set high, PS-ET set high, and PSX set high. The functions of these signals are fully discussed below in reference to FIG. 28C. The CPU of the diagnostic controller then initializes a timer X so that it will produce a program interrupt every $T_1$ milliseconds thereafter. Next it transmits a synchronous command TB (SCTB) informing all terminals of the start of the first synchronous time phase. The subroutine finally returns to the main diagnostic controller algorithm which causes the CPU to send the stored control word indicating assumption of user access mode to terminal control port 18. This word causes the terminal to enter the selected submode of the user access mode. Additionally, transmit user interface logic 23 is enabled for communication of messages generated by local user data sources.

FIG. 35 discloses a logical flow chart of the diagnostic follower algorithm that cooperates with the above disclosed diagnostic controller algorithm to configure an optimum data loop from available resources. The diagnostic follower algorithm is entered only upon receiving a "line clear" TB transmitted by the diagnostic controller. Upon entry, the follower terminal assumes configuration 1, thus disabling communications from its user data sources. It resets its clock to be in synchronism with the diagnostic controller's clock. Thereafter, the diagnostic follower algorithm will receive program interrupts at two millisecond intervals ("ticks") in synchronism with the interrupts of the controller algorithm. The follower algorithm then awaits instruction from the controller algorithm.

If an instruction TB does not arrive within 4 "ticks" of the follower's clock, the procedure is aborted and the follower jumps to A of its diagnostic controller algorithm to attempt to configure a loop itself. If an instruction to configure the A loop arrives, a control word appropriate to entering configuration 3 is stored. If an instruction to configure the B loop arrives, the control word appropriate to entering configuration 4 is stored. If the instruction from the controller is to configure a hybrid loop, the follower algorithm waits for the next "tick" and then assumes configuration 2, the cross-coupled submode of the diagnostic mode. It then transmits a TB on channel A, pauses one "tick" and transmits a TB on channel B. As discussed above in reference to FIG. 17, examination of echos of these two transmissions will ascertain whether two-way communication is possible with the terminal's two nearest neighbors.

If no echos were received, the procedure is aborted and the program jumps to the diagnostic controller algorithm at A. If only one echo was received, the terminal remains in configuration 2 and stores the control word appropriate to entering configuration 5 or configuration 6 depending upon whether the echo was received on channel A or channel B, respectively. If echos were received on both channels, the terminal temporarily reassumes configuration 1, and the control word appropriate to entering configuration 7 is stored.

After storing the control word appropriate to entering the selected submode of the user access mode the follower terminal transmits its status report TB identifying this particular submode. In doing so, the follower terminal remains in the diagnostic mode and transmits on the particular "tick" determined by subtracting the controller terminal's identification number from its own identification number. Each terminal therefor transmits synchronously during its own "time slot". This procedure avoids interference between transmissions of the various terminals.

After transmitting a status report, the follower waits for the diagnostic controller's next transmission. If it doesn't arrive within a given number of "ticks" or if it arrives but doesn't have the bit set that indicates that the controller is about to enter the user access mode, the diagnostic follower algorithm is aborted and the program jumps to the diagnostic controller algorithm at A in FIG. 34.

Assuming that the controller's status report TB arrives with the user access bit set, the diagnostic follower algorithm calls subroutine SYNCINIT (FIG. 36). As in the case of the diagnostic controller algorithm, subroutine SYNCINIT initializes synchronous adaptor 23a by means of appropriate signals sent to SA control port 100. As FIG. 36 discloses, however, a Timer X is not initialized nor is an SCTB transmitted. Instead, SYNCINIT simply returns to the diagnostic follower algorithm which sends the stored control word to terminal control port 18 (FIG. 18). This action commands the terminal to assume the selected configurational submode of the user access mode. In addition, transmit user interface logic 23 is enabled to permit communication of messages generated by local user data sources.

With all terminals in the system operating in user access mode, one terminal assumes the role of system controller. This terminal is the particular terminal that acted as diagnostic controller during formation of the data loop. As disclosed above, that terminal alone initializes a Timer X to provide periodic interrupts every $T_1$ milliseconds. Upon the occurrence of this Timer X interrupt, the program of the system controller is vectored to the interrupt handler routine diagrammed in FIG. 37. This routine utilizes terminal control port 18 to open the active data loop for sufficient time to remove an access window that may be trapped on the loop and to then reclose the loop. The system controller next transmits an SCTB informing all terminals of the start of another synchronous time phase before returning to its interrupted program.

As will be discussed hereinafter in reference to FIG. 40, upon reception of an SCTB, all terminals, including the system controller terminal, set a timer Y and a timer Z. These timers are configured to provide program interrupts at times $T_2$ and $T_3$, respectively, after the arrival of the SCTB transmitted by the system controller. Before describing the flow chart of FIG. 40, however, attention is directed to the timing diagrams of FIGS. 38 and 39.

FIG. 38 describes one complete synchronous/asynchronous timing cycle. Such timing cycles occur simultaneously at all terminals in synchronism with the periodic SCTBs issued by the system controller. One sees that a complete timing cycle of length $T_1$ is divided into a synchronous time phase of length $T_2$ and an asynchronous time phase of length $(T_3-T_2)$ During the synchronous time phase, synchronous data sources transmit during their pre-assigned time slots. During the asynchronous time phase, asynchronous data sources may transmit as the need arises by virtue of their terminal capturing an access window.

Note that the maximum transmission rate for a periodic synchronous user is $(T_1)^{-1}$ and is set by the programmed interval of system controller's timer X. A synchronous user may transmit periodically at submultiples of this rate, however, by being assigned only every other time slot, every third time slot, etc. Under such circumstances, a single time slot can be profitably shared by multiple synchronous user data sources; each transmitting at a rate equal to $(T_1)^{-1}$ divided by a whole integer number.

FIG. 39 is a timing diagram showing one complete synchronous time phase and assuming, for simplicity, a single synchronous user data source interfaced to the terminal. As will be discussed below in reference to FIG. 40, a synchronizing pulse is communicated to the user on interface line USER-ET at a preprogrammed time $t_1$ after the start of the synchronous phase. This pulse is used by the synchronous user as a "get ready" signal informing him that his time slot is imminent. At later time $t_2$, the terminal checks to see whether the synchronous user has asserted his USER-RT interface line to indicate that his data is ready for transmission. If yes, the hardware functions to transmit the user's data during the portion of the preprogrammed time slot extending from $t_5$ to $t_6$. If no, the transmission is aborted by the hardware without software intervention.

FIG. 40 shows a flow chart of the interrupt routine entered whenever a TB is received. This routine is entered by all terminals including the terminal that transmitted the TB. If the received TB is not a sync command TB (SCTB), control is vectored to the normal TB interrupt handler. If it is an SCTB, however, the routine proceeds to set Timer Y and Timer Z so they will produce program interrupts at the ends of periods $T_2$ and $T_3$, respectively, after the SCTB is received. One sees that only the system controller receives the Timer X program interrupt, but that all terminals, including the system controller, will receive the Timer Y and Timer Z program interrupts.

After initializing timers Y and Z, the routine checks to see if the single user that is assumed to be interfaced to the terminal is to be permitted to transmit synchronously during this phase. If the answer is yes, the routine introduces a programmed time delay until time $t_1$ (FIG. 39) and then pulses PS-ET (FIG. 28c) from high to low and back to high at synchronous adaptor control port 100. This activates the user's USER-ET interface signal thus permitting the user to acquire data in synchronism with the controller's SCTB. The routine then introduces further programmed time delay until time $t_2$ and then pulses PS-RT from high to low and back to high at synchronous adaptor control port 100. This will cause the synchronous adaptor hardware to abort the programmed transmission if the user has not asserted his USER-RT handshake line by time $t_2$. The routine introduces a third programmed time delay until time $t_4$ and then pulses PSX from high to low and back to high at synchronous adaptor control port 100. Assuming that the user had properly asserted USER-RT by time $t_2$, the user's data is then formatted and clocked onto the data bus during the assigned time slot and the routine returns to the point of program interrupt. Note that no action is taken by the software after time $t_4$. Instead, the user terminates the time slot by deactivating USER-RT at time $t_6$.

For simplicity of explanation, the flow chart of FIG. 40 assumes a single synchronous user interfaced to the terminal. It is obvious that more than one user data source could be accommodated by utilizing well-known techniques to multiplex the interface lines. If more than one synchronous user is accommodated, the program would, of course, be expanded to include three separate timing loops and three synchronous adaptor control pulses for each synchronous user.

FIG. 41 shows a flow chart of the Timer Y interrupt service routine entered by all terminals at the end of period $T_1$ (FIG. 38). One sees that PS-RT is set to a low state at synchronous adaptor control port 100. As will be described hereinafter in reference to FIG. 28C, this action conditions synchronous adaptor 23a for communication with asynchronous data sources. In addition, the system controller terminal acts upon its terminal control port 18 to transmit an access window. During the ensuing asynchronous time phase, asynchronous data sources will thus be able to transmit as the need arises whenever the access window is free to be captured.

At the end of period $T_3$, all terminals enter the Timer Z interrupt service routine diagrammed in FIG. 42. This routine simply returns PS-RT to the high state at synchronous adaptor port 100. As will be discussed more completely below in reference to FIG. 28, the result of this action is that synchronous adaptor 23a will no longer accept new data inputs from asynchronous sources. An asynchronous data source that already has captured the access window, however, will be permitted to complete its transmission. Thus, time interval $(T_1 - T_3)$ must be chosen to be longer than the longest message that can be transmitted by an asynchronous data source to avoid an asynchronous message running into the synchronous time phase.

FIG. 18 discloses a block diagram of a single multiplex terminal in a data bus system employing redundant path architecture, such as that seen in FIG. 9. This block diagram may be compared with the block diagram of FIG. 3 discussed hereinbefore. Item numbers for like circuits are the same as in FIG. 3 with a suffix a or b for those circuits which appear twice, once for channel A and once for channel B. Certain of the elements common to both FIGS. 3 and 18 serve both channels. These are CPU 11, TLU TX logic 17, terminal control port 18, terminal status port 20, transmit user interface 23, synchronous adapter 23a and receiver user interface logic 27. Elements of FIG. 3 that appear twice in FIG. 18 are T/R units 12a and 12b, relay/access multiplexers 16a and 16b, access window capture logic circuits 19a and 19b, terminal broadcast transmit registers 21a and 21b, user/supervisory data multiplexers 22a and 22b, function decoders 24a and 24b, and transmit broadcast receive registers 26a and 26b. In addition, three elements appear in the block diagram of FIG. 18 that do not have counterparts in the block diagram of FIG. 3. They are normal/cross coupled logic circuits 42 and 43 and channel receive select logic 44.

The data receiver/transmitter cross coupling occurring in the submode configurations illustrated in FIGS. 11, 14 and 15 is accomplished by the normal/cross coupling logic circuits 42 and 43 associated with channels A and B respectively. It may be seen that data messages received from path 10b (channel B) may be passed through relay/access multiplexer 16b in a relay configuration to normal/cross coupling logic 42 and thence to TX input of T/R unit 12a for transmission on path 10a of channel A. A data message received on channel A may in like fashion be retransmitted on channel B in a relay configuration by means of normal/cross coupling logic 43. The two normal/cross coupling logic elements therefore pair up the two data transmitters and the two data receivers in a relay configuration. The selection is made by CPU 11 by means of an appropriate command to terminal control port 18 shown at numeral 2 in FIG. 18.

The commands represented by numerals 1, 3 and 4 from terminal control port 18 of FIG. 18 are enabling signals to access window capture logics 19a and 19b, relay/access multiplexer 16b and relay/access multiplexer 16a respectively as indicated in the Figure. Terminal control port 18 also provides a selection signal to channel receive select multiplexer 44 which determines which of the two data receiver outputs is to be transferred to a user data sink. In addition, terminal control port 18 provides enabling signals to TLU TX logic 17 and transmit user interface logic 23 as shown.

Component parts of the elements described generally in block form in FIG. 18 will now be described. Elements will be described in configurations adapted to serve a dual channel multiplex terminal which is appropriate for redundant path architecture. However, the same elements may be used in the simpler single multiplex terminal of FIG. 3.

With reference to FIG. 20A, the terminal control port 18 of FIG. 18 will be described. Data from the bus associated with CPU 11 is delivered to an 8 bit latch 46. When the data is desired to be latched, a CPU write signal is provided by the CPU to the latch which is an edge triggered (rising) device. Each bit in the terminal control byte appearing at the output of the 8 bit latch 46 controls some terminal characteristic. The setting of TCB1 determines whether the terminal is in the normal or the cross coupled configuration. Bit TCB2 designates whether channel A or channel B is the user-receiver channel. TCB3 enables the access window capture logic when set and disables the logic when not set. Bit TCB4 holds transmit access when set so that the transmission path is held open at the terminal during multiple terminal broadcasts from a given terminal. In this fashion the transmit access is not surrendered and the access window is not allowed to traverse the loop between terminal broadcasts. Bit TCB5, when set, indicates that a terminal broadcast is ready for transmission on the A channel. If the terminal is in the diagnostic operational mode, the TB is transmitted immediately. If the terminal is in the user access operational mode, the setting of this bit causes the access window to be captured and the TB to then be transmitted.

Bit TCB6 when set indicates that a terminal broadcast is ready for transmission in B channel. The transmission is accomplished in the diagnostic and user access operational modes as described for the A channel. Bit TCB7 is the user access transmit enable bit. Bits TCBO and TCB7 are provided as inputs to the negative AND gate G1 to provide a diagnostic mode signal $\overline{DIAG}$ which indicates that the terminal is operating in the diagnostic mode. The inverse of the relay control bit is provided by inverter I1 as $\overline{TCB1}$. The inverse of the user data reception channel bit is provided by inverter I2 as $\overline{TCB2}$.

A two-bit latch 47 is coupled to the CPU data bits 5 and 6 which are latched through to the output of latch 47 by the CPU write command. The outputs from the two-bit latch are designated QB5 and QB6 which are transmitted to the TLU transmit logic circuitry indicating that a terminal broadcast is ready to be transmitted in either channel A or channel B respectively. The two-bit latch is reset by a QB5 or QB6 reset signal which is generated by the frame signal generator portion (FIG. 33) of the TLU transmit logic 17 (FIG. 18) to be hereinafter described. This reset removes the indication that a terminal broadcast is ready to be transmitted in either channel A or channel B.

A JK flip-flop FF1 is seen having the CPU data bit 3 coupled to the K input through an inverter I3. The CPU write command is coupled to the clock input of FF1 so that upon the CPU write command an initiate access window signal (IAW) is provided at the $\overline{Q}$ output of the flip-flop. A terminal transmit signal $\overline{TT}$ from the transmit sequence logic (FIG. 31) in the TLU transmit logic 17 (FIG. 18) is coupled to the preset of FF1 to remove the IAW signal after an access window has been transmitted.

FIG. 20B shows the terminal status port 20 (FIG. 18) wherein any changes in the status in the system are sensed and the current status of the system is transmitted to the CPU 11. Two timer signals, a loop close time out A and a loop close time out B are provided as inputs to a pair of AND gates G2 and G3 respectively. Either bit $\overline{TCB2}$ or TCB2 is present dependent upon whether user data is being transmitted on channels A or B respectively. As a consequence, an input is provided to OR gate G4 which is coupled to the bit 5 terminal on an 8 bit latch 48 and to an input on one side of a comparator 49. A received access window (AW) time out for channel A is coupled to bit 6 of the 8 bit latch through an inverter I4 and a received access window (AW) time out for channel B is coupled to the bit 7 input on the 8 bit latch through an inverter I5. The last two mentioned signals are also connected to the comparator 49. A user overrun signal obtained from a timer in the circuit in FIG. 28A is coupled to the bit 3 input of the 8 bit latch and to the input side of the comparator 49. If either of the oscillators in the dual transmit/receive modules 12a and 12b change status, a signal is input to an OR gate G5 which provides an output coupled to the bit 2 input of the 8 bit latch 48 and the input side of the comparator 49. The status of channel A and channel B is also obtained from the T/R module and coupled to bits 1 and 0 respectively at the 8 bit latch and the input side of the comparator. The oscillator and channel status signals are obtained from the T/R module as may be seen in FIG. 19 described hereinbefore.

Comparator 49 makes a comparison between latch 48 inputs and selected latch 48 outputs. If the comparison is "not equal", a status change signal is generated which produces a program interrupt to CPU 11. CPU 11 responds by issuing a CPU read pulse to latch 48 which transfers the new status data to the CPU data bus and equalizes the inputs of comparator 49.

Referring now to FIG. 21 a schematic is presented for the function decoders 24a and 24b in FIG. 18. The received clock, received frame and received data as seen in FIGS. 4 through 8 are provided as inputs to the function decoder. The received clock is provided through an inverter I20 to the clock input of a counter 52. The received frame is provided through an inverter I6 to the K input of JK flip-flop FF2 so that on the next clock pulse the $\overline{Q}$ output of the flip-flop will start the counter 52. At the zero count from the counter a latch 53 will be cleared through a negative OR gate G6. The received data is delivered to the input of a D-type flip-flop FF3 which latches the first bit of the function code at the output thereof. The second bit of the function code is applied to the input of a one of four decoder 54 which decodes the two-bits then at its input and provides an indication at the decoder output that the message is a terminal broadcast (TB) if the decoder input is a digital 00, is a start of message (SM) if the input is a digital 01, is an intramessage gap (IG) if the input is a digital 10 and is an end-of-transmission message (EOT) if the input is a digital 11. At the end of the second clock count after the clear caused by the framing signal, the output of the decoder 54 which is at the input of the latch 53 is latched through to the output of the latch. The latch output for the messages TB, SM and IG remains set indicating that one of these message formats is about to be received until the next received frame arrives at the receiver. The flip-flop FF2 is preset to disable the counter 52 by the third count where the rising or the falling portion of the count is operative as indicated. When the EOT message format is indicated at the output of the latch 53 the indication is provided to the D-input of a D-type flip-flop FF4 and the indication is clocked through to the $\overline{Q}$ output of the flip-flop by the next clock pulse to clear the latch 53. Therefore, the EOT received indication is reset after one clock pulse.

Turning now to FIG. 22 of the drawings a schematic for the receiver user interface logic 27 in FIG. 18 will be described. The received data and the received clocks from the T/R modules 12a or 12b as selected by the channel receive select multiplexer 44 (FIG. 18) are provided as two inputs to the user interface. The received IG and SM signals from the function decoder 24 of FIG. 21 are also provided as inputs. The IG and SM signals are inputted to an OR gate G7, the output of which is provided as one input to an AND gate G8 and to an AND gate G9. Gate G7 therefore provides a logical high state when either SM or IG signals are received. When the SM received signal is coupled to the receiver user interface logic it is provided through an inverter I7 to clock a flip-flop FF5 to provide a high logical state at inputs on AND gates G8 and G9. As a consequence the received data and the received clock signals will be anded with the output of OR gate G7 and flip-flop FF5 to provide DR (data) and CR (clock). The output from $\overline{Q}$ of FF5 is the receive enable signal for the receiver-user interface 27 and will remain until FF5 is preset by removal of the signal RR (user ready to receive) or the appearance of a receive TB or receive EOT signal through the NOR gates G10 and G11 as shown.

Turning now to FIG. 23 the circuit for the terminal broadcast transmitters 21a and 21b in FIG. 18 will be described. The CPU data bus is coupled to the inputs of two 8 bit latches 56 and 57. Eight bits are latched into each 8 bit latch on command of the CPU through the negative AND gates G12 and G13. It may be seen that the latch 56 is actuated by the gate G13 and the latch 57 is actuated by the gate G12. An internal frame signal obtained from the circuit of FIG. 33 in the TLU transmit logic 17 of FIG. 18 loads the latched data into a shift register 58. An internal clock signal from the clock (not shown) associated with the CPU 11 mentioned hereinbefore clocks the loaded data serially out onto the TB transmit line.

FIG. 24 is a diagram of the access window capture logic circuit 19a or 19b of FIG. 18. This circuit applies the $\overline{DIAG}$ signal from terminal control port 18 and an alternate channel signal (TCB2 or $\overline{TCB2}$, FIG. 20A) to negative OR gate G14. The $\overline{DIAG}$ signal indicates that the terminal is disposed in the diagnostic mode, and the alternate channel signal indicates that the subject channel is not the active channel. In either case, AND gate G15 is disabled. A user ready signal from the transmit user interface logic 23 (FIG. 18) is provided as one input to an AND gate G16 together with the transmit enable bit TCB7 from the terminal control port of FIG. 20A. When both of these last two named signals are present, the output of the AND gate G16 provides a high logical state as one input to an OR gate G17. As a consequence a high logical state is provided from the output of the OR gate G17 to the AND gate G15. As previously mentioned when both the $\overline{DIAG}$ and TCB2 or $\overline{TCB2}$ signals are both absent, the output of negative OR gate G14 is normally high. As a result the AND gate G15 provides a logical high signal to one input of an AND gate G18. As mentioned hereinbefore the EOT receive signal from the function decoder of FIG. 21 is high for one clock pulse and thereby provides an access window capture (AWC) signal at the output of AND gate G18. An alternate way for the AND gate G15 to receive its second logical high input from the OR gate G17 is for the TB ready signal (QB5 for channel A and QB6 for channel B) obtained from the terminal control port of FIG. 20A to be provided as an input to the circuit of FIG. 24. Thus, when the user ready signal and the bit TCB7 at the input to the circuit of FIG. 24 are in logical high states or when a TB ready signal is in a logical high state, then when the EOT receive signal is coupled to the access window capture logic from the function decoder 24a or 24b, an AWC pulse is provided.

With reference now to FIG. 25A of the drawings a circuit diagram for the relay/access multiplexer logic seen as circuitry segments 16a and 16b in FIG. 18 is shown. For asynchronous operation during the period $T_1$ minus $T_2$ (FIG. 38), four inputs may be seen to provide inputs for a series of gates including a NAND gate G19, a negative NOR gate G20 and a negative NAND gate G21. The four signals are the signals TB from the transmit sequence logic of FIG. 31, the TB enable signals TCB5 (channel A) or TCB6 (channel B) from the terminal control port FIG. 20A, the channel selector for user data AW enable ($\overline{TCB2}$ for channel A and TCB2 for channel B) from the terminal control port of FIG. 20A and the internal frame signal (INT $\overline{FRM}$) from the frame signal generator circuitry of FIG. 33. When these four signals are present, together with a low state signal from gate G103, acquired as hereinafter explained, a high is provided at the output of the negative NAND gate G21 which is coupled to an A input in a multiplexer 58. This output from the gate G21 represents a framing signal generated within the multiplex terminal. A received frame signal from the T/R modules 12a or 12b is coupled to a B input of the multiplexer 58 through an inverter I8. Received data is coupled to a B input of the multiplexer through an inverter I9. The internal clock signal is coupled to an A input of the multiplexer and the received clock signal is coupled to a B input of the multiplexer. Internal data is coupled to an A input of the multiplexer and the AWC signal from the access window capture logic of FIG. 24 is coupled to a B input of the multiplexer 58. When a $\overline{GO}$ signal obtained from the loop access logic of FIG. 30 is in a high state, the B inputs are presented at the multiplexer output which may be recognized as the relay configuration. When the $\overline{GO}$ signal is in a low state the A inputs to the multiplexer 58 are presented at the outputs which may be recognized as the transmit access configuration. The frame signal to be transmitted therefore is either the received frame or the internally generated frame from the output of the gate G21 and appears as TX $\overline{FRM}$. The data to be transmitted is therefore seen to be either the received data or the internally generated data ($\overline{INT\ DATA}$) and appears at the output of the circuit as TX data. Either the internal clock or the received clock is presented at the output of the multiplexer and appears as the TX clock at the output of the circuit. When the access window is to be captured the data from the multiplexer 58 may be seen to be treated by a number of components including inverters I10, I11 and I12, flip-flop FF6 and NOR gate G22. Reference to the timing diagram of FIG. 25B shows that the received frame is initiated at time t1 and lasts until time t2 in synchronism with the received clock. The received data when it is an end of transmission message with an access window is shown wherein the end of transmission logical one-one extends from t2 through t5 and the access window extends from t5 through t7. The access window capture (AWC pulse from the access window capture logic of FIG. 24) occurs on the falling edge of the clock at time t4. As a consequence it is another half clock pulse until the flip-flop FF6 is clocked by the output from inverter I11 and the Q output from the flip-flop FF6 appears as the $\overline{XD}$ signal which is logically high from time t5 to t7. The transmitted data at the output of the NOR gate G22 is therefore low from t5 through t7 as shown at TX data in FIG. 25B. Thus, the access window has been removed.

A RX EOT signal is shown as an input to the circuit of FIG. 25A and is coupled to one input of an AND gate G23. It may be seen that the output from inverter I10 is a high logical state if an access window is available in the data. The Q output from flip-flop FF6 is high during the period t5 through t7 as seen at $\overline{XD}$ in FIG. 25B. When the RX EOT signal from the function decoder circuit of FIG. 21 is present which, as previously described, is only one clock pulse long, there are three high inputs to the AND gate G23 if an access window is available in the data. As a consequence, the output OL occurs from the circuit of FIG. 25A for the period t5 through t6 as shown in the timing diagram of FIG. 25B.

A third input to negative NAND gate G21 from negative NAND gate G103 is seen in FIG. 25A. During the synchronous phase of bus operation (period $T_2$ of FIG. 38), it is desirable to suppress transmission and circulation of the EOT/access window function code since the access window is not used. To accomplish this, the third input is provided for negative NAND gate G21. When signal $\overline{PSXMSN}$ is high, the output of negative NAND gate G103 remains low, thereby enabling negative NAND gate G21 to pass framing signals as described hereinbefore for asynchronous operation. Signal $\overline{PSXMSN}$ is low during the period $T_2$ (synchronous operation) as shown in the discussion of FIG. 28C hereinafter. When an end of transmission ($\overline{EOT}$) function code is also transmitted as a low signal during a synchronous transmission (while $\overline{PSXMSN}$ from FIG. 28C is low), indication is provided that the user has completed its transmission and the terminal is going to attempt to transmit a new access window onto the bus. However, two low inputs to the negative NAND gate G103 create a high output therefrom, which, coupled to NAND gate G21, inhibits the gate and therefore prevents transmission of the frame signal associated with the EOT function code onto the bus. The EOT function code and access window data bits are transmitted onto the bus in this instance, but the frame signal which is used to identify them is suppressed as described herein, and the transmitted function code and access window are therefore meaningless.

Referring now to FIG. 26 the circuitry for the user/supervisory data multiplexer 22a and 22b in FIG. 18 will be described. $\overline{TB}$, $\overline{SM}$ and $\overline{IG}$ are normally high signals which, when actuated, assume a low state and indicate that a terminal broadcast, start of message or intramessage gap message format is ready for transmission. An array of gates G24 through G32 are arranged with inverters I13 through I15 to operate with a pair of flip-flops FF7 and FF8 so that the flip-flops operate as a 2 bit shift register following an internal frame signal to provide an appropriate function code at the Q output of FF8 corresponding to the $\overline{IG}$, $\overline{SM}$ or $\overline{TB}$ inputs. The flip-flops FF7 and FF8 are clocked by the internal clock signal. The 2 bit function code is presented to one input of a multiplexer 59 which selects the function code to be presented at the multiplexer output as internal data for the two clock periods. When the input to the circuit of FIG. 26 is either $\overline{IG}$ or $\overline{SM}$ a switchover signal (SW OVER) at the select terminal of the multiplexer 59 causes the multiplexer to pass user data through to the output thereof as internal data. When the input to the circuit is $\overline{TB}$, the switchover signal leaves the multiplexer 59 in condition to pass the Q output from FF8 through to the output of the multiplexer as internal data. The circuit functions in this manner because a terminal broadcast to be transmitted is passed through the OR gate G30 unchanged into the 2 bit shift register consisting of the flip-flops FF7 and FF8. The clock pulses then shift the entire terminal broadcast through to the Q output of FF8 in sixteen additional clock pulses. Therefore a terminal broadcast together with the terminal broadcast function code requires 18 clock pulses to be shifted through the register formed by the flip-flops. The start of message and intramessage gap function codes are shifted through the register in two clock pulses. Three clock pulses are required to shift the end of transmission function code plus an access window through the 2 bit register. The EOT function code is produced only for those conditions when the $\overline{IG}$, $\overline{SM}$ and $\overline{TB}$ signals are not present and a framing signal is present. Clearly this condition requires that an EOT function code be generated by the 2 bit shift register formed by FF7 and FF8.

FIG. 27 shows a terminal broadcast receiver register at 26a and 26b as seen in FIG. 18. The circuit of FIG. 27 receives a decoded terminal broadcast identification TB from the function decoder of FIG. 21 which is connected to a start count terminal on a counter 61. A received clock and received data is input to the terminal broadcast receiver register from a T/R module 12a or 12b. The received clock is inverted by an inverter I16 and coupled to the clock inputs of the counter 61 and a shift register 62. The received data is coupled to the input of the shift register. At the end of an eight clock pulse count the counter provides an input to an OR gate G33 which provides a "shift in" pulse to a memory 63 so that the first 8 bits of the received data are taken into the memory from the shift register 62. At the end of sixteen clock counts from the counter 61 the OR gate G33 provides another "shift in" pulse to the memory 63 to take the next eight received data bits in the terminal broadcast into the memory from the shift register 62. When the full sixteen bit terminal broadcast is in the memory a ready signal is provided which advises the CPU 11 that the received terminal broadcast is ready to be read. The CPU calls the terminal broadcast from the memory by selecting a negative AND gate G34 and providing a CPU read signal thereto. The select and read signals provide an output from the negative AND gate G34 which causes the memory to transmit onto the CPU data bus the first received eight data bits followed by the second received eight data bits. The entire terminal broadcast is thereby transmitted to the CPU 11.

With reference to the circuit diagram of FIG. 28A a ready-to-transmit signal RT OUT is received from a user data source and coupled to one input of a negative OR gate G37. A user transmit enable signal TCB7 (from the terminal control port circuit of FIG. 20A) is also coupled to an input of the gate G37. An overrun timer 64 has an output which is in a high state when the timer is not enabled. The timer output also is in a high state after it is enabled until it times out. The time out period for the timer is set to define the maximum transmission time which may be allowed for a user transmission. Consequently, the user may send a message consuming any amount of time within this predetermined maximum period. When the signals RT, TCB7 and timer output are present, the output of the gate assumes a logical high state providing a user ready signal and removing the preset for a flip-flop FF9. The user ready signal is utilized by the access window capture logic described hereinbefore in conjunction with FIG. 24. After the access window is captured (through the operation of the circuit of FIG. 24) the signal $\overline{SM}$ goes to a low logical state. This signal is inverted by an inverter 117 and coupled to the K input of FF9. A signal $\overline{SW}$ over goes to a low logical state at the end of the SM function code and is coupled to the clock input of FF9. The low going edge of this clock signal provides a logical high signal at the $\overline{Q}$ output of FF9 to provide the signal ET OUT which is an indication that a user transmission is coming onto the bus. The $\overline{Q}$ high signal is also inputted to the overrun timer 64 as the enable signal and internal clock pulses begin the timer count. As the enable or ET OUT signal does not remain for a time longer than the maximum time allowed for any user transmission, the output from the timer will remain in a logical high state. The $\overline{Q}$ output from FF9 is also input to a three input AND gate G35. A flip-flop FF10 has a Q output preset to a logical high state which is also input to the gate G35. The gate G35 is therefore enabled to pass the internal clock signal through the AND gate as the signal CT. The clock signal is returned to the transmit user interface logic as clock signal CI which is in phase with user data DT. The ET OUT signal is also input to a NAND gate G38 so that the inverse of the user data DT is provided at the output thereof. The inverted user data is coupled to the multiplexer 59 in the user/supervisory data circuit of FIG. 26 to be utilized as described hereinbefore.

The user ready signal when set to a logical high together with a normally high $\overline{MW}$ $\overline{RST}$ signal is inputted to a negative OR gate G36. This provides a logical high output from the gate which removes the preset from flip-flop FF10. The Q output of the flip-flop remains in a logical high state in this condition and will only be changed by a clock input (the falling edge thereof). The signal triggers a one-shot device 66 to rise to a logical high state at the clock input of FF10. The one-shot period is longer than a clock period (CI) so that the one-shot output remains in a high state as long as CI is present. At the end of a user transmission the signal RT OUT is removed and the signal ET OUT is therefore removed and the clock signal is blocked at the AND gate G35. The circuit of FIG. 28A thereby completes its specific function for this message transmission. However, if the intramessage gap is required, the signal RT OUT is not removed. At that time the user data source breaks the path between CT and CI and the one-shot 66 times out. Flip-flop FF10 is clocked on the falling edge of the one-shot output causing the Q output to go low. The clock signal through the AND gate G35 is thereby blocked and the low going state at the Q output of FF10 provides a $\overline{IG}$ signal which is an indication that an intramessage gap is occurring. The signal ET OUT remains since the signal $\overline{SM}$ is present for the entire duration of a SM and IG message. The $\overline{IG}$ signal is provided to the transmit sequence logic (FIG. 32) for purposes to be hereinafter described and is also provided to the user/supervisory data logic of FIG. 26 for purposes hereinbefore described. As a consequence instead of an end of transmission (EOT) being generated as a function code, an intramessage gap (IG) is generated as a function code so that bus access is retained by the terminal and the user associated therewith.

Figure 28B:
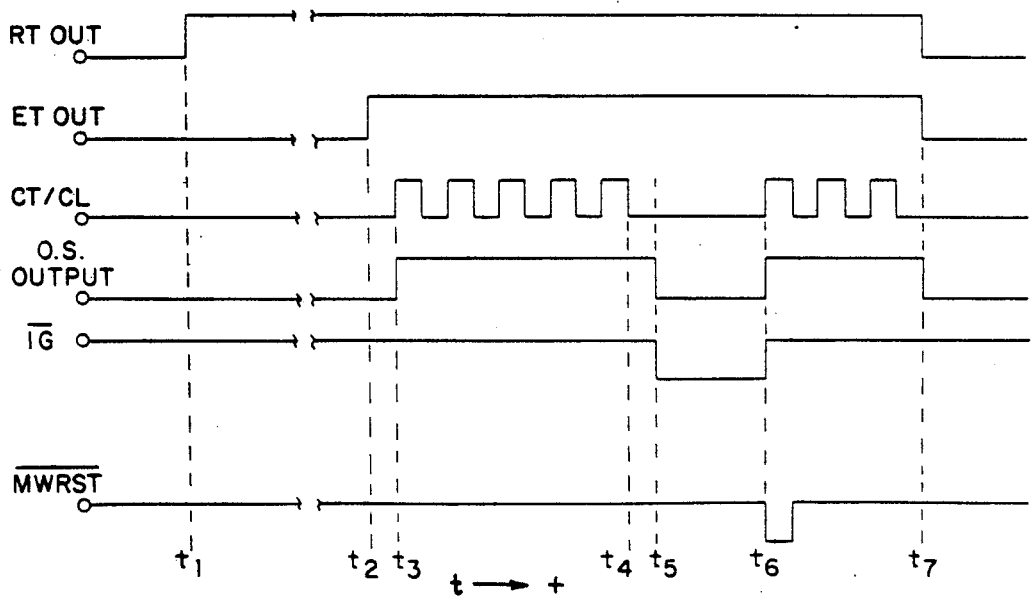
FIG. 28B is a timing diagram showing the signal sequence in the circuit of FIG. 28A.

With reference now to the timing diagram of FIG. 28B the manner in which bus retention is accomplished during asynchronous operation as described immediately hereinbefore will be discussed. The signal RT OUT is generated at time t1 after which the signal ET OUT is generated at a later time t2. One-half cycle later the clock signals CT and CI occur at time t3. Also at time t3 the output from the one-shot 66 occurs and remains until the last clock pulse in the SM message plus the one-shot period (of arbitrary length) which is shown in FIG. 28B as extending from t4 through t5. When the one-shot output falls, the Q output of flip-flop FF10 which is the signal $\overline{IG}$ also falls at time t5. Thus, an intramessage gap function code IG is generated by the circuit of FIG. 26 and access to the bus is retained. A signal $\overline{MWRST}$ is provided at time t6, which is a low going signal causing the negative OR gate G36 to preset flip-flop FF10 so that the Q output again assumes a high logical state, the signal $\overline{IG}$ is removed (set back to a high state) and the transmission of the intramessage gap message ensues in the same manner as described hereinbefore for a start of message communication.

The synchronous adapter circuit 23A (FIGS. 3 and 18) is shown in detail in FIG. 28C. CPU output port 100 allows the CPU to control operation of the synchronous adapter circuit by providing three control lines PS-RT, PS-ET and PSX. The circuit operation description will be undertaken for three situations: (1) operation for an asynchronous user; (2) operation for a synchronous user with RT set (user ready to transmit); (3) operation for a synchronous user with RT not set (user not ready to transmit). Initially these signals are set in accordance with the following table:

| Signal | Logical State |
| --- | --- |
| PS-RT | Low |
| RTP | Low |
| PS-ET | High |
| ETP | High |
| PSXMSN | Low |
| PSX | High |
| $\overline{PSXMSN}$ | High |

For the first operational situation, where an asynchronous user is accommodated, the aforementioned initial conditions are maintained. The low PS-RT signal from output port 100 presets flip-flop 100 so that the $\overline{Q}$ output (RTP) is low. RTP is one input to a negative AND gate G100. While RTP is low, G100 is enabled to pass the logical state of its other input, the user RT signal. The output of G100 becomes the RT OUT signal which is connected to the transmit user interface logic 23 (FIGS. 3 and 18). The output of flip-flop FF101 (ETP) is presented as one input to a negative OR gate G102. Since this signal is in the logical high state the other input of G102, ET OUT, determines the state of the G102 gate output, USER ET. Thus, the synchronous adapter circuit in this case is transparent to the asynchronous user.

During the synchronous phase of the bus operation, asynchronous user transmitter RT signals are inhibited so that they will not interfere with the synchronous user operation. To achieve this, the CPU sets the PS-RT signal to a logical high state. This removes the preset signal to flip-flop FF100 and is also presented as an input to NAND gate G101. If the user does not have a transmission in progress at this time, the other input to gate G101 (the USER ET signal) will also be high, thus causing the output of gate G101 to be low, thereby clearing flip-flop FF100. This causes the RTP input to gate G100 to go high and the output of gate G100 (RT OUT) to be high regardless of the USER RT signal input state.

If a transmission is in progress when PS-RT is set high by the CPU, USER ET will be logically low and the transmission will continue. When the transmission is complete, the ET OUT signal (and thus the USER ET signal output from gate G102) will go high causing flip-flop FF100 to be cleared as described above and thereby inhibiting any ensuing active RT OUT signals.

At the end of the synchronous phase (period T2 in FIG. 38), when the asynchronous phase again takes place, the CPU again sets the PS-RT signal low to preset flip-flop FF100 and thereby reenable gate G100 to pass RT OUT signals. Thus, an asynchronous user is again allowed to transmit.

In the second circuit operation mentioned hereinbefore, operation for a synchronous user with RT set, a timing diagram is provided in FIG. 28D to enhance the operating description. During periods when the user is not scheduled to transmit, the CPU sets PS-RT to a logical high state. This causes flip-flop FF100 to be cleared and the output of gate G100 (RT OUT) to be held high as explained in conjunction with the first circuit operation discussed hereinbefore. At some predetermined time (t1) prior to the actual time of transmission, the CPU sets PS-ET control line low momentarily. This clears flip-flop FF101, whose Q output (ETP) is an input to the negative OR gate G102. This causes the output of gate G102, the USER ET signal, to become low. This condition may be interpreted by a user as a "get ready" signal to prepare data for transmission. A logical low USER ET signal also causes the output of gate G101 to become high, thus removing the clear signal from flip-flop FF100.

At some later time (t2) the CPU sets the PS-RT signal low momentarily. This causes flip-flop FF100 to be preset. The output of flip-flop FF100 (RTP) enables the gate G100 to cause RT OUT to become active (low). The RT OUT signal is presented to the J input of flip-flop FF101. Since this signal is low at the time, the CPU returns PS-RT to its high state at t3 thereby clocking flip-flop FF101. The output of flip-flop FF101 (ETP) does not change state but remains the logical low state.

At the time to start transmission now onto the bus (t4) the CPU momentarily sets the PSX signal low. This clocks flip-flop FF102, which has its J input high due to the active low state of the RT OUT signal which is inverted. This causes the $\overline{PSXMSN}$ signal to become low. As a result the synchronous transmission sequence begins.

When the terminal is prepared to accept data from the user at time t5 it will set the ET OUT signal to a low state. This signal is connected to the preset input of flip-flop FF101 causing the ETP signal to return to the high state. This high signal being an input to negative OR gate G102, thereby causes the USER ET signal to remain low.

When the user has completed its transmission at time t6, it will deactivate the USER RT signal, causing the output of gate G100 (RT OUT) also to become deactivated. The terminal acknowledges by setting ET OUT high. This causes the output of gate G102 (USER ET) to also become high, which thereby resets flip-flop FF100 through the NAND gate G101. When the terminal has completed all transmissions onto the bus at time t7, the ENDX signal from the framing signal generator of FIG. 33 becomes high and clears flip-flop FF102, thereby setting $\overline{PSXMSN}$ to a high state.

The third type of circuit operation, operation for a synchronous user with RT not set, is described with reference to the timing diagram of FIG. 28E. During periods when the user is not scheduled to transmit, the CPU sets PS-RT at a logical high level. This causes flip-flop FF100 to be cleared and the output of gate G100 (RT OUT) to be held high as explained for asynchronous operation hereinbefore. At some predetermined time (t1) prior to the actual time of transmission, the CPU sets the PS-ET control line momentarily low to clear flip-flop FF101. The Q output of FF101 causes the output of gate G102 (USER ET) to become low. This condition may be used by the user as a "get ready" signal to prepare data for transmission. A logical low USER ET signal also causes the output of gate G101 to be high, thus removing the clear signal from flip-flop FF100. At a later time (t2) the CPU sets the letters PS-RT control signal low momentarily. This causes flip-flop FF100 to be preset which enables gate G100 to pass the USER RT signal. For this situation however we assume that the user has no traffic to transmit and so does not set the USER RT signal low. Therefore, the output of gate G100 (RT OUT) does not become low. When the CP returns the PS-RT signal to a high state (t3) flip-flop FF101 is clocked with a logical high at its J input. This causes the output of flip-flop FF101 to return to a high logical state and further causes the output of gate G102 (USER ET) also to return to a high state, thus aborting the transmission. At the time the transmission was to have taken place (t4), the CPU pulses PSX signal low. With the RT OUT signal high, the J input to flip-flop FF102 is low. Therefore, the output of flip-flop ($\overline{PSXMSN}$) does not change state and the bus transmission is not initiated.

Note that according to the above disclosure, the user data source may be either synchronous or asynchronous. A synchronous source will do nothing until it receives a USER ET signal from the terminal and will then respond by asserting its USER RT line when its data is ready. An asynchronous source will firt assert its USER RT line when it wishes to transmit and will then wait for the terminal to respond by asserting USER ET when an access window has been captured. Thus, the USER RT—USER ET handshake sequence is reversed for the two types of data sources. Although for simplicity of description, only a single data source has been discussed above, it is obvious that multiple data sources can be accommodated by multiplexing the interface lines. Such multiplexing techniques are well known and will not be discussed further herein.

FIG. 29 shows the TLU transmit logic in block form having input signals PSXMSN, QB5, OL-A and IAW to a loop access logic 67 for channel A and having inputs PSXMSN, QB6, OL-B and IAW to a loop access logic 68 for channel B. The two loop access logic circuit sections also have a loop select input as indicated. The PSXMSN signal is obtained from the circuit of FIG. 28C, the QB5, QB6 and IAW are obtained from the circuit of FIG. 20A, and the signals OL-A and B are obtained from the circuit of FIG. 25A. The loop select signal is either the signal TCB2 (channel B) or $\overline{TCB2}$ (channel A) also obtained from the circuit of FIG. 20A. The user ready signal is obtained from the circuit of FIG. 28A as hereinbefore described. A loop close logic circuit segment 69 receives the signals SM, IG or EOT from the function decoder circuit of FIG. 21. The loop access logic segments 67 and 68 provide an open loop A ($\overline{GO\ A}$) and an open loop B ($\overline{GO\ B}$) signal respectively.

A framing signal generator 71 provides the internal frame signal and the QB5 and QB6 reset signals. The internal frame signal is utilized by several of the circuits described hereinbefore while the QB5 and QB6 reset signal is provided as an input to the terminal control port circuit of FIG. 20A to remove the signals which indicate that a terminal broadcast is ready to be transmitted. A supervisory data counter circuit 72 is included in the TLU transmit logic providing a switchover (SW OVER) signal which controls the multiplexer 59 for providing user data or supervisory data at the output of the circuit of FIG. 26. Transmit sequence logic 73 is shown which affords control signals for other segments of circuitry in the TLU transmit logic portion of the multiplex terminal.

Turning now to FIG. 30 a description of the loop access logic for either channel A or channel B (Items 67 and 68 respectively) is shown. FIG. 30 shows a single channel of loop access logic which is duplicated for the other channel as indicated in FIG. 29. It may be noted that several additional inputs are present in FIG. 30 over those shown to the loop access logic circuits of FIG. 29. These additional inputs are in the nature of control support signals and are left out of the FIG. 29 block diagram for purposes of clarity. A diagnostic mode signal ($\overline{DIAG}$) is delivered through an inverter 118 to the K input of a flip-flop FF11. A TB ready signal (QB5 for channel A or QB6 for channel B) is coupled through an inverter 119 to the clock input of FF11. Thus, when the terminal is in the diagnostic mode and a terminal broadcast is ready for transmission, the Q output of FF11 goes low causing a high logical state to appear at the output of a negative NOR gate G39. The output of G39 is coupled to the K input of a flip-flop FF12 which is clocked through by the next internal clock pulse as a logical low state at the Q output of the flip-flop. This low state is coupled to the input of a negative NOR gate G40 which provides a logical high to the K input of a flip-flop FF13 which on the next clock pulse provides a logical low at the Q output thereof. This low signal is the transmit access signal ($\overline{GO}$) which functions to open the transmission path 10a or 10b (FIG. 9) at the multiplex terminal so that the terminal may transmit on the path.

When the controller terminal in the diagnostic mode wants to go from the diagnostic to the user access mode the signals IAW (TCB3) and either TCB2 or $\overline{TCB2}$ from the terminal control port circuit of FIG. 20A are provided to the inputs of a NAND gate G41. When these two inputs are present (an access window is being initiated and this channel is selected for transmission) the gate G41 provides a logical low output which is input to the gate G39 providing a logical high output therefrom. The access signal ($\overline{GO}$) is thereby generated as described hereinbefore through the flip-flops FF12 and 13 and the gate G40.

In the user access mode, asynchronous operation, when the circuit of FIG. 30 is in the primary channel (the channel carrying user data), and an access window has been sensed by the circuit of FIG. 25A and captured, the signal OL (FIG. 25B) is clocked through as a logical low at the output of a flip-flop FF14 by the inverted received clock signal $\overline{XC}$. A logical low is thereby provided from the Q output of FF14 to one input of the negative NOR gate G39 and the access signal ($\overline{GO}$) is generated as described before.

When the terminal is in the user access mode and the circuit of FIG. 30 is in the secondary channel (the channel which does not carry user data) then the access signal from the alternate channel (the channel carrying user data) is input to a negative AND gate G42. TB signal is also input to the gate G42 together with the inverse of the TB ready signal QB5 or QB6 as appropriate. Thus, when the alternate channel loop is opened for transmission, when the alternate channel is selected to transmit a terminal broadcast and when a terminal broadcast is ready to be transmitted in this channel, a logical low output is provided from the gate G42 which is coupled to one input of the negative NOR gate G40. This provides a logical high state at the output of G40 which produces the access signal $\overline{GO}$ on the next internal clock pulse as described before. When the loop is to be reclosed after any of the aforementioned four ways of opening the loop for transmission, a loop close signal is provided to the J inputs of the flip-flops FF12 and FF13 so that the access signal $\overline{GO}$ is returned to a high state on the succeeding internal clock (INT CLK) pulse.

The signal PSXMSN is provided as an input to a NAND gate G104 in FIG. 30. Transmissions in the synchronous phase of operation do not utilize the access window as a means to gain access to the bus. Access is under CPU control. Therefore, another means of opening the loop and initiating transmissions must be used during synchronous operation of the system. Toward that end, the PSXMSN signal obtained from the circuit of FIG. 28C is connected to one input of the NAND gate G104. When the last named signal is high, an indication is provided that a synchronous transmission is taking place. Another input to gate G104 is the loop select signal which is at a logical high state when the channel that the circuitry of FIG. 30 is associated with is selected to carry user data. The output of gate G104 becomes low when both input signals are high. A low at the input to negative NOR gate G39 produces a $\overline{GO}$ signal in a similar manner to that previously explained for the other three inputs to gate G39 discussed hereinbefore. The loop close signal which removes the $\overline{GO}$ signal occurs as described earlier.

With reference now to FIG. 31 of the drawings the circuitry for the transmit sequence logic 73 of FIG. 29 will be described. This circuit determines the transmit priority for terminal broadcasts, user data messages and end of transmission messages. A table 74 is shown in FIG. 31 which shows the priority as; 1, terminal broadcasts (TB); 2, user data messages (SM); and 3, end of transmission messages (EOT). It should be noted that when the $\overline{GO}$ signal from the loop access logic for either channel is present at the input to a negative OR gate G42 a terminal transmit signal ($\overline{TT}$) is provided for the circuit of FIG. 31 which is utilized as a control signal in a number of other circuits described herein when the transmission path 10a or 10b is opened preparatory to transmission of messages thereon. Also when the loop access signal for either channel A or channel B is present at gate G42 a flip-flop FF15 is clocked to produce the low logic state established by the ground at the J input at the Q output. This low logic state from FF15 is coupled to one input of a programmable read only memory (PROM) 76. When a terminal broadcast is ready to be transmitted along either channel A or channel B as indicated by signals QB5 or QB6, the output of a NOR gate G43 is indicative thereof and is also coupled to one of the inputs of the PROM. The output from the gate G43 is also used as a clocking pulse for a flip-flop FF16 which clocks a signal through to the Q output thereof which indicates that a terminal broadcast is ready and on hold. This last mentioned signal is also coupled to one of the inputs of the PROM 76. The user ready signal from the circuit of FIG. 28A, the transmit user interface logic, is also an input to the PROM. The bit TCB4 from the terminal control port of FIG. 20A is another input to the PROM. A sixth input to the PROM is the signal TB which is an indicator of a terminal broadcast being transmitted.

The $\overline{MW}$ $\overline{RST}$ signal is coupled to the clock input of a flip-flop FF17 and provides an indication that a transmission is over and that therefore a next type of transmission in the priority table 74 may be selected. An ET monitor signal $\overline{ET}$ $\overline{MON}$ is input to a flip-flop FF18 to indicate that a user data transmission is completed so that an end of transmission (EOT) message may then be selected as indicated by the priority table 74. The program ready only memory 76 is set to provide the desired priority of transmissions to the inputs of a latch 77 so that an appropriate signal $\overline{TB}$, $\overline{SM}$ or $\overline{EOT}$ will be latched through to the output of the latch and subsequently delivered to the user/supervisory data logic of FIG. 26 to provide the appropriate function code as described hereinbefore. The latching pulse for the latch 77 is obtained by any low signal appearing at one of the inputs of the negative NOR gate G44 which is clocked through the D type flip-flop FF19 by the internal clock signal as shown. The inverse of the latching pulse is provided at the $\overline{Q}$ output of FF19 as a frame generator start signal $\overline{FGST}$. The K inputs for the flip-flops 16, 17 and 18 are provided by the indicated ones of the outputs from the latch 77.

With reference to FIG. 32 of the drawings the loop close logic section 69 of FIG. 29 will be described. The purpose of the loop close logic is to provide an indication for both channels of when the loop may be closed following a transmission. The reason for having this circuitry is that a sufficiently long period of time must be allowed following transmission before the loop is closed to insure that all transmitted framing signals are removed from the bus with the exception of the one associated with the EOT function code. This must be done so that ambiguous frame signals do not circulate forever on the bus. This time period, however, must be short enough that a succeeding transmission by another terminal or the circulation of the access window is not impeded. Counters 78 and 79 are enabled by the occurrence of the terminal transmit ($\overline{TT}$) signal from the transmit sequence logic of FIG. 31. This signal indicates that one or both of the loops 10a or 10b has been opened for transmission onto the bus. A gate G45 provides a high going pulse for each framing signal associated with a terminal broadcast transmission and a gate G46 provides a similar pulse for all start of message and intramessage gap transmissions. Note that $\overline{SM}$ is active for both types of transmissions. These two signals are fed to an OR gate G47 which provides a pulse signal to the counter 79 whenever a framing signal associated with a TB, SM or IG function code is transmitted onto the bus. When these transmissions traverse the loop and are received by the function decoder logic (FIG. 21) an indication of each type of transmission (RX TB, RX SM or RX IG) is fed to an OR gate G48. The output of G48 therefore has a rising edge each time one of these function codes is detected and provides a clocking signal for the counter 78. Note that transmission or detection of the EOT function code does not increment counter 79 or 78.

The outputs of counters 79 and 78 in FIG. 32 are provided as inputs to a comparator 81. When the output of counter 78 is the same as that of counter 79, the comparator output signal goes low. This condition indicates that all framing signals exclusive of the one associated with the EOT message and the access window which have been transmitted onto the bus have been received and that it is safe to close the loop. This is the normal means of closing the loop.

A backup loop closing mechanism is shown in FIG. 32 in the form of a counter 82. The counter 82 allows the loop to be closed after a predetermined time period in the event a transmitted framing signal does not completely traverse the loop. In this case the output of comparator 81 will never go active as in the case where the data bus should become broken during a transmission. Counter 82 is reset by a gate G49 whenever the output of the comparator 81 goes low or whenever a framing signal ($\overline{INT}$ $\overline{FRM}$) is transmitted onto the bus. Counter 82 counts the internal clock pulses when both of the signals are high. Therefore, it can be seen that counter 82 will provide an output signal which is a loop close time out, whenever the output of comparator 81 does not occur within a predetermined time period (as set into counter 82) after the occurrence of a framing signal. The loop close time out signal from the counter 82 and the output from the comparator 81 are provided as inputs to a gate G50. The output of G50 is a signal which indicates that the loop may be closed either due to the normal loop closing mechanism or due to the backup mechanism just described if there are no more transmissions to be placed on the bus.

The output of a negative NOR gate G51 causes the loop access logic of FIG. 30 to close the loop. This output (LCLS) is activated in one of three ways as determined by the inputs to gate G51. When the terminal is in the diagnostic mode of operation, the loop closing signal comes from a NAND gate G52. The output of this gate goes active (logically low) when the multiplex terminal is in the diagnostic mode and it has no more traffic to transmit as indicated by the $\overline{QEOX}$ signal from the transmit sequence logic of FIG. 31 and the output of gate G50, discussed previously, is high.

When the multiplex terminal is in the user access mode of operation and the channel under observation is the user data carrying channel (the primary channel) the loop closing signal is the output of a gate G53. This signal becomes low or active when the diagnostic mode is not indicated, when the EOT function code and the access window have been transmitted onto the bus (indicated by the ENDX signal from the supervisory data counter logic of FIG. 33), when bit TCB2 from the terminal control port of FIG. 20A indicates that the channel under observation is the primary channel, and when the output of gate G50 is high.

When the terminal is in the user access mode of operation and the channel under observation is not the user data carrying channel (the alternate channel), the loop closing signal to gate G51 is the output of a NAND gate G54. This signal becomes active (low) when the diagnostic mode is not indicated, when bit TCB2 from the terminal control port of FIG. 20A indicates that the channel under observation is a secondary channel, when a terminal broadcast is not being transmitted and a hold state is not in effect as determined by a gate G55 with input signals $\overline{TB}$ and $\overline{QHOLD}$ from the transmit sequence logic of FIG. 31, and when the output of gate G50 is high.

With reference now to FIG. 33 of the drawings a description of the framing signal generator circuit portion 71 and the supervisory data counter logic circuit portion 72 of FIG. 29 will be undertaken. The purpose of the framing signal general 71 is to produce a framing signal when the terminal is about to transmit. The framing signal denotes the beginning of a TB, SM, IG or EOT transmission. A negative OR gate G56 has as its inputs the $\overline{FGST}$ signal from the transmit sequence logic circuit of 31 and the $\overline{IG}$ signal from the transmit user interface logic of FIG. 28A. The former signal indicates that a TB, SM, or EOT transmission is to occur. The latter signal indicates that an IG transmission is to occur. Therefore, the output of the gate G56 indicates that a framing signal should be generated in anticipation of the upcoming transmission.

The output of gate G56 is the clock input to a flip-flop FF20. When clocked, the Q output of FF20 goes low and is the serial input to a shift register 83. One internal clock period after this serial input goes low, the QA output of the shift register 83 goes low, which presets FF20 and causes the Q output of the flip-flop (and therefore the shift register serial input) to return to the high logical state. On the succeeding internal clock pulse the QA output of the shift register 83 goes high and the QB output goes low. This single low pulse continues through the shift register on succeeding clock pulses to the QC output and then to the QD output. Here the output is defined as the internal frame signal (INT $\overline{FRM}$). Therefore, it can be seen that the internal frame signal is a single low going pulse lasting one clock period which occurs four clock periods after the $\overline{FGST}$ or the $\overline{IG}$ signal goes low.

A negative AND gate G57 in FIG. 33 has as its inputs the internal frame signal from the shift register 83 and the $\overline{TB}$ signal from the transmit sequence logic of FIG. 31. This last-mentioned signal indicates that a terminal broadcast has been selected for transmission. The output of the gate G57 provides the QB5, 6 reset signal and is transmitted to the terminal control port of FIG. 20A to reset bits 5 and 6 of this port which appear as QB5 and QB6 in FIG. 20A. Recalling the discussion of the terminal control port, bit 5 is set by the CPU to indicate that a terminal broadcast is ready for transmission in the A channel and bit 6 indicates the same for the B channel. The QB5, 6 reset signal therefore resets these "TB ready" signals when the framing signal associated with a terminal broadcast transmission occurs.

The purpose of the supervisory data counter logic 72 as shown in FIGS. 29 and 33 is to count the supervisory data bits (function codes and terminal broadcast data) following framing signals in accordance with input signals $\overline{TB}$, $\overline{IG}$, $\overline{SM}$ and $\overline{EOT}$ which indicate whether the transmission is a terminal broadcast, an intramessage gap, a start of message or the end of the transmission respectively. This logic also provides output signals which indicate first whether the supervisory/user data multiplexer 59 of FIG. 26 should select supervisory data or user data during the start of message transmission (SW OVER), second to indicate to the transmit user interface logic circuit of FIG. 28A when the intramessage gap is occurring (MW RST), third to indicate the end of transmission at the end of the terminal broadcast in the diagnostic operating mode or at the time of the EOT transmission in the user access mode (ENDX) and fourth to show when a user has finished its transmission (ET MON).

A diagram of the supervisory data counter is shown as part of FIG. 33. A counter 84 is reset and begins counting internal clock pulses each time an internal frame pulse is detected. The terminal count is determined by which input signal $\overline{TB}$, $\overline{SM}$, $\overline{IG}$ or $\overline{EOT}$ is set at the time of the internal frame pulse. This terminal frame count signal (END CT) indicates the end of supervisory data transmission onto the bus for the various function codes and has values of 18, 2, 2 and 3 pulses counted respectively for TB, SM, IG and EOT. The end count signal drives three logic elements seen as flip-flops FF21 and FF22 and a one-shot device 86. FF21, like the counter 84, is preset each time an internal frame pulse occurs. This causes its output SWOVR to go to a logic state which in turn causes the user/supervisory data multiplexer of FIG. 26 to select supervisory type information for transmission onto the bus. When the end count occurs from counter 84, the output of flip-flop FF21 changes state and causes the user/supervisory multiplexer to select user data. Note, however, that actual user data transmission only occurs when $\overline{SM}$ is active as described, that is only following a SM or IG function code. For the TB and EOT transmission, the transmit sequence logic of FIG. 31 selects another transmission type or, in conjunction with the loop close logic of FIG. 32, enables the loop to be closed and the TLU to stop transmissions and reenter the relay submode of operation. This latter function occurs in the case after a TB has been transmitted in the diagnostic mode or after an EOT and access window transmission in the user access mode.

The end of the present transmission is indicated by the ENDX signal which is output from an AND gate G58. This output from G58 occurs when $\overline{EOT}$ is active and when SWOVER becomes active, for example, when flip-flop FF21 is toggled by the end count signal. The end count signal also triggers the one-shot 86 which provides a pulse signal $\overline{MWRST}$.

When $\overline{SM}$ is active (an SM or IG function code has been transmitted), the end count signal causes FF22 to toggle. The output of this flip-flop, $\overline{ETMON}$, provides an indication that the user is transmitting data onto the bus. This latter signal is one input to a negative AND gate G59. Another input to G59 is provided by the user ready signal from the transmit user interface logic of FIG. 28A which normally indicates whether or not the user has its RT signal set. When the RT signal is removed and ETMON is active, the output of the gate G59 goes low and presets flip-flop FF22. This causes the ETMOn signal to become inactive and thereby indicates that the user is finished with its transmission.

Although the best mode contemplated for carrying out the present invention has been herein shown and described, it will be apparent that modification and variation may be made without departing from what is regarded to be the subject matter of the invention.

What is claimed is:

1. A synchronous/asynchronous data communications system wherein a plurality of user data sources may originate and a plurality of user data sinks may receive synchronous data occurring at predetermined times and asynchronous data occurring at random times, comprising a plurality of multiplex terminals in communication with ones of the system user data sources and sinks, means in each of said plurality of multiplex terminals for assuming a configuration as a controller terminal for controlling the configuration of the data communications system, a transmitter and a receiver in each of said terminals, a data conveying path communicating said transmitter in one terminal with said receiver in an adjacent terminal, whereby said terminals are serially coupled in a loop, means in each terminal for accepting data from said receiver for transfer to user data sinks in communication therewith, means in each terminal for transferring data from user data sources in communication therewith to said transmitter, means interposed between said user data sources and said transmitter for passing synchronous data within each of said multiplex terminals during a first predetermined period and for passing asynchronous data outside said first predetermined period, means in each multiplex terminal for appending asynchronous data transmissions with an access window signal immediately after each asynchronous data transmission, means in each multiplex terminal for removing the access window signal from received data transmissions, said removal occurring at terminals with data transmissions ready from associated user data sources, whereby a plurality of descrete asynchronous messages are placed serially on said data conveying path by a plurality of terminals during a single circuit of said loop by said messages, means in each of said multiplex terminals for removing data from said conveying path which said multiplex terminal has transmitted and which has made a complete circuit of said loop, means for providing periodic time periods of predetermined length during which synchronous transmission of user source data is accomplished on said conveying path, random transmissions of user source data being accomplished on said conveying path during all other times.

2. A synchronous/asynchronous data communications system as in claim 1 wherein said means for passing includes means for suppressing said access window signal during said first predetermined period.

3. A synchronous/asynchronous data communications system as in claim 1 wherein said means for providing periodic time periods of predetermined length includes a central processor unit and further comprises a plurality of timers controlled by said processor, whereby said periodic time periods are superimposed on time during which asynchronous transmissions occur.

4. A synchronous/asynchronous data communications system as in claim 3 wherein one of said plurality of timers in said means for providing periodic time periods provides an asynchronous transmission suppression signal, said means for passing including circuit means responsive to said suppression signal for inhibiting asynchronous data transmission beyond a point in time sufficiently in advance of the ensuing periodic time period to allow completion of data transmission already on said conveying path at said point in time.

5. A synchronous/asynchronous data communications system as in claim 1 wherein said data conveying path comprises dual redundant conveying paths, wherein each of said multiplex terminals includes means for controlling said terminal to operate in a diagnostic mode at startup and in the presence of system faults, whereby each terminal communicates with its adjacent terminals to diagnose system fault conditions, and to configure said multiplex terminals in a user access mode thereafter, during which latter operation said means for passing is functional.

6. A synchronous/asynchronous data communications system as in claim 1 wherein said transmitter and receiver comprise dual transmitters and receivers, and said data conveying path comprises a path from each transmitter in one terminal to a separate receiver in another terminal, whereby continuous parallel data path loops serially connect said plurality of multiplex terminals, together with means for controlling each said terminal operation in a user access mode of operation and alternatively in a diagnostic mode of operation, said terminals further including means for cross coupling one of said transmitters in one data path with one of said receivers in another data path, whereby said loops are analyzed for integrity during said diagnostic mode.

7. A communications system for conveying messages between system users both as messages become available for transmission and alternatively in accordance with a predetermined schedule, comprising at least two multiplex terminals configurable in a relay and a transmit access configuration, at least two message conveying paths extending from each of said multiplex terminals and coupled to an adjacent terminal so that said terminals are serially connected in a continuous loop, means in each of said terminals for transmitting message components along one of said conveying paths, means interposed between said means for transmitting and the system users at each multiplex terminal for passing synchronous data from synchronous data sources at pre-assigned time slots during a first predetermined period and for passing asynchronous data during other times when said multiplex terminals are in said user access configuration, means within each of said multiplex terminals for providing on said one conveying path a signal indicative of system availability for message transmission at the end of each asynchronous data transmission, means in each of said multiplex terminals for receiving message components from the other of said conveying paths and for passing said system availability signal on to said means for transmitting when said terminals are disposed in said relay configuration, means in each of said multiplex terminals for removing said system availability signal from received data transmissions, said removal occurring at terminals which have assumed said transmit access configuration, whereby a plurality of discrete asynchronous messages are serially placed on said one message conveying path during each circuit of said continuous loop by said asynchronous data, means for suppressing provision of said system availability signal during said first predetermined period, means for scheduling synchronous message component transmissions from system users during said first predetermined period, means in said multiplex terminals for sensing the presence of said system availability signal on said conveying path, means responsive to said means for sensing for disposing said terminals in said transmit access configuration concurrently with said system availability signal sensing and removal and when asynchronous message components are available for transmission from system users coupled thereto, and means in each of said multiplex terminals for removing message components from said other conveying path which have been transmitted by said terminal on said one conveying path and which have made a complete circuit on said loop.

8. A data communications system operating to service a number of user data sources generating synchronous and asynchronous data and a number of user data sinks, comprising a plurality of multiplex terminals each servicing ones of the users, first and second pairs of message conveying paths extending in first and second directions respectively from each of said multiplex terminals, whereby said plurality of terminals may be connected serially by redundant conveying paths to form parallel continuous loops, means in each of said multiplex terminals for assuming a controller terminal function for controlling the configuration of said loops, means included in each of said terminals for transmitting data along one of said first pair of conveying paths in one direction and along one of said second pair of conveying paths in the other direction, means included in each of said terminals for receiving data from the other of said first and second pairs of conveying paths, means disposed between said means for transmitting and said system user data sources at each multiplex terminal for passing synchronous data within each of said multiplex terminals from synchronous data sources having pre-assigned time slots during a first predetermined period and for passing asynchronous data from other data sources outside said first predetermined period, means in each multiplex terminal for generating a system access availability signal for circulation on said conveying paths immediately after asynchronous data transmissions, means in each multiplex terminal for removing said system access availability signal from received data transmissions, said removal occurring at terminals with data transmissions ready from associated user data sources, whereby a plurality of discrete asynchronous messages are placed serially on said message conveying paths by a plurality of terminals during a single circuit of said loops by transmitted data, means in each multiplex terminal for removing data from said conveying paths which has been transmitted by said multiplex terminal and which has been received thereby after a complete circuit on one of said continuous loops, and a terminal control processor in each of said multiplex terminals operating to define said first predetermined periods.

9. A method of configuring and controlling a synchronous/asynchronous data communications system wherein a plurality of user data sources may originate and a plurality of user data sinks may receive synchronous data packets and asynchronous data packets through a plurality of multiplex terminals serially connected by transmission path segments to form a loop, the terminals being in communication with ones of the system user data sources and sinks, and wherein each terminal has at least one transmitter and receiver, comprising the steps of establishing an optimal system configuration utilizing available multiplex terminals and transmission path segments, setting a base time in the system for a synchronous-/asynchronous data transmission availability cycle, setting a synchronous data transmission availability portion within the transmission availability cycle, providing for conduction of a plurality of asynchronous data transmissions exclusive of the synchronous portion and within the transmission availability cycle, synchronizing all multiplex terminals to the settings for the synchronous data transmission availability portion of the cycle, enabling synchronous data sources, assigning various terminals and synchronous data sources specific time slots within the synchronous data transmission portion for synchronous transmissions, enabling asynchronous data sources, transmitting a user access availability signal onto one of the transmission path segments at the end of each asynchronous data transmission removing said user access availability signal from receiving data transmissions at multiplex terminals having data transmissions ready from user data sources coupled thereto, whereby a plurality of multiplex terminals transmit discrete asynchronous messages serially on the transmission path segments during one circuit of the loop by the transmissions, and removing received data from the loop which was transmitted by the receiving multiplex terminal and which has made a complete circuit of the loop.

10. The method of claim 9 wherein the step of setting an asynchronous data transmission availability portion of the cycle comprises, inhibiting fresh asynchronous user data transmission during the latter part of the asynchronous portion of the cycle, so that all asynchronous messages may be completed prior to the end of the asynchronous portion.

11. A synchronous/asynchronous data communications system wherein a plurality of user data sources originate and a plurality of user data sinks receive digital data at predetermined times and at non-predetermined times, comprising a plurality of multiplex terminals in communication with ones of said user data sources and sinks, system controller means in each of said plurality of multiplex terminals, means in each of said plurality of multiplex terminals for determining which one of said terminals will assume a controller function, said controller terminal providing timing signals, a transmitter and a receiver in each said terminal for transmitting and receiving synchronous and asynchronous data, unidirectional message conveying paths serially interconnecting said transmitters in ones of said terminals with said receivers in others of said terminals to form a closed loop, means in each terminal for accepting digital data from said receiver and transferring same to said user data sinks in communication therewith, means in each terminal for accepting digital data from said user data sources in communication therewith and transferring same to said transmitter, including means interposed between said user data sources and said transmitter for enabling data transfer from predetermined ones of a first set of user data sources at predetermined times within a first time period and for enabling data transfer from ones of a second set of user data sources at other times, said data transfer at other times being characterized by the simultaneous occurrence of data being available from ones of said second set of user data sources along with said data communications system not being currently occupied with communicating data, means in each terminal for appending each asynchronous data transmission with a system availability signal, means in each terminal for removing said system availability signal from received data transmissions at terminals having data transmissions ready from user data sources coupled thereto, means in each terminal for removing data from said conveying paths which were transmitted by said terminal and have made a complete circuit of said loop, and means for operating said means interposed between said user data sources and said transmitter providing cyclically recurring first time periods in response to said timing signals issued by said system controller.

12. A synchronous/asynchronous data communications system as in claim 11 wherein said means interposed between said user data sources and said transmitter includes means for providing data synchronizing signals to said predetermined ones of said first set of user data sources at predetermined intervals before said predetermined times within said first time period.

13. A synchronous/asynchronous data communications system as in claim 11 wherein said system controller includes regenerative timing means providing a continuous pulse chain at fixed intervals, and wherein said timing signals are periodic signals issued in synchronism with said continuous pulse chain.

14. A synchronous/asynchronous data communications system as in claim 13 wherein said first and other time periods are contiguous, and wherein said means for operating includes non-regenerative timing means initialized by reception of said periodic signals and providing a first output identifying the juncture between said first and other contiguous time periods as well as a second output identifying a time for said means interposed to cease accepting new data messages from ones of said second set of user data sources during said other time period.

15. A synchronous/asynchronous data communications system as in claim 13 wherein said means for operating includes programmable timing means measuring time from reception of said periodic timing signals and identifying said predetermined times for enabling data transfer from said predetermined ones of said first set of user data sources during said first time period.

16. A synchronous/asynchronous data communications system as in claim 15 wherein said means interposed between said user data sources and said transmitter includes means for determining the frequency of enabling data transfer from a given predetermined one of said first set of user data sources to be in accordance with the frequency of reception of said periodic timing signals divided by a fixed integer number.

17. A synchronous/asynchronous data communications system as in claim 14 wherein each of said multiplex terminals includes a microprocessor and wherein said non-regenerative timing means periodically interrupts the program of said microprocessor included in said system controller terminal thereby transferring program control to a subprogram containing instructions to issue a timing signal.

18. A synchronous/asynchronous data communications system as in claim 17 wherein reception of a said timing signal by one of said multiplex terminals causes a program interrupt of said microprocessor therein, thereby transferring program control to a subprogram containing instructions to initialize said non-regenerative timing means and further containing instructions for enabling data transfer from said particular ones of said first set of user data sources after appropriate programmed time delays.

19. A digital communication system capable of communicating data messages at periodic intervals from ones of a first plurality of data sources and at aperiodic intervals from ones of a second plurality of data sources to a plurality of data sinks, comprising a plurality of terminals including a system controller terminal, a data transmitter and a data receiver in each of said terminals, a plurality of unidirectional transmission segments interconnecting said transmitter in each of said terminals and said receiver in another of said terminals thereby disposing said plurality of terminals in a closed loop, a controllable data switch in each terminal interposed between said data transmitter and said data receiver, said switch being controllable between a data relay and a transmit access configuration and being normally disposed in said data relay configuration wherein data is coupled from the output of said receiver to the input of said transmitter, means in each terminal for accepting data messages from the output of said receiver and transferring same to local data sinks with said data switch in either a data relay configuration or a transmit access configuration, means in each terminal for accepting data messages from local data sources and transferring same to the input of said transmitter with said data switch in said transmit access configuration, said last named means including a controllable interface interposed between said terminal and local data sources interfaced thereto, means in the system controller terminal for periodically broadcasting an identifiable message at regularly spaced intervals, synchronous control means in each terminal responsive to reception of said periodic identifiable messages, said synchronous control means operating to command said interface to selectively enable data transfers from particular ones of said first plurality of data sources at particular predetermined times occurring in synchronism with said identifiable messages and concurrently operating to command said data switch to assume a transmit access configuration during said data transfers, means in the system controller terminal for introducing a system availability token into the loop at a first fixed time after transmitting one of said periodic identifiable messages and for removing said system availability token from the loop at a second fixed time thereafter, means in each terminal for suppressing the relaying of a received system availability token when data is available from ones of said second plurality of data sources interfaced thereto, asynchronous control means in each terminal responsive to reception of a system availability token along with data being available at ones of said second plurality of data sources, said asynchronous control means operating to command said data switch to assume a transmit access configuration and concurrently operating to command said interface to selectively enable data transfer from said ones of said second plurality of data sources having data available, whereby a plurality of discrete asynchronous data messages are serially placed on said transmission segments by a plurality of data sources and terminals during one circuit of said data on said loop, means in each terminal for transmitting a system availability token and for commanding said data switch to resume a data relay configuration after all said ones of said second plurality of data sources interfaced to said terminal have transferred their available data, and means in each terminal for removing data from said transmission segments which said terminal has transmitted from ones of said second plurality of data sources connected thereto, wherein said data has made one complete circuit of said loop.

20. A digital communication system as in claim 19 wherein said controllable interface comprises means for providing synchronizing signals to said particular ones of said first plurality of data sources at predetermined intervals before said data transfer is selectively enabled.

21. A digital communication system as in claim 19 wherein said controllable interface comprises means for providing system availability signals to ones of said second plurality of data sources at non-predetermined intervals after said data sources indicate data available for transmission.

22. A digital communication system as in claim 19 wherein said synchronous control means includes means for determining the rate of selective enablement of data transfer from a particular one of said first plurality of data sources to be in accordance with the rate of reception of said periodic identifiable messages divided by an integer number.

23. A digital communication system as in claim 19 wherein each of said terminals includes first timing means initialized by reception of said identifiable messages and providing an output at a point in time at which terminal control is passed from said synchronous control means to said asynchronous control means.

24. A digital communication system as in claim 23 wherein said asynchronous control means includes second timing means initialized by reception of said identifiable messages and providing an output at a point in time after which new data messages will not be accepted from ones of said second plurality of data sources interfaced to the terminal.

25. A method of configuring and controlling a synchronous/asynchronous data communications system wherein a plurality of user data sources may originate and a plurality of user data sinks may receive synchronized data and asynchronized data through a plurality of multiplex terminals serially connected by transmission path segments forming a loop, the terminals being in communication with ones of the system user data sources and sinks, and wherein each terminal has at least one transmitter and receiver, comprising the steps of establishing an optimal system configuration utilizing available multiplex terminals and transmission path segments, setting a base time in the system for a synchronous/asynchronous data transmission availability cycle, setting a synchronous data transmission availability portion within the transmission availability cycle, setting an asynchronous data transmission availability portion exclusive of and within the transmission availability cycle, synchronizing all multiplex terminals to the settings for both synchronous and asynchronous data transmission availability portions of the cycle, enabling synchronous data sources, assigning predetermined synchronous data sources a predetermined time slot within the synchronous data transmission portion for synchronous transmissions, enabling asynchronous data sources, and transmitting a user access availability signal onto one of the transmission path segments at the end of each asynchronous data transmission, removing said user access availability signal from received data transmissions at multiplex terminals having data transmissions ready from user data sources coupled thereto, whereby a plurality of multiplex terminals transmit discrete asynchronous data messages serially on the transmission path segments during a circuit of the loop by the data messages, and removing received asynchronous data messages from the loop which have been transmitted by the receiving multiplex terminal and which have made a complete circuit of the loop.

26. The method of claim 25 wherein the step of setting an asynchronous data transmission availability portion of the cycle comprises, inhibiting fresh asynchronous user data transmission during the latter part of the asynchronous portion of the cycle, so that all asynchronous messages may be completed prior to the end of the asynchronous portion.

* * * * *